United States Patent
Miyamoto et al.

(10) Patent No.: US 6,267,673 B1
(45) Date of Patent: Jul. 31, 2001

(54) VIDEO GAME SYSTEM WITH STATE OF NEXT WORLD DEPENDENT UPON MANNER OF ENTRY FROM PREVIOUS WORLD VIA A PORTAL

(75) Inventors: Shigeru Miyamoto; Yasunari Nishida; Takumi Kawagoe; Satoshi Nishiumi, all of Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/662,156

(22) Filed: Sep. 14, 2000

Related U.S. Application Data

(62) Continuation of application No. 08/870,100, filed on Jun. 5, 1997, and a continuation-in-part of application No. PCT/JP96/02931, filed on Oct. 9, 1996, and a continuation-in-part of application No. 08/719,019, filed on Sep. 26, 1996, and a continuation-in-part of application No. PCT/JP96/02726, filed on Sep. 20, 1996, and a continuation-in-part of application No. 08/765,474, filed as application No. PCT/JP96/01237 on May 10, 1996, and a continuation-in-part of application No. 08/562,288, said application No. 08/870,100, is a continuation of application No. 08/857,882, filed on May 16, 1997.

(60) Provisional application No. 60/043,756, filed on Apr. 9, 1997.

(51) Int. Cl.[7] ......................................... A63F 13/00
(52) U.S. Cl. .................. 463/31; 463/43; 463/23
(58) Field of Search .................... 345/302, 419; 463/5, 32, 31, 43, 44, 23

(56) References Cited

U.S. PATENT DOCUMENTS

| | | |
|---|---|---|
| D. 316,879 | 5/1991 | Shulman et al. . |
| D. 317,946 | 7/1991 | Tse . |

(List continued on next page.)

FOREIGN PATENT DOCUMENTS

| | | |
|---|---|---|
| 90881/91 | 11/1990 | (AU) . |
| 32 04 428 | 8/1983 | (DE) . |

(List continued on next page.)

OTHER PUBLICATIONS

TurboGrafx–16 Keith Courage in Alpha Zones Game. pp. 47–51, Nov. 1990.*

"Hardware Reset With Microcode Warning Period", *IBM Technical Disclosure Bulletin*, vol. 33, No. 11, Apr. 1991, pp. 105–106.

(List continued on next page.)

*Primary Examiner*—Michael O'Neill
(74) *Attorney, Agent, or Firm*—Nixon & Vanderhye P.C.

(57) ABSTRACT

A video game system includes a game cartridge which is pluggably attached to a main console having a main processor, a 3D graphics generating coprocessor, expandable main memory and player controllers. A multifunctional peripheral processing subsystem external to the game microprocessor and coprocessor is described which executes commands for handling player controller input/output to thereby lessen the processing burden on the graphics processing subsystem. The video game methodology involves game level organization features, camera perspective or point of view control features, and a wide array of animation and character control features. The system changes the "camera" angle (i.e., the displayed point of view in the three-dimensional world) automatically based upon various conditions and in response to actuation of a plurality of distinct controller keys/buttons/switches, e.g., four "C" buttons in the exemplary embodiment. The control keys allow the user at any time to move in for a close up or pull back for a wide view or pan the camera to the right and left to change the apparent camera angle. Such user initiated camera manipulation permits a player to better judge jumps or determine more precisely where an object is located in relation to the player controlled character. The video game system and methodology features a unique player controller, which permits control over a character's exploration of the three-dimensional world to an unprecedented extent. A player controlled character may be controlled in a multitude of different ways utilizing the combination of the joystick and/or cross-switch and/or control keys and a wide range of animation effects are generated.

4 Claims, 57 Drawing Sheets

U.S. PATENT DOCUMENTS

| | | |
|---|---|---|
| D. 357,712 | 4/1995 | Wu . |
| D. 363,092 | 10/1995 | Hung . |
| D. 375,326 | 11/1996 | Yokoi et al. . |
| 3,666,900 | 5/1972 | Rothweiler et al. . |
| 3,729,129 | 4/1973 | Fletcher et al. . |
| 3,827,313 | 8/1974 | Kiessling . |
| 4,148,014 | 4/1979 | Burson . |
| 4,161,726 | 7/1979 | Burson et al. . |
| 4,315,113 | 2/1982 | Fisher et al. . |
| 4,359,222 | 11/1982 | Smith, III et al. . |
| 4,469,330 | 9/1984 | Asher . |
| 4,485,457 | 11/1984 | Balaska et al. . |
| 4,538,035 | 8/1985 | Pool . |
| 4,552,360 | 11/1985 | Bromley et al. . |
| 4,575,591 | 3/1986 | Lugaresi . |
| 4,587,510 | 5/1986 | Kim . |
| 4,639,225 | 1/1987 | Washizuka . |
| 4,659,313 | 4/1987 | Kuster et al. . |
| 4,685,678 | 8/1987 | Frederiksen . |
| 4,748,441 | 5/1988 | Brzezinski . |
| 4,783,812 | 11/1988 | Kaneoka . |
| 4,789,932 | 12/1988 | Cutler et al. . |
| 4,799,677 | 1/1989 | Frederiksen . |
| 4,858,930 | 8/1989 | Sato . |
| 4,868,780 | 9/1989 | Stern . |
| 4,875,164 | 10/1989 | Monfort . |
| 4,887,230 | 12/1989 | Noguchi et al. . |
| 4,887,966 | 12/1989 | Gellerman . |
| 4,890,832 | 1/1990 | Komaki . |
| 4,916,440 | 4/1990 | Faeser et al. . |
| 4,924,216 | 5/1990 | Leung . |
| 4,926,372 | 5/1990 | Nakagawa . |
| 4,933,670 | 6/1990 | Wislocki . |
| 4,949,298 | 8/1990 | Nakanishi et al. . |
| 4,974,192 | 11/1990 | Face et al. . |
| 4,976,429 | 12/1990 | Nagel . |
| 4,976,435 | 12/1990 | Shatford et al. . |
| 4,984,193 | 1/1991 | Nakagawa . |
| 5,001,632 | 3/1991 | Hall-Tipping . |
| 5,012,230 | 4/1991 | Yasuda . |
| 5,014,982 | 5/1991 | Okada et al. . |
| 5,046,739 | 9/1991 | Reichow . |
| 5,095,798 | 3/1992 | Okada et al. . |
| 5,160,918 | 11/1992 | Saposnik et al. . |
| 5,203,563 | 4/1993 | Loper, III . |
| 5,207,426 | 5/1993 | Inoue et al. . |
| 5,213,327 | 5/1993 | Kitaue . |
| 5,226,136 | 7/1993 | Nakagawa . |
| 5,237,311 | 8/1993 | Mailey et al. . |
| 5,245,320 | 9/1993 | Bouton . |
| 5,259,626 | 11/1993 | Ho . |
| 5,273,294 | 12/1993 | Amanai . |
| 5,276,831 | 1/1994 | Nakanishi et al. . |
| 5,286,024 | 2/1994 | Winblad . |
| 5,290,034 | 3/1994 | Hineman . |
| 5,291,189 | 3/1994 | Otake et al. . |
| 5,317,714 | 5/1994 | Nakagawa et al. . |
| 5,327,158 | 7/1994 | Takahashi et al. . |
| 5,329,276 | 7/1994 | Hirabayashi . |
| 5,337,069 | 8/1994 | Otake et al. . |
| 5,357,604 | 10/1994 | San et al. . |
| 5,358,259 | 10/1994 | Best . |
| 5,371,512 | 12/1994 | Otake et al. . |
| 5,388,841 | 2/1995 | San et al. . |
| 5,388,990 | 2/1995 | Beckman . |
| 5,390,937 | 2/1995 | Sakaguchi et al. . |
| 5,393,070 | 2/1995 | Best . |
| 5,393,071 | 2/1995 | Best . |
| 5,393,072 | 2/1995 | Best . |
| 5,393,073 | 2/1995 | Best . |
| 5,394,168 | 2/1995 | Smith, III et al. . |
| 5,415,549 | 5/1995 | Logg . |
| 5,421,590 | 6/1995 | Robbins . |
| 5,426,763 | 6/1995 | Okada . |
| 5,436,640 | 7/1995 | Reeves . |
| 5,437,464 | 8/1995 | Terasima et al. . |
| 5,451,053 | 9/1995 | Garrido . |
| 5,453,763 | 9/1995 | Nakagawa et al. . |
| 5,459,487 | 10/1995 | Bouton . |
| 5,473,325 | 12/1995 | McAlindon . |
| 5,512,920 | 4/1996 | Gibson . |
| 5,513,307 | 4/1996 | Naka et al. . |
| 5,515,044 | 5/1996 | Glatt . |
| 5,551,693 | 9/1996 | Goto et al. . |
| 5,551,701 | 9/1996 | Bouton et al. . |
| 5,558,329 | 9/1996 | Liu . |
| 5,563,629 | 10/1996 | Caprara . |
| 5,566,280 | 10/1996 | Kukui et al. . |
| 5,577,735 | 11/1996 | Reed et al. . |
| 5,589,854 | 12/1996 | Tsai . |
| 5,593,350 | 1/1997 | Bouton et al. . |
| 5,607,157 | 3/1997 | Nagashima . |
| 5,615,083 | 3/1997 | Burnett . |
| 5,624,117 | 4/1997 | Ohkubo et al. . |
| 5,628,686 | 5/1997 | Svancarek et al. . |
| 5,632,680 | 5/1997 | Chung . |
| 5,640,177 | 6/1997 | Hsu . |
| 5,643,087 | 7/1997 | Marcus et al. . |
| 5,649,862 | 7/1997 | Sakaguchi et al. . |
| 5,653,637 | 8/1997 | Tai . |
| 5,662,737 | 9/1997 | Shulman . |
| 5,670,955 | 9/1997 | Thorne, III et al. . |
| 5,680,534 | 10/1997 | Yamato et al. . |
| 5,684,512 | 11/1997 | Schoch et al. . |
| 5,691,898 | 11/1997 | Rosenberg et al. . |
| 5,704,837 | 1/1998 | Iwasaki et al. . |
| 5,706,029 | 1/1998 | Tai . |
| 5,714,981 | 2/1998 | Scott-Jackson et al. . |
| 5,724,497 | 3/1998 | San et al. . |
| 5,731,806 | 3/1998 | Harrow et al. . |
| 5,734,373 | 3/1998 | Rosenberg et al. . |
| 5,734,376 | 3/1998 | Hsien . |
| 5,734,807 | 3/1998 | Sumi . |
| 5,759,100 | 6/1998 | Nakanishi . |
| 5,769,719 | 6/1998 | Hsu . |
| 5,784,051 | 7/1998 | Harrow et al. . |
| 5,785,597 | 7/1998 | Shinohara . |
| 5,786,807 | 7/1998 | Couch et al. . |
| 5,791,994 | 8/1998 | Hirano et al. . |
| 5,793,356 | 8/1998 | Svancarek et al. . |
| 5,804,781 | 9/1998 | Okabe . |
| 5,808,591 | 9/1998 | Mantani . |
| 5,816,921 | 10/1998 | Hosokawa . |
| 5,820,462 | 10/1998 | Yokoi et al. . |
| 5,830,066 | 11/1998 | Goden et al. . |
| 5,838,330 | 11/1998 | Ajima . |
| 5,850,230 | 12/1998 | San et al. . |
| 5,862,229 | 1/1999 | Shimizu . |
| 5,867,051 | 2/1999 | Liu . |
| 5,877,749 | 3/1999 | Shiga et al. . |
| 5,880,709 | 3/1999 | Itai et al. . |
| 5,896,125 | 4/1999 | Niedzwiecki . |
| 5,898,424 | 4/1999 | Flannery . |
| 5,946,004 | 8/1999 | Kitamura et al. . |
| 5,973,704 | 10/1999 | Nishiumi et al. . |
| 5,984,785 | 11/1999 | Takeda et al. . |
| 6,001,015 | 12/1999 | Nishiumi et al. . |
| 6,007,428 | 12/1999 | Nishiumi et al. . |
| 6,017,271 | 1/2000 | Miyamoto et al. . |
| 6,020,876 | 2/2000 | Rosenberg et al. . |
| 6,022,274 | 2/2000 | Takada et al. . |

| | | |
|---|---|---|
| 6,034,669 | 3/2000 | Chiang et al. . |
| 6,036,495 | 3/2000 | Marcus et al. . |
| 6,042,478 | 3/2000 | Ng . |
| 6,050,896 | 4/2000 | Hanado et al. . |
| 6,071,194 | 6/2000 | Sanderson et al. . |
| 6,078,329 | 6/2000 | Umeki et al. . |
| B1 4,870,389 | 6/1997 | Ishiwata et al. . |

FOREIGN PATENT DOCUMENTS

| | | |
|---|---|---|
| 40 18 052 | 12/1990 | (DE) . |
| 268 419 | 5/1988 | (EP) . |
| 431 723 | 6/1991 | (EP) . |
| 0 470 615 | 2/1992 | (EP) . |
| 553 532 | 8/1993 | (EP) . |
| 685 246 | 12/1995 | (EP) . |
| 724 220 | 7/1996 | (EP) . |
| 0771015A1 | 5/1997 | (EP) . |
| 2234575 | 2/1991 | (GB) . |
| 2 244 546 | 12/1991 | (GB) . |
| 2 263 802 | 8/1993 | (GB) . |
| 50-22475 | 3/1975 | (JP) . |
| 57-18236 | 1/1982 | (JP) . |
| 57-2084 | 1/1982 | (JP) . |
| 57-136217 | 8/1982 | (JP) . |
| 59-40258 | 3/1984 | (JP) . |
| 59-121500 | 7/1984 | (JP) . |
| 61-16641 | 1/1986 | (JP) . |
| 61-198286 | 9/1986 | (JP) . |
| 61-185138 | 11/1986 | (JP) . |
| 2-41342 | 3/1990 | (JP) . |
| 2-68404 | 5/1990 | (JP) . |
| 2-283390 | 11/1990 | (JP) . |
| 3-16620 | 1/1991 | (JP) . |
| 3-248215 | 11/1991 | (JP) . |
| 4-26432 | 1/1992 | (JP) . |
| 4-20134 | 2/1992 | (JP) . |
| 4-42029 | 2/1992 | (JP) . |
| 4-104893 | 9/1992 | (JP) . |
| 4-291468 | 10/1992 | (JP) . |
| 5-100759 | 4/1993 | (JP) . |
| HEI 6-114683 | 4/1993 | (JP) . |
| 5-19925 | 5/1993 | (JP) . |
| 5-177057 | 7/1993 | (JP) . |
| 5-241502 | 9/1993 | (JP) . |
| 6-23148 | 2/1994 | (JP) . |
| 6-54962 | 3/1994 | (JP) . |
| 6-68238 | 3/1994 | (JP) . |
| 6-110602 | 4/1994 | (JP) . |
| 6-114683 | 4/1994 | (JP) . |
| 6-190145 | 7/1994 | (JP) . |
| 6-190147 | 7/1994 | (JP) . |
| 6-205010 | 7/1994 | (JP) . |
| 6-61390 | 8/1994 | (JP) . |
| 6-285259 | 10/1994 | (JP) . |
| 6-290277 | 10/1994 | (JP) . |
| 6-315095 | 11/1994 | (JP) . |
| 7068052 | 3/1995 | (JP) . |
| 07088252 | 4/1995 | (JP) . |
| 7-104930 | 4/1995 | (JP) . |
| 7-116343 | 5/1995 | (JP) . |
| 7-144069 | 6/1995 | (JP) . |
| 7-178242 | 7/1995 | (JP) . |
| 7-222865 | 8/1995 | (JP) . |
| 7-288006 | 10/1995 | (JP) . |
| H7-288006 | 10/1995 | (JP) . |
| 7-317230 | 12/1995 | (JP) . |
| H7-317230 | 12/1995 | (JP) . |
| 8-45392 | 2/1996 | (JP) . |
| 9-56927 | 3/1997 | (JP) . |
| 62-269221 | 11/1997 | (JP) . |
| WO 92/09347 | 6/1992 | (WO) . |
| WO 94/12999 | 6/1994 | (WO) . |
| WO96/36060 | 11/1996 | (WO) . |
| WO97/17651 | 5/1997 | (WO) . |
| WO97/32641 | 12/1997 | (WO) . |

OTHER PUBLICATIONS

*3D Ballz Instruction Booklet*, ACCOLADE, San Jose, California, 190 3050–00231 Rev. A.

6 Photographs of Sony PlayStation: 1) top case and compact disk; 2) hand controller; 3) internal circuit boards (top view); 4) internal circuit boards (top view); 5) compact disk reader (bottom view); and internal main circuit board (bottom view).

*Knuckles Chaotix Instruction Manual*, SEGA, Redwood City, California, #84503 (1995).

*Nintendo Power*, vol. 30, p. 22, PilotWings article.

*Nintendo Power*, vol. 31, p. 35, PilotWings article.

*Nintendo Power*, vol. 31, pp. 74–76, PilotWings article.

*Nintendo Power*, vol. 38, p. 25, PilotWings article.

*Nintendo Power*, vol. 46, PilotWings article.

*PilotWings Instruction Booklet*, Super Nintendo Entertainment System, SNS–PW–USA, copyright 1991.

*PilotWings, It's a Festival of Flight*, Top Secret Password Nintendo Player's Guide, pp. 82–83 and 160, copyright 1991.

*PilotWings, Soar with the Flight Club*, Super Nintendo Entertainment System Play's Guide, pp. 100–105, copyright 1991.

*Sega Genesis 32x Instruction Manual*, SEGA, Redwood City California, #672–2116 (1994).

*Sega Genesis Instruction Manual*, SEGA, Hayward, California,#3701–926–0–01 (1994).

*Sonic 2 The Hedgehog Instruction Manual*, SEGA, Hayward, California, 190 672–0944 3701–925–0–01 (1992).

Sony PlayStation Instruction Manual, and informational materials, Sony Computer Entertainment Inc. 1995.

"Analog Joystick Interface Emulation Using a Digital Counter", IBM technical Disclosure Bulletin, vol. 37, No. 08, Aug. 1994, pp. 73–74.

Drucker et al., "Cinema: A System for Procedural Camera Movements", Proceedings of the Symposium on Interactive 3D Graphics, Cambridge, MA., Mar. 29–Apr. 1, 1992, pp. 67–70.

Sega Force/ Saturn Tech Specs, Data Information, pp. 1–5, 1997.

Sega Force/ Saturn Tech Peripherals, Data Information, pp. 1–4, 1997–99.

Super Mario 64 Player's Guide, Nintendo of America, 1996.

Nintendo Power, "The Fun Machine" for Nintendo 64, 1995.

Nintendo Power, Vol. 80, pp. 20–27, Jan. 1996.

*Nintendo Employee Shosinkai Reports*, 14 pages, Nov. 24–26, 1995.

Sega Force/Saturn Tech Specs, Data Information,1997.

Sega Force/Saturn Peripherals, Data Information, 1997–1999.

Nintendo Power, "The Fun Machine" for Nintendo 64.

*Nintendo Power*, vol. 80, pp. 20–27, Jan. 1996.

Falcon Electronic Battlefield Series, Advertisement, Spectrum HoloByte, Alameda, California, #F303IBM 208858. (Exhibited at 1992 CES).

*Nintendo Employee Shoshinkai Reports*, 14 pages, Nov. 24–26, 1995.

\* cited by examiner

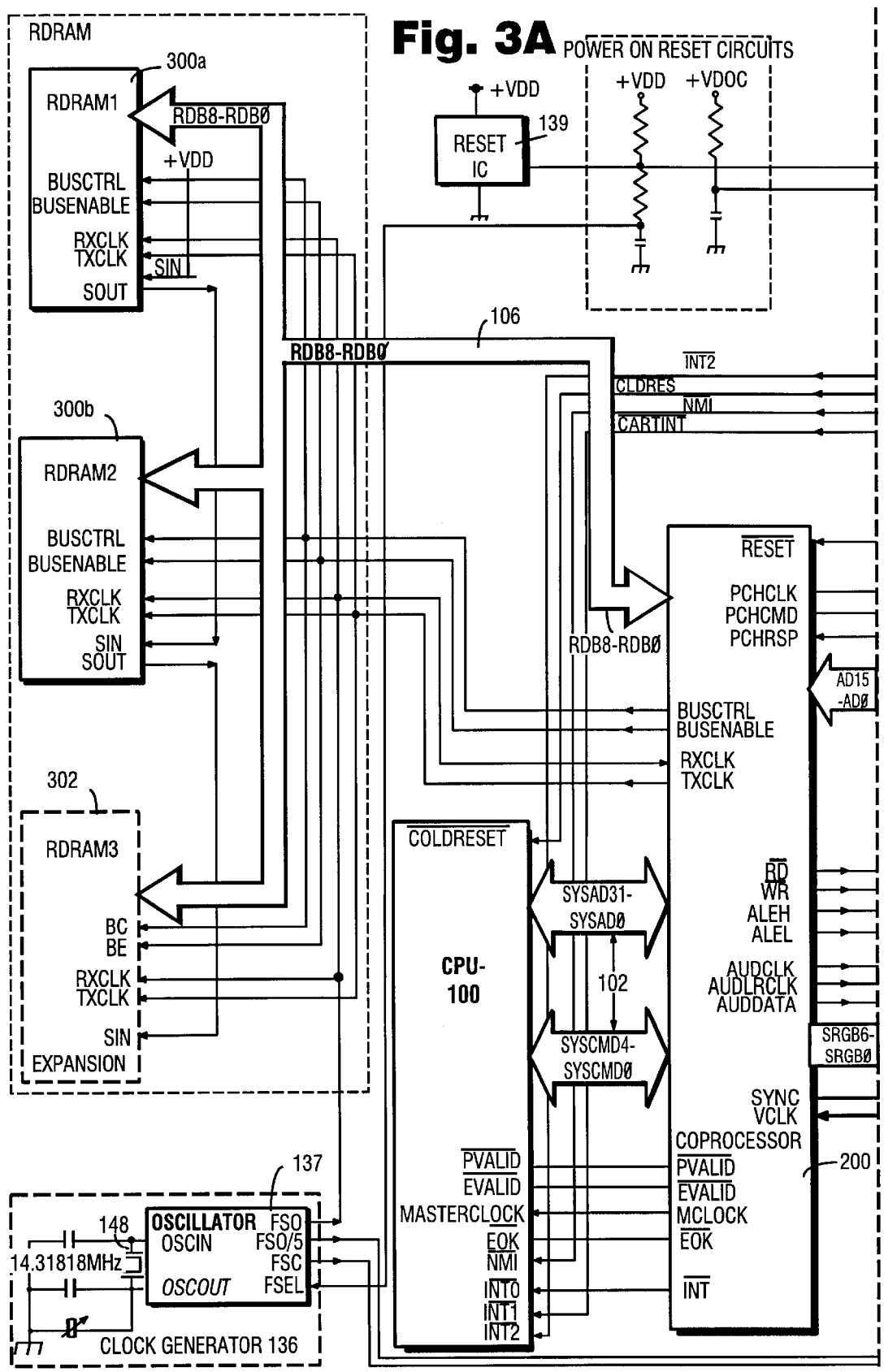

TRIANGLE POLYGON

⑤

⑧

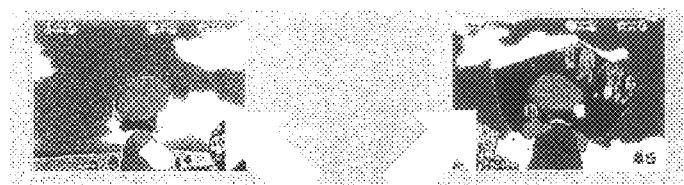
Fig. 23L  Fig. 23K
Fig. 23G  Fig. 23F
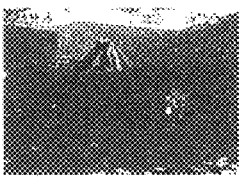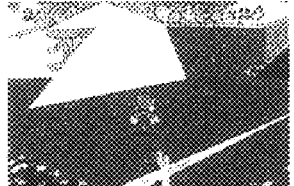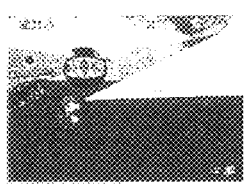
Fig. 23H  Fig. 23J
Fig. 23I

DUNGEON OR ROOM

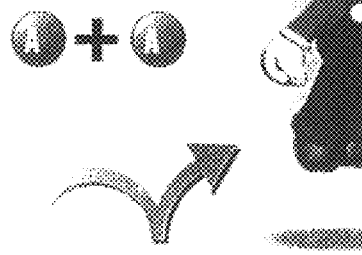
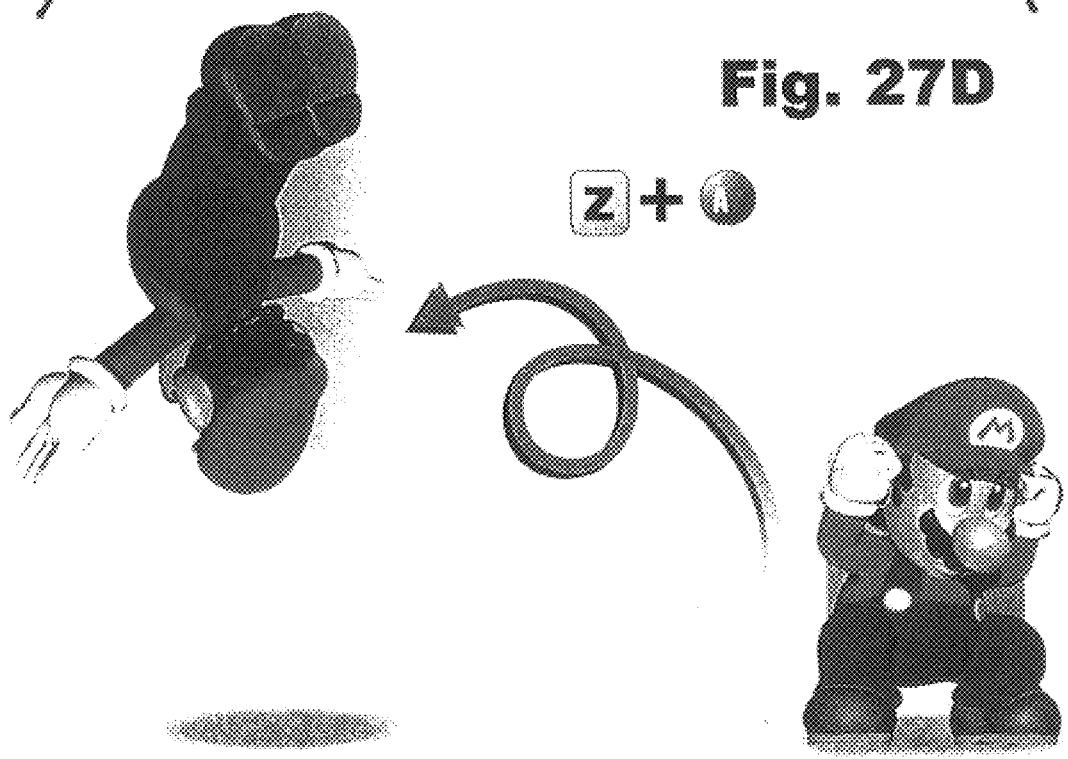

Fig. 27E
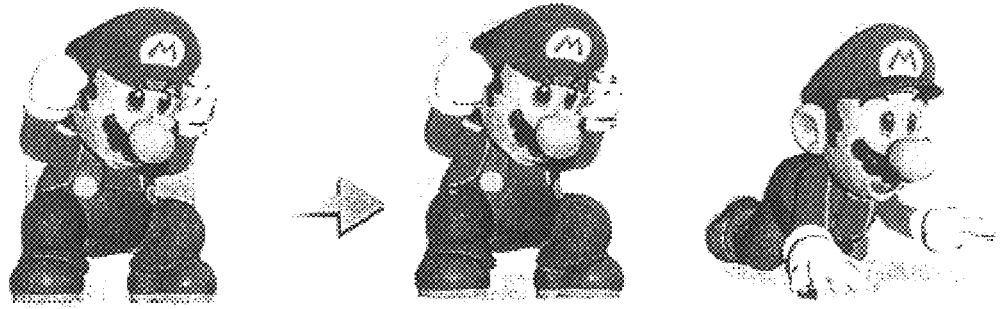
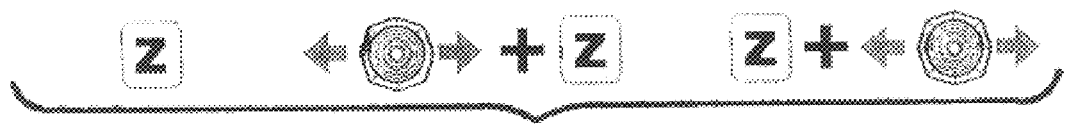
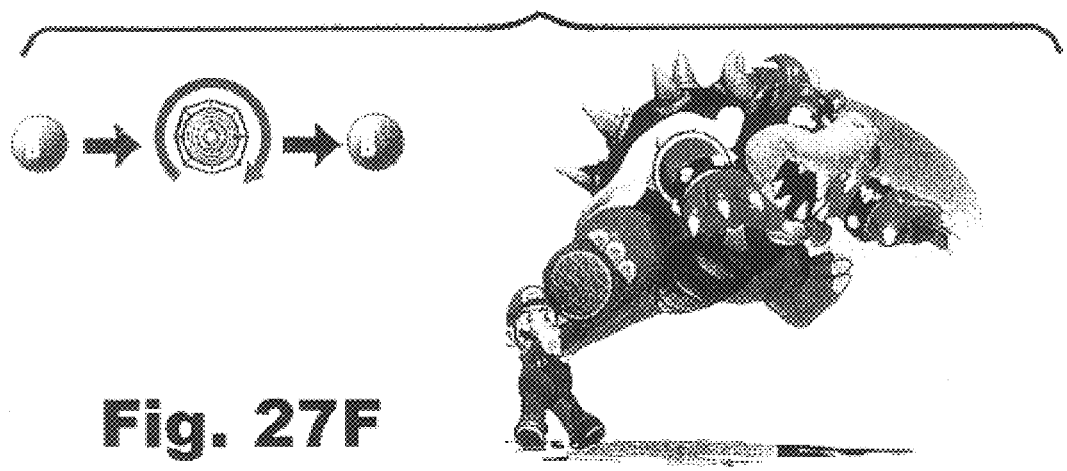
Fig. 27F

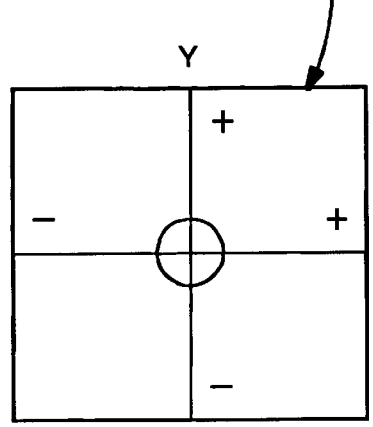
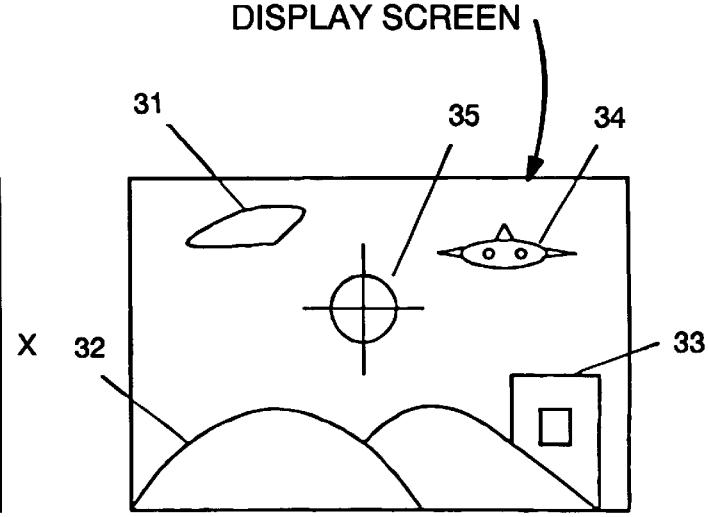
Fig. 33A  Fig. 33B
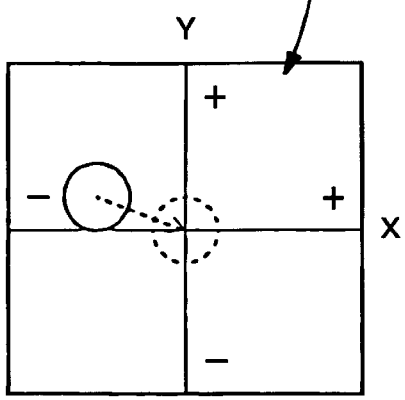
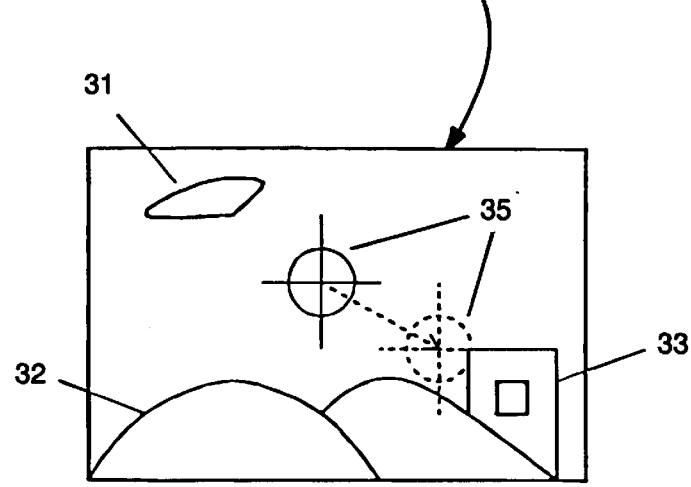
Fig. 34A  Fig. 34B

VIDEO GAME SYSTEM WITH STATE OF NEXT WORLD DEPENDENT UPON MANNER OF ENTRY FROM PREVIOUS WORLD VIA A PORTAL

RELATED APPLICATIONS

This is a continuing application of application Ser. No. 08/870,100, filed Jun. 5, 1997, which is a continuation of Ser. No. 08/857,882 filed May 16, 1997, and claims the benefit of provisional application No. 60/043,756 filed Apr. 09, 1997.

The present invention is a continuation-in-part of U.S. patent application Ser. No. 08/562,288 (the '288 application), filed on Nov. 22, 1995 and entitled "High Performance/Low Cost Video Game System With Multifunctional Peripheral Processing Subsystem", and is a continuation-in-part of U.S. patent application Ser. No. 08/719,019 (the '019 application), filed on Sep. 26, 1996 and entitled "Operation Controlling Device and Video Processing System Used therewith", and is a continuation-in-part of PCT Application Serial No. PCT/JP96/02931, filed on Oct. 9, 1996, and entitled "Three-Dimensional Image Processing Apparatus" (FNP-0220), and is continuation-in-part of U.S. patent application Ser. No. 08/765,474 (filed as PCT/JP96/01237, filed on May 10, 1996), entitled "Image Processing System Using Analog Joystick, and is a Continuation-in-Part of PCT application number PCT/JP96/02726, filed on Sep. 20, 1996 and entitled "Three Dimensional Image Processing System" (FNP-0025), which applications are each incorporated herein by reference

FIELD OF THE INVENTION

The present invention generally relates to a video game apparatus and method providing enhanced interactive three-dimensional character and background screen effects and player control capabilities. More particularly, the invention relates to a video game system including a joystick-based, multifunctional player controller and unique video game methodology having an open level video game organization, automatic and user-controlled camera perspective modification capabilities, and a wide range of character control and animation features providing a new era in video gaming.

BACKGROUND AND SUMMARY OF THE INVENTION

Microprocessor-based home video game systems such as the Nintendo Entertainment System and the Super Nintendo Entertainment System have been highly successful in part because they can interactively produce exciting videographics involving numerous animated moving objects.

The video game system and methodology described herein permits game play involving three-dimensional images having a depth and realism far exceeding these and other heretofore known video game systems. The video game system features a unique player controller, which permits control over a character's exploration of the three-dimensional world to an unprecedented extent.

The present invention features video game methodology, marking a new era in video game play. The video game methodology in accordance with the present invention involves game level organization features, camera perspective or point of view control features, and a wide array of animation and character control features.

In accordance with one illustrative video game embodiment of the present invention, which is presently being sold by the inventors' assignee as "Super Mario 64" for play on the Nintendo 64 video game system, a castle serves as an entry point to many different courses or levels. Once in a given course or level, a player attempts to accomplish a set of independent goals, such as recovering a set of stars hidden throughout the course. Typically, in prior art video games, once a player completes the requirements for a particular level, the player is automatically advanced to the next level. In accordance with one illustrative embodiment, once a player accumulates enough stars to advance to the next level, the player is not automatically thrust into the next level. Rather, the player may continue play in the current level or may exit and return to a common castle area. The player may then choose a path within the castle to reenter a previously completed course associated with an already achieved level or elect to explore the castle area. In effect, the video game methodology of the present invention incorporates an open level environment for all courses which have previously been completed.

In accordance with an exemplary embodiment, it is not necessary for a player to accomplish all the goals, e.g., accumulate all possible stars, which are present in a course, before access to a further course is permitted. It is thus possible to exit a first course, move to a different course and then return to the first course to search for further hidden stars. There is no set order in a particular stage or course for a player to accomplish predetermined goals, such as collection of stars. Moreover, advancement to a further stage by two different players may be enabled by accomplishing completely different or substantially different goals.

In the illustrative embodiment described herein, the user enters a three-dimensional castle in which doors provide access to rooms having paintings on the castle walls. A player enters a course by jumping through the painting and into the three-dimensional world depicted by the painting. In accordance with one embodiment of the present invention, the zone of the painting (e.g., defined by height) into which a player-controlled character (e.g., Mario) is controlled to leap, affects the course environment, e.g., the displayed course water level depends upon the picture zone into which Mario leaps.

The present video game methodology allows the user to manipulate the "camera" angle (i.e., the displayed point of view in the three-dimensional world) in response to actuation of a plurality of distinct controller keys/buttons/switches, e.g., four "C" buttons in the exemplary embodiment. The control keys allow the user at any time to move in for a close up or pull back for a wide view or pan the camera to the right and left to change the apparent camera angle. Such user initiated camera manipulation permits a player to better judge jumps or determine more precisely where an object is located in relation to the player controlled character. For example, one camera perspective control button allows the user to switch to a perspective which is adjusted to be directly behind the player controlled character. In this fashion, portions of the game where there is a very narrow platform or enclosed space which must be traversed, may be more successfully traversed. The shooting direction may be changed by operation of the unique controller's joystick to change the direction of the character's head to smoothly control direction shifts in which the player wants to see. By utilizing the ability to switch three-dimensional display perspectives, a player can advantageously enhance success in the game by gaining a better angle to attack a jump, navigate a narrow ledge or discover what is around a corner. Thus, a player may achieve a higher score than otherwise would be possible by judicially changing the camera angle.

In accordance with an exemplary embodiment of the present invention, the present video game system automatically changes the apparent moving direction of the camera or modifies the apparent camera angle depending upon the controlled character's circumstance, e.g., is he inside a castle, outside a castle, inside a room, running, flying, swimming, etc. In instances where the game processor detects that, for example, a wall exists between, for example, the player controlled character and a camera point of view, a calculation is made as to the required camera movement to prevent obstruction between the eye of the camera and the operable object. The camera is then moved to a new position in accordance with the calculated moving angle. The camera perspective is automatically changed to select the best camera angle according to the character's circumstances so the player can enjoy the visual effects being experienced in a three-dimensional world.

A wide range of animation effects and character control techniques are contemplated by the video methodology in accordance with the exemplary embodiments of the present invention. For example, the controlled character's pace may be varied between walking by slight controller joystick movement or running through a greater angular displacement of the joystick, while at the same time controlling the direction of the character's movement over 360 degrees in the three-dimensional world. A player controlled character's movement is also controlled as a function of the surface topography on which he stands. For example, a character's moving speed changes depending upon whether the character is standing on a horizontal upwardly or downwardly inclined plane. Speed changes also are controlled as a function of a surface's coefficient of friction, e.g. a surface having little traction, such as ice or snow, or a surface having more traction, such as grass. A player controlled character may be controlled in a multitude of different ways utilizing the combination of the joystick and/or cross-switch and/or control keys. The interpretation given to the depression of a particular control key is dependent upon the state and position of a character in the three-dimensional world. For example, if Mario is in a still or static state, by manipulating the joystick, the character will be controlled to run. However, if a control key, referred to as the "Z" button is depressed, prior to the joystick being manipulated, the character is displayed as crouching. Further joystick manipulation will then cause the character to appear to crawl. If the Z button is pressed not from a still position, but rather after Mario has been controlled to jump as a result of pushing the A button, then Mario will pound the ground rather than crouch as described above.

The player controlled character can be controlled to perform consecutive jumps, consecutive kicks, backwards somersaults, long jumps, etc. Moreover, the character responds to environmental conditions such as the wind, the presence of noxious gas (which will trigger a coughing sequence) and numerous other effects which simulate realistic environmental reactions. Realistic animation is further simulated by controlling the player controlled character's body orientation while the character is in motion. For example, if the character is runining fast, the character's upper body tilts forward. On the other hand, if the character is turning in one direction or another, the character's upper body is displayed as tilting towards the turn.

In accordance with another embodiment of the present invention, the number of polygons utilized to display a player-controlled character is modified depending upon the speed of movement of the character, whereby the number of polygons is reduced at higher speed. At low level speeds, the character is drawn with a predetermined number of polygons and at higher level speeds the character is drawn with a reduced number of polygons, except that the polygons used for drawing the face remains the same as at the first level speed. In this fashion the character is simulated in a manner designed to appear to be most realistic to the user, who is more likely to focus on the character face, rather than the body during animated character motion.

BRIEF DESCRIPTION OF THE DRAWINGS

These and other features and advantages of the present invention will be better and more completely understood by referring to the following detailed description of a presently preferred exemplary embodiment in connection with the drawings, of which:

FIGS. 3A, 3B and 3C is an exemplary, more detailed, implementation of the vide game console and cartridge as shown in the FIG. 2 block diagram;

FIGS. 23F–L exemplify screen displays which may be generated by a player actuating one of the FIGS. 6 control keys to initiate a change in camera perspective;

FIGS. 27C–27J show various exemplary player controller initiated animation effects;

FIGS. 33A and 33B are diagrams relating the amount of physical tilt of the controller joystick in a coordinate system; and FIGS. 34A and 34B exemplify screen effects relating joystick resetting.

DETAILED DESCRIPTION OF EXEMPLARY EMBODIMENT

Figure 1:
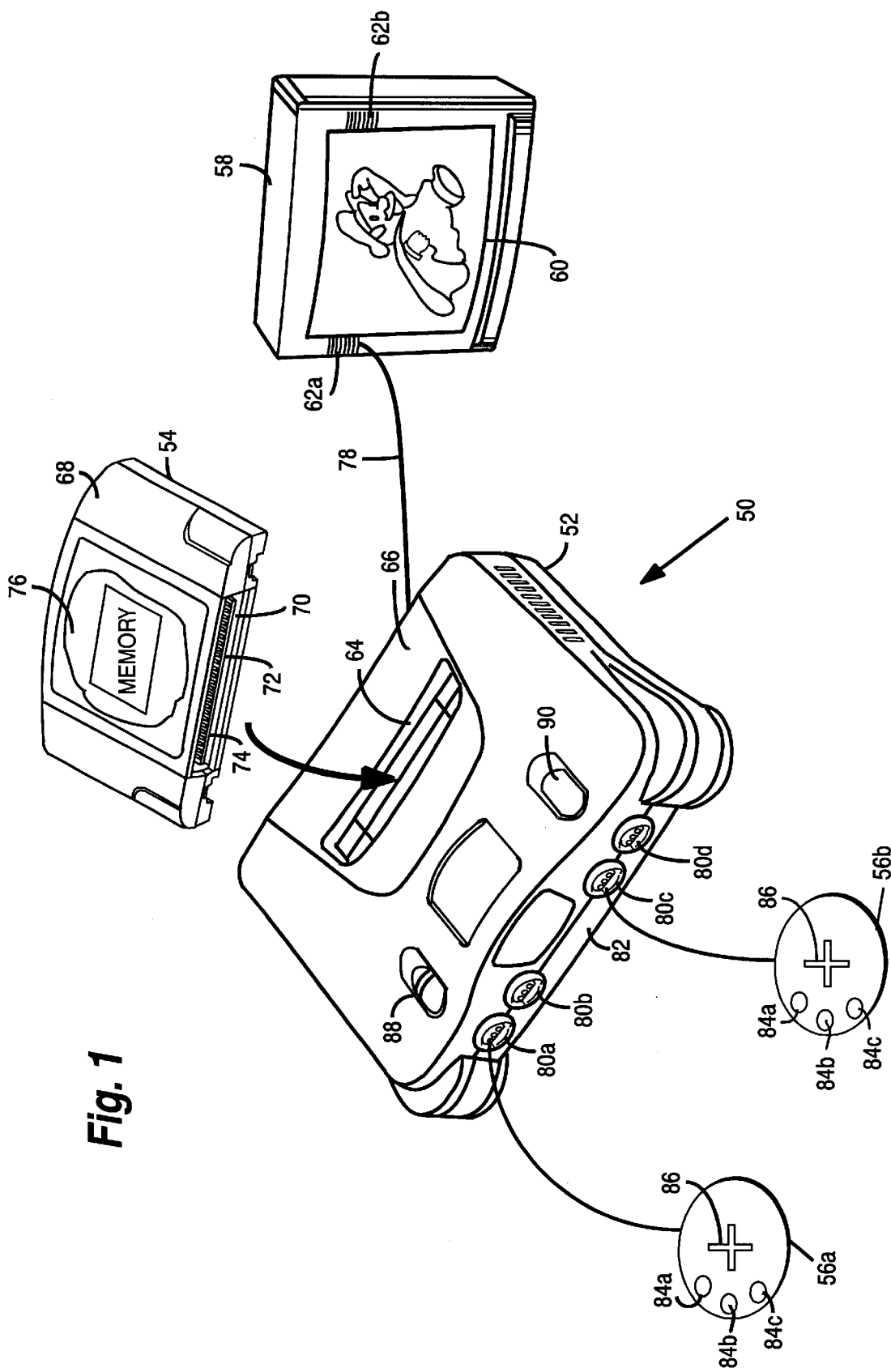
FIG. 1 is a perspective view of an exemplary embodiment of a video game system in accordance with the present invention.

FIG. 1 shows an exemplary embodiment of a video game system 50 on which the video game methodology of the present invention, which is described in detail below, may be performed invention. Illustrative video game system 50 includes a main console 52, a video game storage device 54, and handheld controllers 56a,b (or other user input devices). Video game storage device 54 includes a read-only memory 76 storing a video game program, which in the presently preferred illustrative implementation of the present invention is the commercially available video game entitled "Super Mario 64". Main console 52 is connected to a conventional home color television set 58. Television set 58 displays 3D video game images on its television screen 60 and reproduces stereo sound through its speakers 62a,b.

In the illustrative embodiment, the video game storage device 54 is in the form of a replaceable memory cartridge insertable into a slot 64 on a top surface 66 of console 52. A wide variety of alternative program storage media are contemplated by the present invention such as CD ROM, floppy disk, etc. In this exemplary embodiment, video game storage device 54 comprises a plastic housing 68 encasing a printed circuit board 70. Printed circuit board 70 has an edge 72 defining a number of electrical contacts 74. When the video game storage device 68 is inserted into main console slot 64, the cartridge electrical contacts 74 mate with corresponding "edge connector" electrical contacts within the main console. This action electrically connects the storage device printed circuit board 72 to the electronics within main console 52. In this example, at least a "read only memory" chip 76 is disposed on printed circuit board 70 within storage device housing 68. This "read only memory" chip 76 stores instructions and other information pertaining to a particular video game. The read only memory chip 76 for one game cartridge storage device 54 may, for example, contain instructions and other information for an adventure game while another storage device 54 may contain instructions and information to play a car race game, an educational game, etc. To play one game as opposed to another game, the user of video game system 60 need only plug the appropriate storage device 54 into main console slot 64—thereby connecting the storage device's read only memory chip 76 (and any other circuitry it may contain) to console 52. This enables a computer system embodied within console 52 to access the information contained within read only memory 76, which information controls the console computer system to play the appropriate video game by displaying images and reproducing sound on color television set 58 as specified under control of the read only memory game program information.

To set up the video game system 50 for game play, the user first connects console 52 to color television set 58 by hooking a cable 78 between the two. Console 52 produces both "video" signals and "audio" signals for controlling color television set 58. The "video" signals control the images displayed on the television screen 60 and the "audio" signals are played back as sound through television loudspeaker 62. Depending on the type of color television set 58, it may be necessary to connect a conventional "RF modulator" between console 52 and color television set 58. This "RF modulator" (not shown) converts the direct video and audio outputs of console 52 into a broadcast type television signal (e.g., for a television channel 2 or 3) that can be received and processed using the television set's internal "tuner." Other conventional color television sets 58 have direct video and audio input jacks and therefore don't need this intermediary RF modulator.

The user then needs to connect console 52 to a power source. This power source may comprise a conventional AC adapter (not shown) that plugs into a standard home electrical wall socket and converts the house voltage into a lower voltage DC signal suitable for powering console 52. The user may then connect up to 4 hand controllers 56a, 56b to corresponding connectors 80a–80d on main unit front panel 82. Controllers 56, which are only schematically represented in FIG. 1 may take a variety of forms. In this example, the controllers 56a,b include various function controlling push buttons such as 84a–c and X-Y switches 86a,b used, for example, to specify the direction (up, down, left or right) that a player controllable character displayed on television screen 60 should move. Other controller possibilities include joysticks, mice pointer controls and a wide range of other conventional user input devices. In the presently preferred implementation of the present invention, the unique controller described below in conjunction with FIGS. 6 through 9 and in incorporated parent application Ser. No. 08/719,019 (the '019 application).

The present system has been designed to accommodate expansion to incorporate various types of peripheral devices yet to be specified. This is accomplished by incorporating a programmable peripheral device input/output system described in detail in the '288 application which permits device type and status to be specified by program commands.

In use, a user selects a storage device 54 containing a desired video game, and inserts that storage device into console slot 64 (thereby electrically connecting read only memory 76 and other cartridge electronics to the main console electronics). The user then operates a power switch 88 to turn on the video game system 50 and operates controllers 56 (depending on the particular video game being played, up to four controllers for four different players can be used with the illustrative console) to provide inputs to console 52 and thus control video game play. For example, depressing one of push buttons 84a–c may cause the game to start playing. Moving directional switch 86 or the joystick 45 shown in FIG. 6 may cause animated characters to move on the television screen 60 in controllably different directions. Depending upon the particular video game stored within the storage device 54, these various controls 84, 86 on the controller 56 can perform different functions at different times. If the user wants to restart game play from the beginning, or alternatively with certain game programs reset the game to a known continuation point, the user can press a reset button 90.

Figure 2:
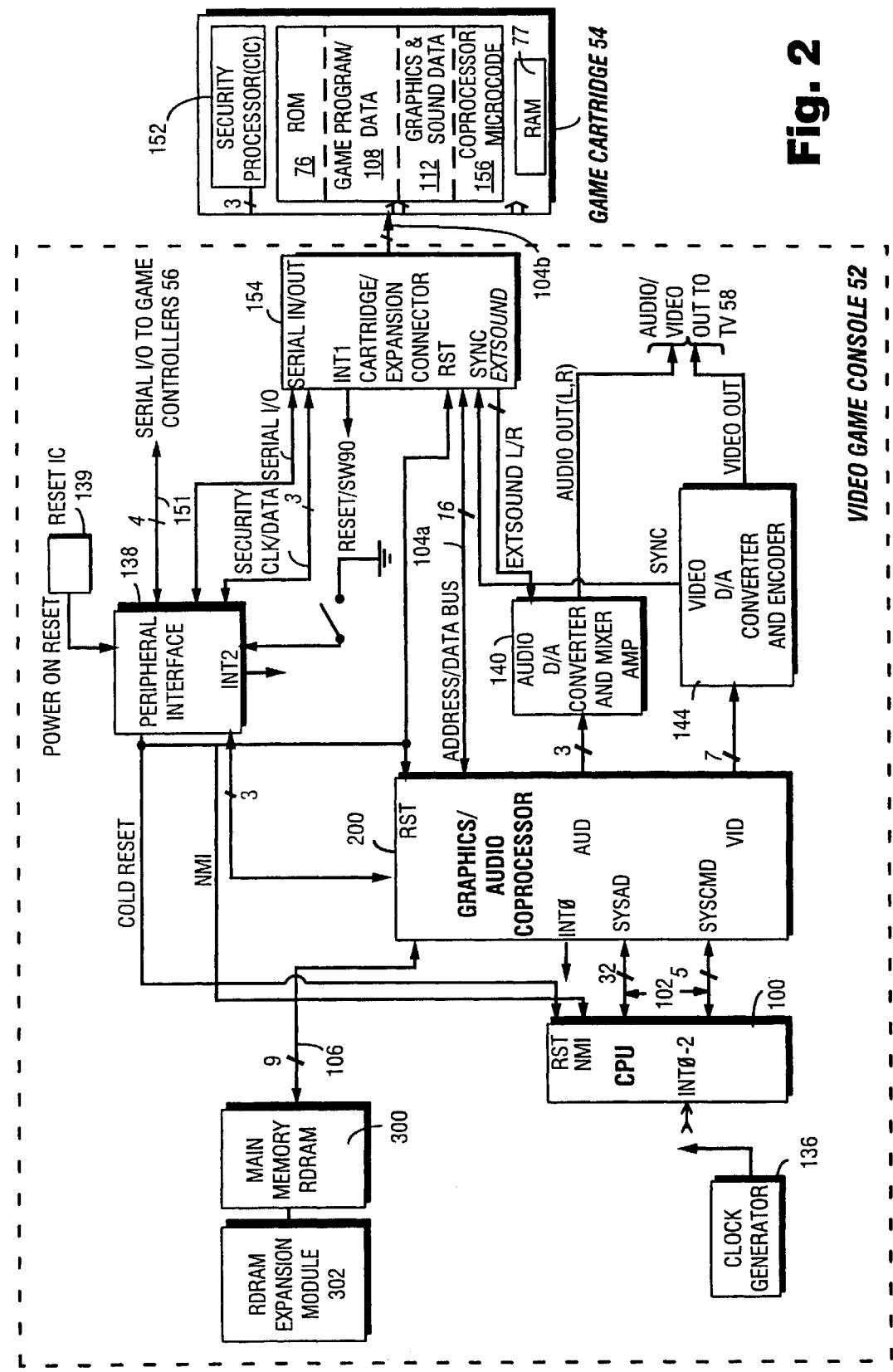
FIG. 2 is a block diagram of a video game console and game cartridge shown in FIG. 1.

FIG. 2 is a block diagram of an illustrative embodiment of console 52 coupled to a game cartridge 54 and shows a main processor 100, a coprocessor 200, and main memory 300 which may include an expansion module 302. Main processor 100 is a computer that executes the video game program within storage device 54. In this example, the main processor 100 accesses this video game program through the coprocessor 200 over a communication path 102 between the main processor and the coprocessor 200, and over another communication path 104a,b between the coprocessor and the video game storage device 54. Alternatively, the main processor 100 can control the coprocessor 200 to copy the video game program from the video game storage device 54 into main memory 300 over path 106, and the main processor 100 can then access the video game program in main memory 300 via coprocessor 200 and paths 102, 106. Main processor 100 accepts inputs from game controllers 56 during the execution of the video game program.

Main processor 100 generates, from time to time, lists of instructions for the coprocessor 200 to perform. Coprocessor 200, in this example, comprises a special purpose high performance, application specific integrated circuit having an internal design that is optimized for rapidly processing 3D graphics and digital audio information. In the illustrative embodiment, the coprocessor described herein is the product of a joint venture between Nintendo Company Limited and Silicon Graphics, Inc. For further details of exemplary coprocessor hardware and software beyond that expressly disclosed in the present application, reference is made to copending application Ser. No. 08/561,718, naming Van Hook et al as inventors of the subject matter claimed therein, which is entitled "High Performance Low Cost Video Game System With Coprocessor Providing High Speed Efficient 3D Graphics and Digital Audio Signal Processing" filed on Nov. 22, 1995, which application is expressly incorporated herein by reference. The present invention is not limited to use with the above-identified coprocessor. Any compatible coprocessor which supports rapid processing of 3D graphics and digital audio may be used herein. In response to instruction lists provided by main processor 100 over path 102, coprocessor 200 generates video and audio outputs for application to color television set 58 based on data stored within main memory 300 and/or video game storage device 54.

FIG. 2 also shows that the audio video outputs of coprocessor 200 are not provided directly to television set 58 in this example, but are instead further processed by external electronics outside of the coprocessor. In particular, in this example, coprocessor 200 outputs its audio and video information in digital form, but conventional home color television sets 58 require analog audio and video signals. Therefore, the digital outputs of coprocessor 200 must be converted into analog form—a function performed for the audio information by DAC and mixer amp 40 and for the video information by VDAC and encoder 144. The analog audio signals generated in DAC 140 are amplified and filtered by an audio amplifier therein that may also mix audio signals generated externally of console 52 via the EXT-SOUND L/R signal from connector 154. The analog video signals generated in VDAC 144 are provided to a video encoder therein which may, for example, convert "RGB" inputs to composite video outputs compatible with commercial TV sets. The amplified stereo audio output of the amplifier in ADAC and mixer amp 140 and the composite video output of video DAC and encoder 144 are provided to directly control home color television set 58. The composite synchronization signal generated by the video digital to analog converter in component 144 is coupled to its video encoder and to external connector 154 for use, for example, by an optional light pen or photogun.

FIG. 2 also shows a clock generator 136 (which, for example, may be controlled by a crystal 148 shown in FIG. 3A) that produces timing signals to time and synchronize the other console 52 components. Different console components require different clocking frequencies, and clock generator 136 provides suitable such clock frequency outputs (or frequencies from which suitable clock frequencies can be derived such as by dividing).

In this illustrative embodiment, game controllers 56 are not connected directly to main processor 100, but instead are connected to console 52 through serial peripheral interface 138. Serial peripheral interface 138 demultiplexes serial data signals incoming from up to four or five game controllers 56 (e.g., 4 controllers from serial I/O bus 151 and 1 controller from connector 154) and provides this data in a predetermined format to main processor 100 via coprocessor 200. Serial peripheral interface 138 is bidirectional, i.e., it is capable of transmitting serial information specified by main processor 100 out of front panel connectors 80a–d in addition to receiving serial information from those front panel connectors. The serial interface 138 receives main memory RDRAM data, clock signals, commands and sends data/responses via a coprocessor serial interface (not shown). I/O commands are transmitted to the serial interface 138 for execution by its internal processor as will be described below. In this fashion, the peripheral interface's processor (250 in FIG. 5) by handling I/O tasks, reduces the processing burden on main processor 100. As is described in more detail below in conjunction with FIG. 5, serial peripheral interface 138 also includes a "boot ROM (read only memory)" that stores a small amount of initial program load (IPL) code. This IPL code stored within the peripheral interface boot ROM is executed by main processor 100 at time of startup and/or reset to allow the main processor to begin executing game program instructions 108 within storage device 54. The initial game program instructions 108 may, in turn, control main processor 100 to initialize the drivers and controllers it needs to access main memory 300.

In this exemplary embodiment, serial peripheral interface 138 includes a processor (see 250 in FIG. 5) which, in addition to performing the I/O tasks referred to above, also communicates with an associated security processor 152 within storage device 54. This pair of security processors (one in the storage device 54, the other in the console 52) performs, in cooperation with main processor 100, an authentication function to ensure that only authorized storage devices may be used with video game console 52.

Figure 3B:
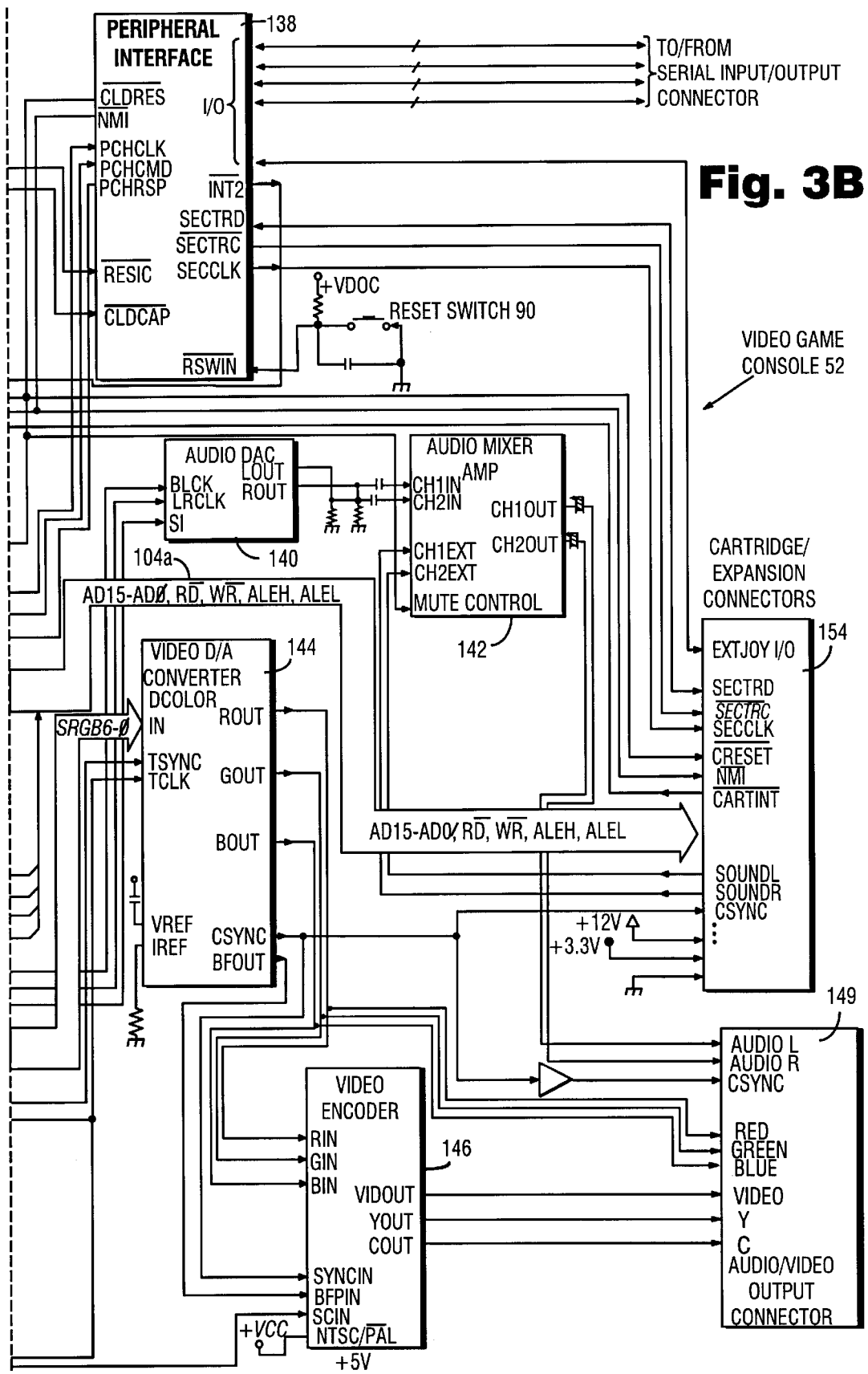

As shown in FIG. 2, peripheral interface 138 receives a power-on reset signal from reset IC 139. The reset circuitry embodied in console 52 and timing signals generated by the circuitry are shown in FIGS. 3A and 3B of the incorporated '288 application.

FIG. 2 also shows a connector 154 within video game console 52. In this illustrative embodiment, connector 154 connects, in use, to the electrical contacts 74 at the edge 72 of storage device printed circuit board 70. Thus, connector 154 electrically connects coprocessor 200 to storage device ROM 76. Additionally, connector 154 connects the storage device security processor 152 to main unit serial peripheral interface 138. Although connector 154 in the particular example shown in FIG. 2 may be used primarily to read data and instructions from a non-writable read only memory 76, system 52 is designed so that the connector is bidirectional, i.e., the main unit can send information to the storage device 54 for storage in random access memory 77 in addition to reading information from it. Further details relating to accessing information for the storage device 54 are contained in the incorporated '288 application in conjunction with its description of FIGS. 12 through 14 therein.

Main memory 300 stores the video game program in the form of CPU instructions 108. All accesses to main memory 300 are through coprocessor 200 over path 106. These CPU instructions are typically copied from the game program/data 108 stored in storage device 54 and downloaded to RDRAM 300. This architecture is likewise readily adaptable for use with CD ROM or other bulk media devices. Although CPU 100 is capable of executing instructions directly out of storage device ROM 76, the amount of time required to access each instruction from the ROM is much greater than the time required to access instructions from main memory 300. Therefore, main processor 100 typically copies the game program/data 108 from ROM 76 into main memory 300 on an as-needed basis in blocks, and accesses the main memory 300 in order to actually execute the instructions. Memory RD RAM 300 is preferably a fast access dynamic RAM capable of achieving 500 Mbytes/second access times such as the DRAM sold by RAMBUS, Inc. The memory 300 is coupled to coprocessor 200 via a unified nine bit wide bus 106, the control of which is arbitrated by coprocessor 200. The memory 300 is expandable by merely plugging, for example, an 8 Mbyte memory card into console 52 via a console memory expansion port (not shown).

As described in the copending Van Hook et al application, the main processor 100 preferably includes an internal cache memory (not shown) used to further decrease instruction access time. Storage device 54 also stores a database of graphics and sound data 112 needed to provide the graphics and sound of the particular video game. Main processor 100, in general, reads the graphics and sound data 112 from storage device 54 on an as-needed basis and stores it into main memory 300 in the form of texture data, sound data and graphics data. In this example, coprocessor 200 includes a display processor having an internal texture memory into which texture data is copied on an as-needed basis for use by the display processor.

As described in the copending Van Hook et al application, storage device 54 also stores coprocessor microcode 156. In this example, a signal processor within coprocessor 200 executes a computer program in order to perform its various graphics and audio functions. This computer program, called the "microcode," is provided by storage device 54. Typically, main processor 100 copies the microcode 156 into main memory 300 at the time of system startup, and then controls the signal processor to copy parts of the microcode on an as-needed basis into an instruction memory within signal processor for execution. Because the microcode 156 is provided by storage device 54, different storage devices can provide different microcodes—thereby tailoring the particular functions provided by coprocessor 200 under software control. Because the microcode 156 is typically too large to fit into the signal processor's internal instruction memory all at once, different microcode pages or portions may need to be loaded from main memory 300 into the signal processor's instruction memory as needed. For example, one part of the microcode 156 may be loaded into signal processor 400 for graphics processing, and another part of microcode may be loaded for audio processing. See the above-identified Van Hook related application for further details relating to an illustrative signal processor, and display processor embodied within the coprocessor as well as the various data bases maintained in RD RAM 300.

Although not shown in FIG. 2, as described in the copending Van Hook et al application, coprocessor 200 also includes a CPU interface, a serial interface, a parallel peripheral interface, an audio interface, a video interface, a main memory DRAM controller/interface, a main internal bus and timing control circuitry. The coprocessor main bus allows each of the various main components within coprocessor 200 to communicate with one another. The CPU interface is the gateway between main processor 100 and coprocessor 200. Main processor 100 reads data to and writes data from coprocessor CPU interface via a CPU-to-coprocessor bus. A coprocessor serial interface provides an interface between the serial peripheral interface 138 and coprocessor 200, while coprocessor parallel peripheral interface 206 interfaces with the storage device 54 or other parallel devices connected to connector 154.

A coprocessor audio interface reads information from an audio buffer within main memory 300 and outputs it to audio DAC 140. Similarly, a coprocessor video interface reads information from an RDRAM frame buffer and then outputs it to video DAC 144. A coprocessor DRAM controller/interface is the gateway through which coprocessor 200 accesses main memory 300. The coprocessor timing circuitry receives clocking signals from clock generator 136 and distributes them (after appropriate dividing as necessary) to various other circuits within coprocessor 200.

Main processor 100 in this example is a MIPS R4300 RISC microprocessor designed by MIPS Technologies, Inc., Mountain View, Calif. For more information on main processor 100, see, for example, Heinrich, MIPS Microprocessor R4000 User's Manual (MIPS Technologies, Inc., 1984, Second Ed.).

As described in the copending Van Hook et al application, the conventional R4300 main processor 100 supports six hardware interrupts, one internal (timer) interrupt, two software interrupts, and one non-maskable interrupt (NMI). In this example, three of the six hardware interrupt inputs (INT0, INT1 and INT2) and the non-maskable interrupt (NMI) input allow other portions of system 50 to interrupt the main processor. Specifically, main processor INT0 is connected to allow coprocessor 200 to interrupt the main processor, the main processor interrupt INT1 is connected to allow storage device 54 or other external devices to interrupt the main processor, and main processor interrupts INT2 and NMI are connected to allow the serial peripheral interface 138 to interrupt the main processor. Any time the processor is interrupted, it looks at an internal interrupt register to determine the cause of the interrupt and then may respond in an appropriate manner (e.g., to read a status register or perform other appropriate action). All but the NMI interrupt input from serial peripheral interface 138 are maskable (i.e., the main processor 100 can selectively enable and disable them under software control).

When the video game reset switch 90 is pressed, a non-maskable interrupt signal is generated by peripheral interface circuit 138 and is coupled to main processor 100 as shown in FIG. 2. The NMI signal, however, results in non-maskable, immediate branching to a predefined initialization state. In order to permit the possibility of responding to reset switch 90 actuation by branching, for example, to the current highest game level progressed to, the circuit shown in FIG. 3A of the incorporated '288 application is preferably used.

In operation, as described in detail in the copending Van Hook et al application, main processor 100 receives inputs from the game controllers 56 and executes the video game program provided by storage device 54 to provide game processing, animation and to assemble graphics and sound commands. The graphics and sound commands generated by main processor 100 are processed by coprocessor 200. In this example, the coprocessor performs 3D geometry transformation and lighting processing to generate graphics display commands which the coprocessor then uses to "draw" polygons for display purposes. As indicated above, coprocessor 200 includes a signal processor and a display processor. 3D geometry transformation and lighting is performed in this example by the signal processor and polygon rasterization and texturing is performed by display processor 500. Display processor writes its output into a frame buffer in main memory 300. This frame buffer stores a digital representation of the image to be displayed on the television screen 60. Further circuitry within coprocessor 200 reads the information contained in the frame buffer and outputs it to television 58 for display. Meanwhile, the signal processor also processes sound commands received from main processor 100 using digital audio signal processing techniques. The signal processor writes its digital audio output into main memory 300, with the main memory temporarily "buffering" (i.e., storing) the sound output. Other circuitry in coprocessor 200 reads this buffered sound data from main memory 300 and converts it into electrical audio signals (stereo, left and right) for application to and reproduction by television 58.

More specifically, main processor 100 reads a video game program 108 stored in main memory 300. In response to executing this video game program 108, main processor 100 creates a list of commands for coprocessor 200. This command list, in general, includes two kinds of commands: graphics commands and audio commands. Graphics commands control the images coprocessor 200 generates on TV set 58. Audio commands specifing the sound coprocessor 200 causes to be reproduced on TV loudspeakers 62. The list of graphics commands may be called a "display list" because it controls the images coprocessor 200 displays on the TV screen 60. A list of audio commands may be called a "play list" because it controls the sounds that are played over loudspeaker 62. Generally, main processor 100 specifies both a display list and a play list for each "frame" of color television set 58 video.

In this example, main processor 100 provides its display/play list 110 to coprocessor 200 by copying it into main memory 300. Main processor 100 also arranges for the main memory 300 to contain a graphics and audio database that includes all that the data coprocessor 200 needs to generate graphics and audio requested in the display/play list 110. For example, main processor 100 may copy the appropriate graphics and audio data from storage device read only memory 76 into the graphics and audio database within main memory 300. Main processor 100 tells coprocessor 200 where to find the display/play list 110 it has written into main memory 300, and that display/play list 110 may specify which portions of graphics and audio database 112 the coprocessor 200 should use.

The coprocessor's signal processor reads the display/play list 110 from main memory 100 and processes this list (accessing additional data within the graphics and audio database as needed). The signal processor generates two main outputs: graphics display commands for further processing by display processor; and audio output data for temporary storage within main memory 300. Once signal processor 400 writes the audio output data into main memory 300, another part of the coprocessor 200 called an "audio interface" (not shown) reads this audio data and outputs it for reproduction by television loudspeaker 62.

The signal processor can provide the graphics display commands directly to display processor over a path internal to coprocessor 200, or it may write those graphics display commands into main memory 300 for retrieval from the main memory by the display processor. These graphics display commands command display processor to draw ("render") specified geometric images on television screen 60. For example, display processor can draw lines, triangles or rectangles based on these graphics display commands, and may fill triangles and rectangles with particular textures (e.g., images of leaves of a tree or bricks of a brick wall such as shown in the exemplary screen displays in FIGS. 4A through F) stored within main memory 300—all as specified by the graphics display command. It is also possible for main processor 100 to write graphics display commands directly into main memory 300 so as to directly command the display processor. The coprocessor display processor generates, as output, a digitized representation of the image that is to appear on television screen 60.

This digitized image, sometimes called a "bit map," is stored (along with "depth or Z" information) within a frame buffer residing in main memory 300 of each video frame displayed by color television set 58. Another part of coprocessor 200 called the "video interface" (not shown) reads the frame buffer and converts its contents into video signals for application to color television set 58.

Each of FIGS. 4A–4F was generated using a three-dimensional model of a "world" that represents a castle on a hilltop. In the present illustrative embodiment of the present invention, the castle serves as the focal point of a three-dimensional world in which a player controlled character such as the well-known "Mario" may freely explore its exterior, interior and enter the many courses or worlds hidden therein. The FIGS. 4A–4F model are made up of geometric shapes (i.e., lines, triangles, rectangles) and "textures" (digitally stored pictures) that are "mapped" onto the surfaces defined by the geometric shapes. System 50 sizes, rotates and moves these geometric shapes appropriately, "projects" them, and puts them all together to provide a realistic image of the three-dimensional world from any arbitrary viewpoint. System 50 can do this interactively in real time response to a person's operation of game controllers 86 to present different points of view or, as referred to herein, "camera" angles of the three-dimensional world.

FIGS. 4A–4C and 4F show aerial views of the castle from four different viewpoints. Notice that each of the views is in perspective. System 50 can generate these views (and views in between) interactively with little or no discernible delay so it appears as if the video game player is actually flying over the castle.

Figure 4A:
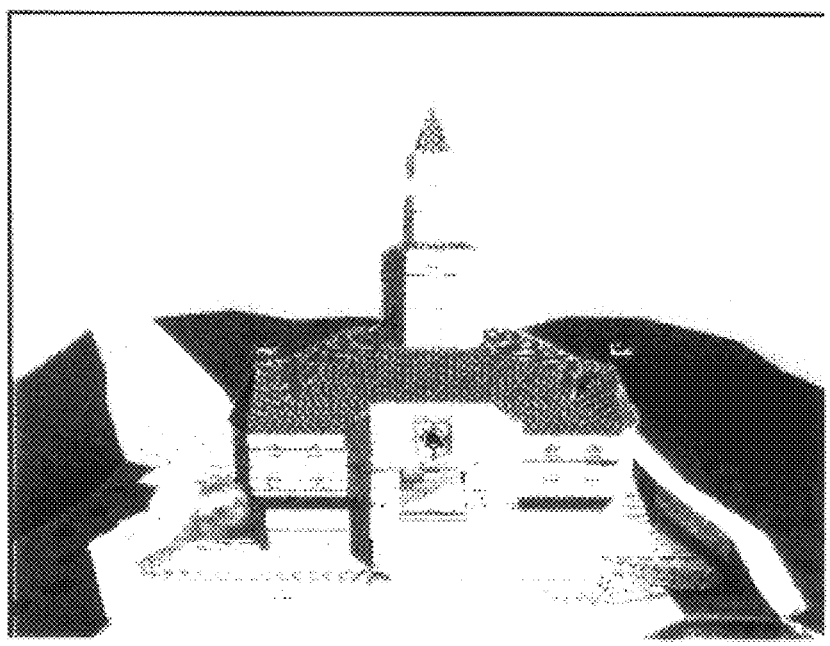
FIGS. 4A–F show exemplary 3D screen effects achievable using the system described herein.
Figure 4B:
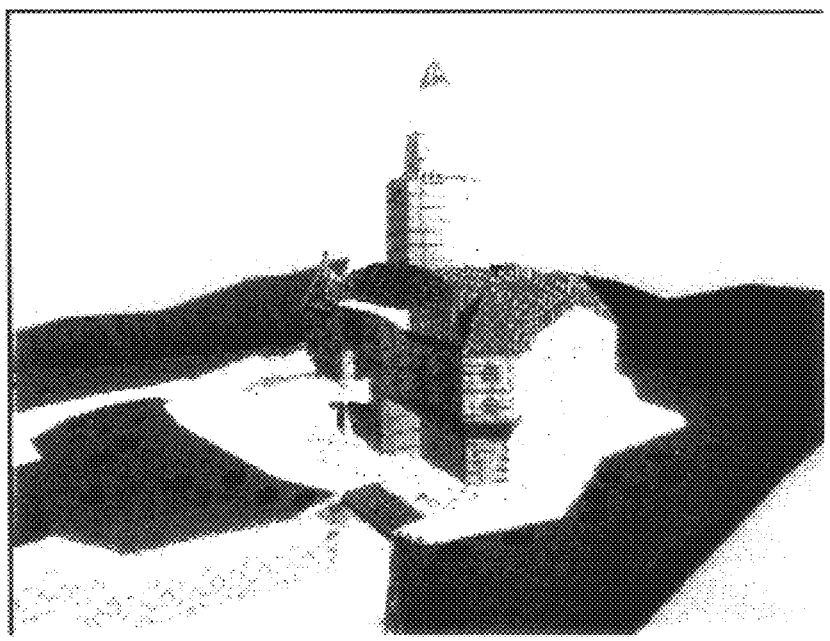
Figure 4C:
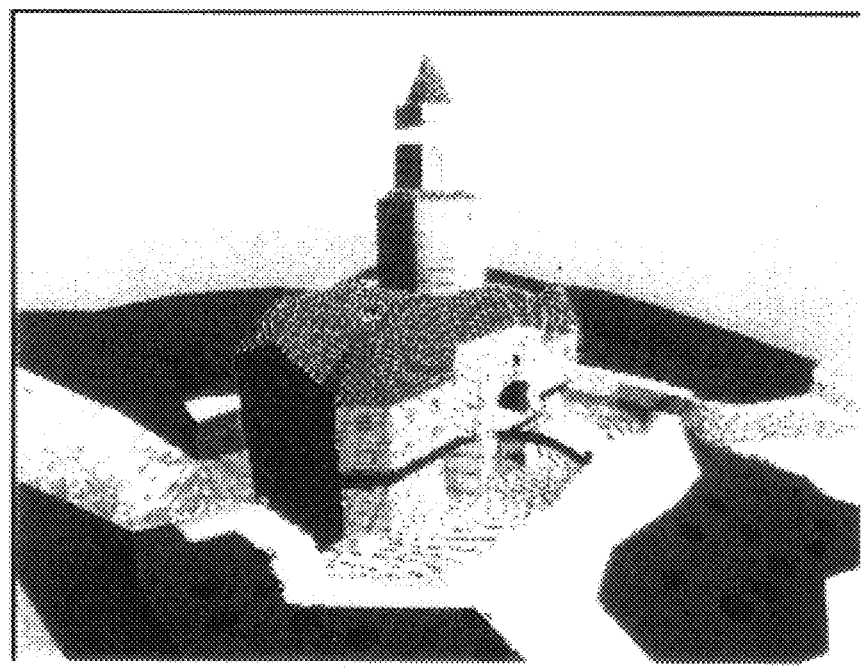
Figure 4D:
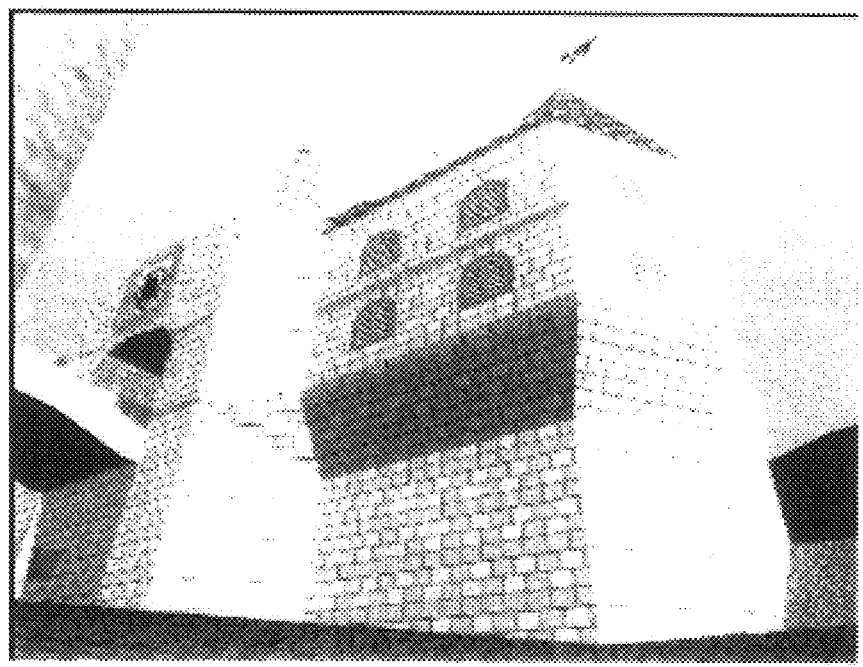
Figure 4E:
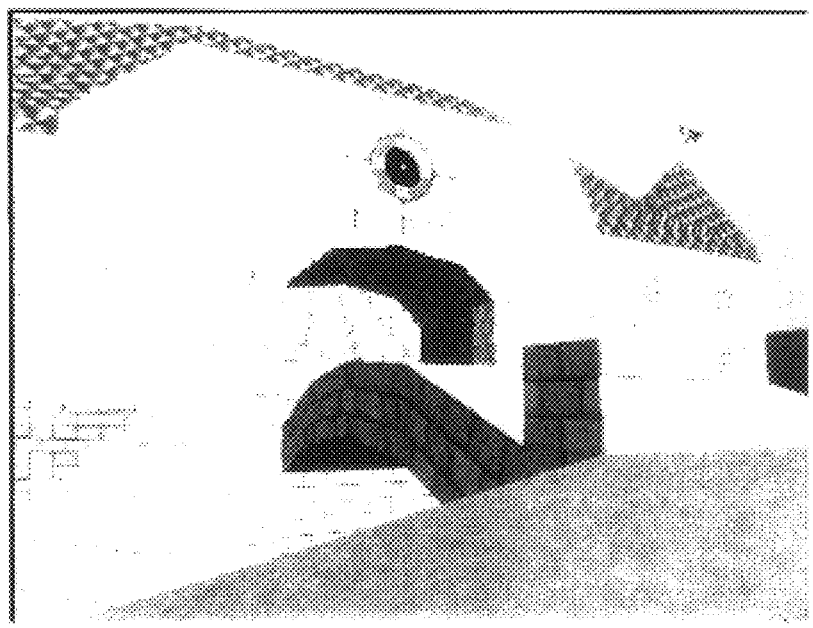
Figure 4F:
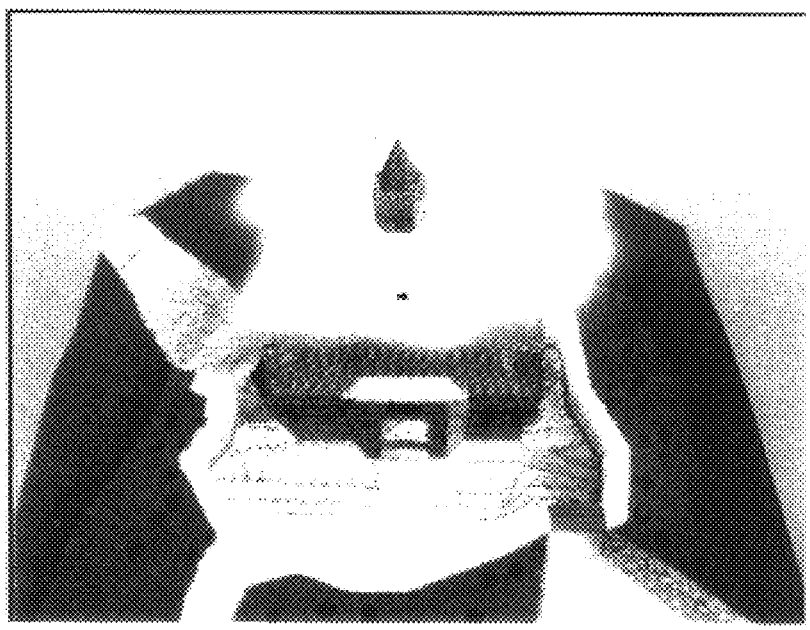

FIGS. 4D and 4E show views from the ground looking up at or near the castle main gate. System 50 can generate these views interactively in real time response to game controller inputs commanding the viewpoint to "land" in front of the castle, and commanding the "virtual viewer" (i.e., the imaginary person moving through the 3-D world through whose eyes the scenes are displayed) to face in different directions. FIG. 4D shows an example of "texture mapping" in which a texture (picture) of a brick wall is mapped onto the castle walls to create a very realistic image.

FIGS. 3A and 3B comprise an exemplary more detailed implementation of the FIG. 2 block diagram. Components in FIGS. 3A and 3B, which are identical to those represented in FIG. 2, are associated with identical numerical labels. Many of the components shown in FIGS. 3A and 3B have already been described in conjunction with FIG. 2 and further discussion of these components is not necessary.

FIGS. 3A and 3B show the interface between system components and the specific signals received on device pins in greater lo detail than shown in FIG. 2. To the extent that voltage levels are indicated in FIGS. 3A and 3B, VDD represents +3.3 volts and VCC represents +5 volts.

Focusing first on peripheral interface 138 in FIG. 3B, reset related signals such as CLDRES, NMI, RESIC, CLD-CAP and RSWIN are described in the incorporated '288 application. Three coprocessor 200/peripheral interface 138 communication signals are shown: PCHCLK, PCHCMD, and PCHRSP. These signals are transmitted on 3 bit wide peripheral interface channel bus as shown in FIGS. 2, 3A and 3B. The clock signal PCHCLK is used for timing purposes to trigger sampling of peripheral interface data and commands. The clock signal is transmitted from the coprocessor 200 to the peripheral interface 138.

Coprocessor 200 and CPU 100, based on the video game program store in storage device 54, supply commands for the peripheral interface 138 to perform on the PCHCMD control line. The command includes a start bit field, a command code field and data or other information.

The peripheral interface circuitry as described in more detail in the incorporated '288 application decodes the command and, if the data is ready in response to the command, sends a PCHRSP response signal comprising an acknowledge signal "ACK" followed by the response data. Approximately two clock pulses after the peripheral interface 138 generates the acknowledgment signal ACK, data transmission begins. Data received from the peripheral interface 138 may be information/instructions stored in the boot ROM or controller status or controller data, etc. The incorporated '288 application shows representative signals transmitted across the PCHCLK, PCHCMD and PCHRSP lines and describes exemplary signals appearing on the peripheral interface channel for four exemplary commands serving to read 4 bytes into memory, write 4 bytes into memory, execute a peripheral interface macro instruction or write 64 bytes into peripheral interface buffer memory.

Turning back to the FIG. 3B peripheral interface 138, SECCLK, SECTRC and SECTRD are three security related signals coupled between two security processors embodied within the peripheral interface 138 and game cartridge, respectively. SECCLK is a clock signal used to clock security processor operations in both the peripheral interface and the game cartridge. SECTRC is a signal sent from the peripheral interface 138 to the game cartridge defining a data transmission clock signal window in which data is valid and SECTRD is a data transmission bus signal in which data from the peripheral interface 138 and data from the game cartridge security processor are exchanged at times identified by the SECTRD transmission clock pulses. Finally, the peripheral interface 138 includes a pin RSWIN which is the reset switch input pin.

Turning next to connector 154, as previously mentioned, the system 50 includes an expansion capability for adding another controller 56. Data from such a controller would be transmitted via the EXTJOY I/O pin of the connector 154. The three above-mentioned security related signals are coupled between the game cartridge security processor and peripheral interface processor at the pins labeled SECTRD, SECTRC and SECCLK.

The cartridge connector additionally couples a cold reset signal CRESET to the game cartridge security processor to enable a power on reset function. Additionally, if during processor authentication checking, if, for example, the peripheral interface processor does not receive data which matches what is expected, the cartridge processor may be placed in a reset state via the CRESET control pin.

The NMI input is a control pin for coupling an NMI interrupt signal to the cartridge. The control line CARTINT is provided to permit an interrupt signal to be generated from the cartridge to CPU 100 to, for example, if devices are coupled to the cartridge requiring service by CPU 100. By way of example only, a bulk storage device such as a CD ROM is one possible device requiring CPU interrupt service.

As shown in FIG. 3B, the system bus is coupled to the cartridge connector 154 to permit accessing of program instructions and data from the game cartridge ROM and/or bulk storage devices such as CD ROM, etc. In contrast with prior video game systems such as the Nintendo NES and SNES, address and data signals are not separately coupled on different buses to the game cartridge but rather are multiplexed on an address/data 16 bit wide bus. Read and write control signals and address latch enable high and low signals, ALEH and ALEL, respectively are also coupled to the game cartridge. The state of the ALEH and ALEL signals defines the significance of the information transmitted on the 16 bit bus. The read signal RD is a read strobe signal enabling data to be read from the mask ROM or RAM in the game cartridge. The write signal WR is a strobe signal enabling the writing of data from the coprocessor 200 to the cartridge static RAM or bulk media device.

Figure 3C:
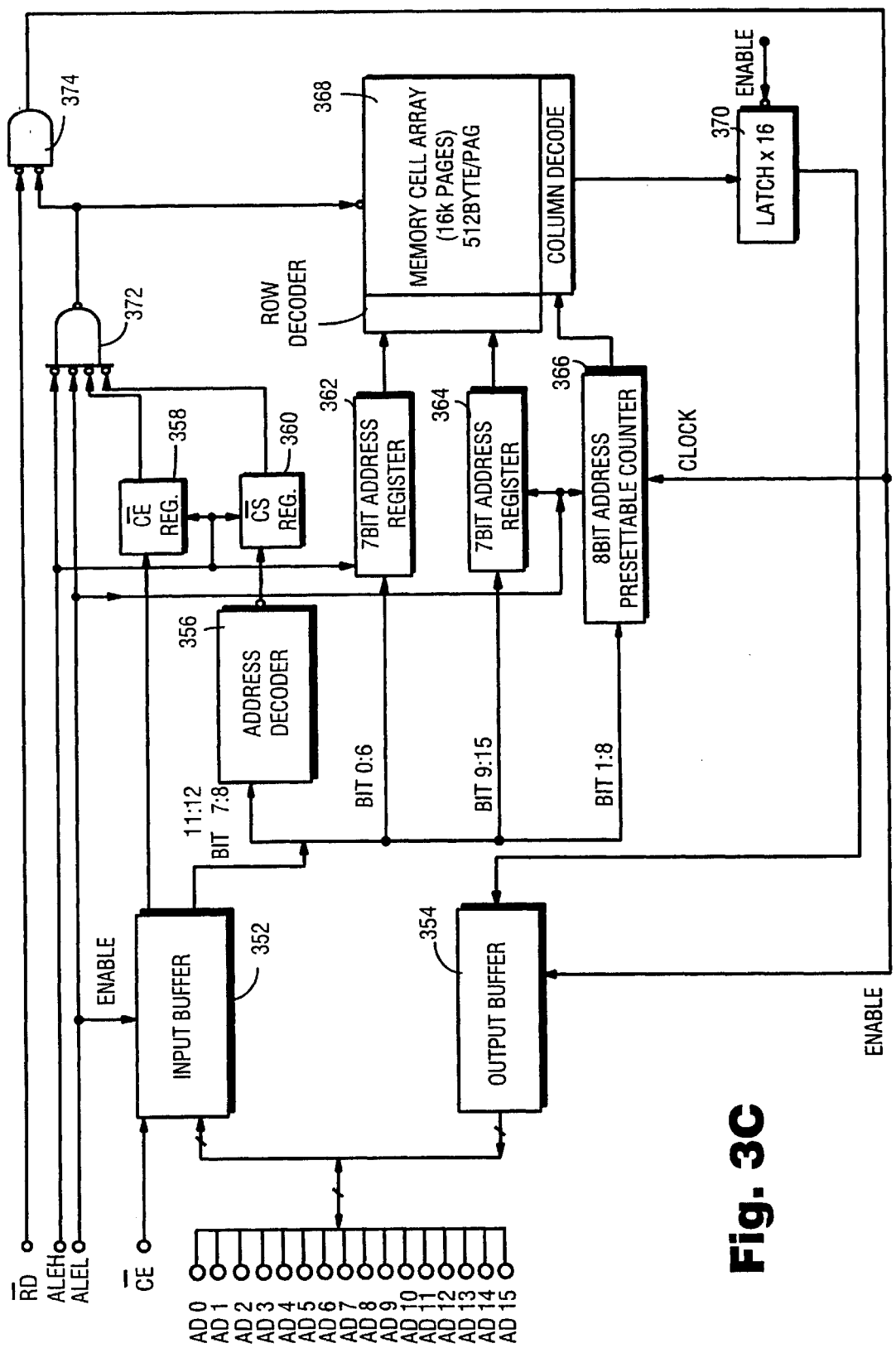

FIG. 3C is a block diagram which demonstrates in detail how the address/data 16 bit bus is utilized to read information from a game cartridge ROM and read and write information from a game cartridge RAM. Coprocessor 200 generates an address latch enable high signal which is input to the ALEH pin in FIG. 3C. Exemplary timing signals for the reading and writing of information are shown in FIGS. 13 and 14 respectively of the incorporated '288 patent application. The coprocessor 200 similarly generates an address latch enable low signal which is coupled to the ALEL pin which, in turn, enables information on address pin 0 to 15 to be loaded into the input buffer 352. Bits 7 and 8 and 11 and 12 from input buffer 352 are, in turn, coupled to address decoder 356. In the exemplary embodiment of the present invention, bits 7, 8 and 11, 12 are decoded by the address decoder to ensure that they correspond to 4 bits indicative of the proper location in the address space for the mask ROM 368. Thus, the mask ROM 368 has a designated location in the AD16 bus memory map and decoder 356 ensures that the mask ROM addressing signals correspond to the proper mask ROM location in this memory map. Upon detecting such correspondence, decoder 356 outputs a signal to one-bit chip select register 360. When ALEH transitions from high to low, as shown in FIG. 3C, bits 0 to 6 output from input buffer 352 are latched into 7 bit address register 362. Simultaneously, data from address decoder 356 is latched into chip select register 360 and register 358 is also enabled, as indicated in FIG. 3C.

When the coprocessor 200 outputs low order address bits on the AD16 bus, the address signals are input to input buffer 352. The bits are coupled in multiple directions. As indicated in FIG. 3C, bits 1 to 8 are set in an 8 bit address presettable counter 366 and bits 9 to 15 are coupled to 7 bit address register 364. At a time controlled by ALEL, when registers 358 and 360 are set and registers 362, 364 and 366 are loaded, the read out of data is ready to be initiated. A time TL is required for data to be output after the ALEL signal transitions from high to low. After the ALEL signal has been generated, a read pulse RD is applied on the pin shown in the top lefthand portion of FIG. 3C. The read signal is input to gate 374 whose other input is coupled to gate 372. When the output of registers 358, 360 and signals ALEL and ALEH are low, then the output of 372 will be low. When RD and the output of 372 are low, the clock signal is generated at the output of 374 thereby causing the counter 366 to be clocked and begin counting and the output buffer 354 to be enabled. The 8 bit address presettable counter determines the memory cell array column selected and the combination of the output of address register 362 and address register 364 defines the memory cell row selected. The output data is temporarily stored in latch 370 and then coupled to output buffer 354. Thereafter, the data is transmitted back to coprocessor 200 via the same 16AD 0 to 15 lines.

By virtue of using the multiplexed AD 0 to 15 bus, the game cartridge pin out is advantageously reduced. The circuitry of FIG. 3C, although designed for accessing a mask ROM, is readily adaptable for writing information into, for example, static RAM. In a static RAM embodiment, the processing of the ALEH and ALEL signals are the same as previously described as is the loading of information in the registers 358, 360, 362, 364 and 366. A write signal is generated and coupled to gate 374 instead of the read signal shown in FIG. 3C. Data is output from coprocessor 200 for writing into a static RAM memory 368. The data is loaded into buffer 352. A clock pulse is generated at the output of gate 374 to cause the address presettable counter to begin counting to cause data to be written into memory 368 rather than read out as previously described. The multiplexed use of the 16 bit address/data bus is described in further detail in conjunction with FIGS. 12–14 of the incorporated '288 patent application.

Sound may be output from the cartridge and/or through connector 154 to the audio mixer 142 channel 1 and channel 2 inputs, CH1EXT and CH2EXT, respectively. The external sound inputs from SOUNDL and SOUNDR will be mixed with the sound output from the coprocessor via the audio DAC 140 and the CH1IN, CH2IN inputs to thereafter output the combined sound signal via the audio mixer outputs CH1OUT, CH2OUT which are, in turn, coupled to the AUDIOL and AUDIOR inputs of the audio video output connector 149 and thereafter coupled to the TV speakers 62a,b.

The connector 154 also receives a composite sync signal CSYNC which is the output of video DAC 144 which is likewise coupled to the audio video output connector 149. The composite sync signal CSYNC, as previously described, is utilized as a synchronization signal for use in synchronizing, for example, a light pen or photogun.

The cartridge connector also includes pins for receiving power supply and ground signals as shown in FIGS. 3B. The +3.3 volts drives, for example, the 16 bit AD bus as well as other cartridge devices. The 12 volt power supply connection is utilized for driving bulk media devices.

Turning to coprocessor 200 in FIG. 3A, many of the signals received or transmitted by coprocessor 200 have already been described, which will not be repeated herein. The coprocessor 200 outputs an audio signal indicating whether audio data is for the left or right channel, i.e., AUDLRCLK. Serial audio data is output on a AUDDATA pin. Timing for the serially transmitted data is provided at the AUDCLK pin. Coprocessor 200 outputs seven video signals SRGB0 through SRGB7 which synchronized RGB digital signals are coupled to video DAC 144 for conversion to analog. Coprocessor 200 generates a timing signal SYNC that controls the timing for the SRGB data which is coupled to the TSYNC input of video DAC 144. Coprocessor 200 receives a video clock input from clock generator 136 via the VCLK input pin for controlling the SRGB signal timing. The coprocessor 200 and CPU 100 use a PVALID SIGNAL to indicate that the processor 100 is driving a valid command or data identifier or valid address/data on the system bus and an EVALID signal to indicate that the coprocessor 200 is driving a valid command or data identifier or valid address/data on the system bus. Coprocessor 200 supplies CPU 100 with master clock pulses for timing operations within the CPU 100. Coprocessor 200 and CPU 100 additionally use an EOK signal for indicating that the coprocessor 200 is capable of accepting a processor 100 command.

Turning to main memory RDRAM 300, 302, as depicted in FIG. 3A, two RDRAM chips 300a and 300b are shown with an expansion RDRAM module 302. As previously described, the main memory RDRAM may be expanded by plugging in a memory module into a memory expansion port in the video console housing. Each RDRAM module 300a,b, 302 is coupled to coprocessor 200 in the same manner. Upon power-up RDRAM 1 (300a) is first initialized, then RDRAM2 (300b) and RDRAM3 (302) are initialized. RDRAM 1 is recognized by coprocessor 200 since its SIN input is tied to VDD, as shown in FIG. 4A. When RD1 is initialized under software control SOUT will be at a high level. The SOUT high level signal is coupled to SIN of RDRAM 2 (300b) which operates to initialize RDRAM2. SOUT will then go to a high level which operates to initialize RDRAM3 (302) (if present in the system).

Each of the RDRAM modules receives bus control and bus enable signals from coprocessor 200. The coprocessor 200 outputs a TXCLK signal when data is to be output to one of RDRAM1 through 3 and a clock signal RXCLK is output when data is to be read out from one of the RDRAM banks. The serial in (SIN) and serial out (SOUT) pins are used during initialization, as previously described. RDRAM receives clock signals from the clock generator 136 output pin FSO.

Clock generator 136 is a three frequency clock signal generator. By way of example, the oscillator within clock generator 136 may be a phase-locked locked loop based oscillator which generates an FSO signal of approximately 250 MHz. The oscillator also outputs a divided version of the FSO signal, e.g., FSO/5 which may be at approximately 50 Mz, which is used for timing operations involving the coprocessor 200 and video DAC 144, as is indicated in FIGS. 3A and 3B. The FSC signal is utilized for timing the video encoder carrier signal. Clock generator 136 also includes a frequency select input in which frequencies may be selected depending upon whether an NTSC or PAL version of the described exemplary embodiment is used. Although the FSEL select signal is contemplated to be utilized for configuring the oscillator for NTSC or PAL use, as shown in FIG. 3A, the input resets the oscillator under power-on reset conditions. When connected to the power on reset, the oscillator reset is released when a predetermined threshold voltage is reached.

Figure 5:
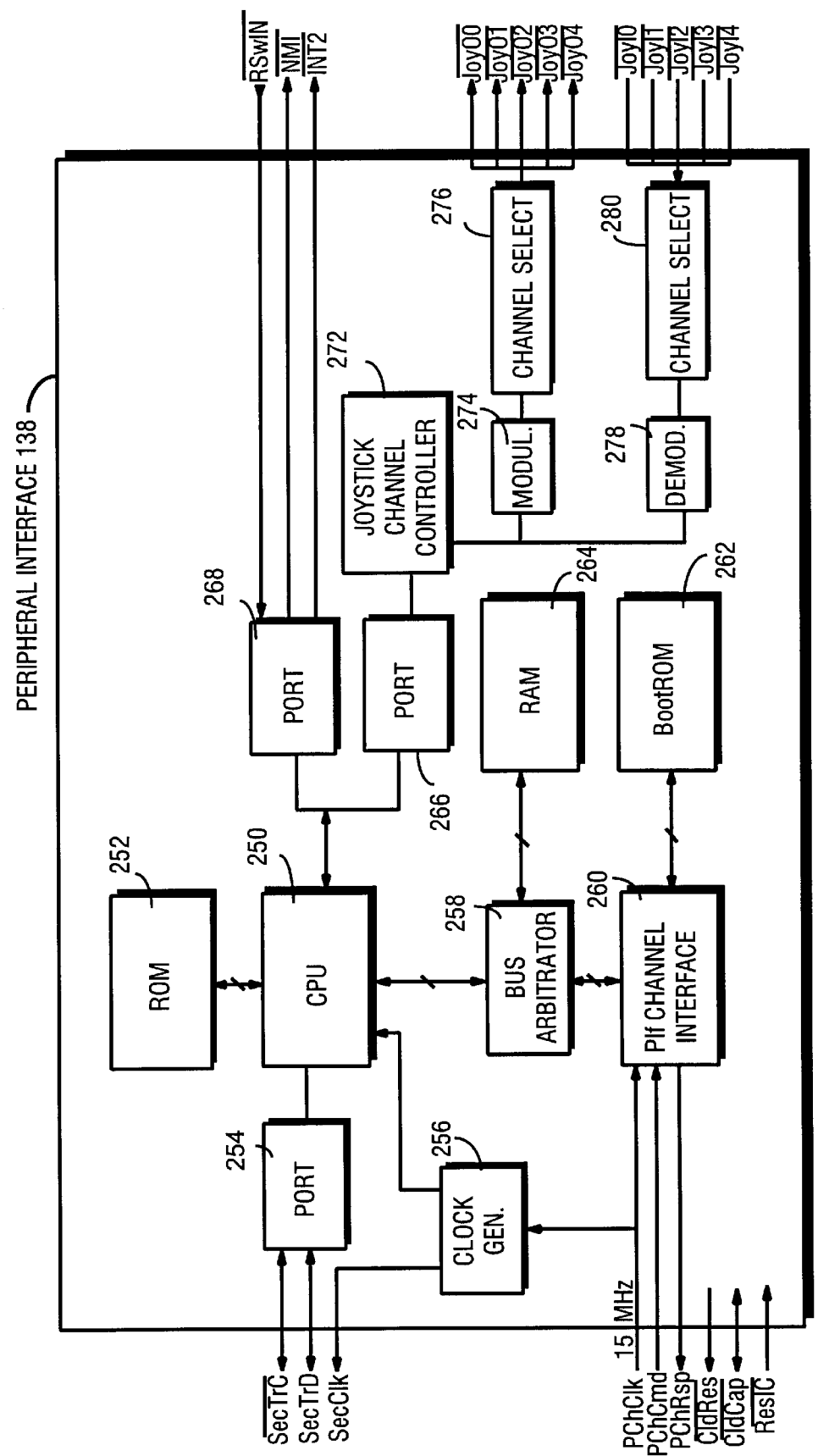
FIG. 5 is a block diagram of the peripheral interface shown in FIG. 2.

FIG. 5, which is shown in further detail in the incorporated '288 application, is a block diagram of peripheral interface 138 shown in FIG. 2. Peripheral interface 138 is utilized for I/O processing, e.g., controlling the game controller 56 input/output processing, and for performing game authenticating security checks continuously during game play. Additionally, peripheral interface 138 is utilized during the game cartridge/coprocessor 200 communication protocol using instructions stored in boot ROM 262 to enable initial game play. Peripheral interface 138 includes CPU 250, which may, for example, be a 4 bit microprocessor of the type manufactured by Sharp Corporation. CPU 250 executes its security program out of program ROM 252. As previously described, the peripheral interface processor 250 communicates with the security processor 152 embodied on the game cartridge utilizing the SECTRC, SECTRD and SECCLK signals. Peripheral interface port 254 includes two 1 bit registers for temporarily storing the SECTRC and SECTRD signals.

Overall system security for authenticating game software is controlled by the interaction of main processor 100, peripheral interface processor 250, boot ROM 262 and cartridge security processor 152. Boot ROM 262 stores a set of instructions executed by processor 100 shortly after power is turned on (and, if desired, upon the depression of reset switch 90). The boot ROM program includes instructions for initializing the CPU 100 and coprocessor 200 via a set of initial program loading instructions (IPL). Authentication calculations are thereafter performed by the main processor 100 and the result is returned to the CPU 250 in peripheral interface 138 for verification. If there is verification, the game program is transferred to the RDRAM, after it has been initialized, and a further authentication check is made. Upon verification of an authentic game program, control jumps to the game program in RDRAM for execution. Continuous authentication calculations continue during game play by the authenticating processor in the peripheral interface 138 and by security processor 152 such as is described, for example, in U.S. Pat. No. 4,799,635 and related U.S. Pat. No. 5,426,762, which patents are incorporated by reference herein.

Turning back to FIG. 5, a PCHCLK clock signal having a frequency of, for example, approximately 15 MHz is input to clock generator 256 which, in turn, supplies an approximately 1 MHz clocking signal to CPU 250 and an approximately 1 MHz clock signal along the line SECCLK for transmission to the game cartridge security processor 152. PIF channel interface 260 responds to PCHCLK and PCHCMD control signals to permit access of the boot ROM 262 and RAM 264 and to generate signals for controlling the interruption of CPU 250, when appropriate.

The PCHCLK signal is the basic clock signal which may, for example, be a 15.2 MHz signal utilized for clocking communication operations between the coprocessor 200 and the peripheral interface 138. The PCHCMD command is utilized for reading and writing from and to RAM 264 and for reading from boot ROM 262. The peripheral interface 138 in turn provides a PCHRSP response which includes both accessed data and an acknowledgment signal.

In the present exemplary embodiment, four commands are contemplated including a read 4 byte from memory command for reading from RAM 264 and boot ROM 262, a write 4 byte memory command for writing to RAM 264, a PIF macro command for reading 64 bytes from buffer 264 and accessing control/data from the joystick based player controller (also referred to as the JoyChannel). The CPU 250 is triggered to send or receive JoyChannel data by the PIF macro instruction. The main processor 100 may thus generate a PIF macro command which will initiate I/O processing operations by CPU 250 to lessen the processing burden on main processor 100. The main processor 100 may also issue a write 64 byte buffer command which writes 64 bytes into RAM 264.

Turning back to FIG. 5, peripheral interface 138 also includes a bus arbitrator 258 which allocates access to RAM 264 between CPU 250 and PIF channel interface 260. RAM 264 operates as a working RAM for CPU 250 and stores cartridge authenticating related calculations. RAM 264 additionally stores status data such as, for example, indicating whether the reset switch has been depressed. RAM 264 also stores controller related information in, for example, a 64 byte buffer within RAM 264. Exemplary command formats for reading and writing from and to the 64 byte buffer are shown in the incorporated '288 application.

Both the buffer RAM 264 and the boot ROM 262 are in the address space of main processor 100. The CPU 250 of the peripheral interface 138 also can access buffer RAM 264 in its address space. Memory protection techniques are utilized in order to prevent inappropriate access to portions of RAM 264 which are used for authenticating calculations.

Reset and interrupt related signals, such as CLDRES, CLDCAP and RESIC are generated and/or processed as explained above in the incorporated '288 application. The signal RSWIN is coupled to port 268 upon the depression of reset switch 90 and the NMI and the pre-NMI warning signal, INT2, are generated as described in the incorporated '288 application.

Port 268 includes a reset control register storing bits indicating whether an NMI or INT2 signal is to be generated. A third bit in the reset control register indicates whether the reset switch 90 has been depressed.

As mentioned previously, peripheral interface 138, in addition to its other functions, serves to provide input/output processing for two or more player controllers. As shown in FIG. 1, an exemplary embodiment of the present invention includes four sockets 80*a*–*d* to accept up to four peripheral devices. Additionally, the present invention provides for including one or more additional peripheral devices. See connector 154 and pin EXTJOY I/O. The 64 byte main processor 100 does not directly control peripheral devices such as joystick or cross-switch based controllers. Instead, main processor 100 controls the player controllers indirectly by sending commands via coprocessor 200 to peripheral interface 138 which handles I/O processing for the main processor 100. As shown in FIG. 5, peripheral interface 138 also receives inputs from, for example, five player controller channels via channel selector 280, demodulator 278, joystick channel controller 272 and port 266. Joystick channel data may be transmitted to peripheral devices via port registers 266 to joystick channel controller 272, modulator 274 and channel select 276. With respect to JoyChannel communication protocol, there is a command protocol and a response protocol. After a command frame, there is a completion signal generated. A response fame always comes after a command frame. In a response frame, there is a completion signal generated after the response is complete. Data is also sent from the peripheral interface 138 to the JoyChannel controllers. The CPU 250 of the peripheral interface controls such communications.

Each channel coupled to a player controller is a serial bilateral bus which may be selected via the channel selector 276 to couple information to one of the peripheral devices under the control of the four bit CPU 250. If the main processor 100 wants to read or write data from or to player controllers or other peripheral devices, it has to access RAM 264. There are several modes for accessing RAM 264. The 64 bit CPU 100 may execute a 32 bit word read or write instruction from or to the peripheral interface RAM 264. Alternatively, the CPU may execute a write 64 byte DMA instruction. This instruction is performed by first writing a DMA starting address into the main RAM address register. Thereafter, a buffer RAM 264 address code is written into a predetermined register to trigger a 64 byte DMA write operation to transfer data from a main RAM address register to a fixed destination address in RAM 264.

A PIF macro also may be executed. A PIF macro involves an exchange of data between the peripheral interface RAM 264 and the peripheral devices and the reading of 64 bytes by DMA. By using the PIF macro, any peripheral device's status may be determined. The macro is initiated by first setting the peripheral interface 138 to assign each peripheral device by using a write 64 byte DMA operation or a write 4 byte operation (which could be skipped if done before and no change in assignment is needed). Thereafter, the DMA destination address is written onto a main RAM address register and a predetermined RAM 264 address code is written in a PIF macro register located in the coprocessor which triggers the PIF macro. The PIF macro involves two phases where first, the peripheral interface 138 starts a reading or writing transaction with each peripheral device at each assigned mode which results in updated information being stored in the peripheral interface RAM 264. Thereafter, a read 64 byte DMA operation is performed for transferring 64 bytes from the fixed DMA starting address of the RAM 264 to the main RAM address register programmable DMA destination address within main RAM 300.

There are six JoyChannels available in the present exemplary embodiment. Each Channel's transmit data and receive data byte sizes are all independently assignable by setting size parameters. The function of the various port 266 registers are described in the incorporated '288 application.

Figure 9:
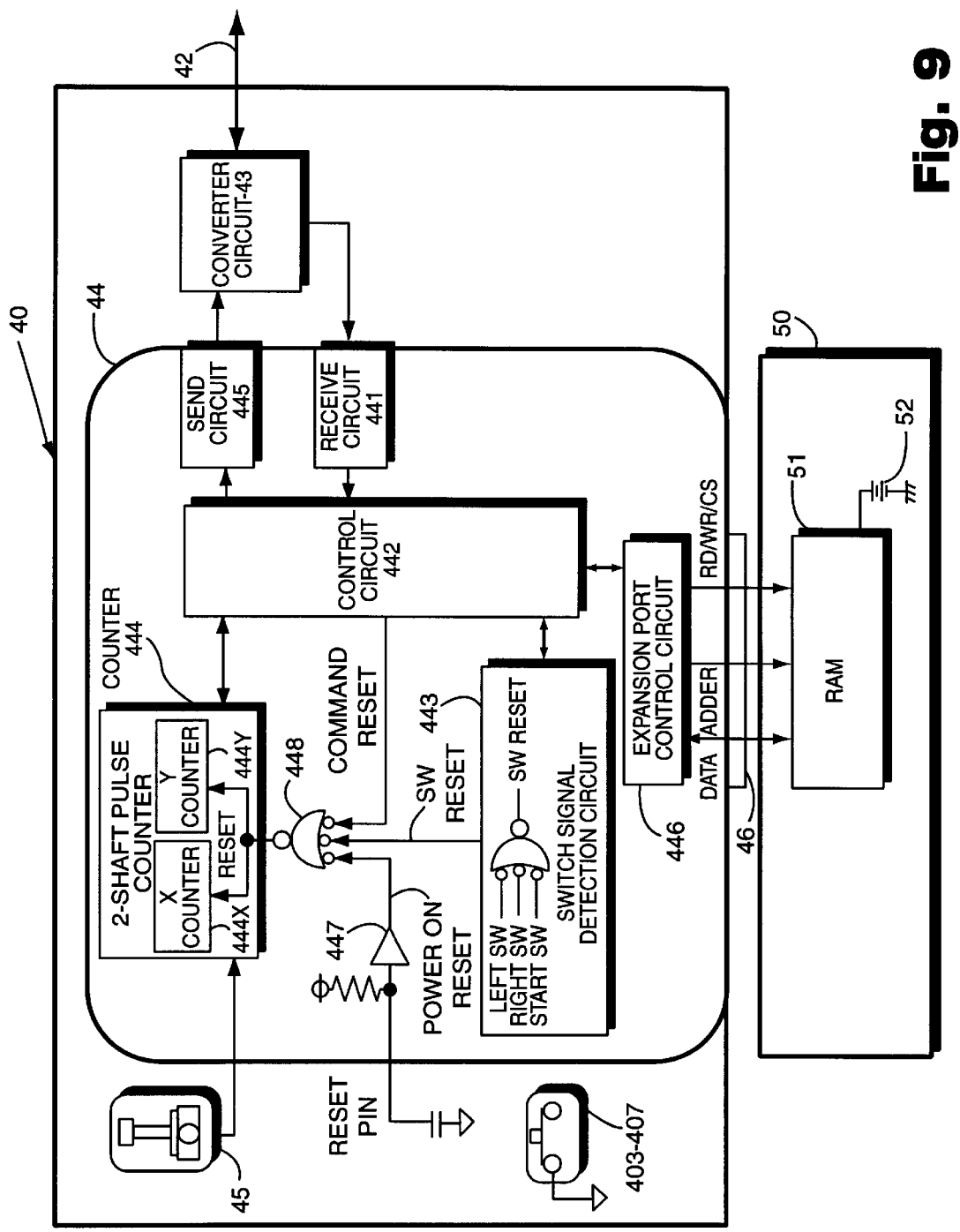
FIG. 9 is a block diagram of the FIG. 6 controller.

The peripheral device channel is designed to accept various types of future peripheral devices. The present exemplary embodiment uses an extensible command which is to be interpreted by peripherals including future devices. Commands are provided for read and writing data to a memory card. Backup data for a game may be stored on a memory card. In this fashion, no backup battery need be used for this memory during game play since it plugs into the controller. Certain of these commands contemplate an expansion memory card module 50 that plugs into a player controller 56 as is shown in FIG. 9. For further details relating to exemplary controllers that may be used in system 50 and the communications protocol between such controller and the peripheral interface 138 (and processing associated therewith) reference is made to the incorporated '019 application and Japanese patent application number H07-288006 (no. 00534) filed Oct. 9, 1995 naming Nishiumi et al as inventors, which application is incorporated herein by reference.

Figure 6:
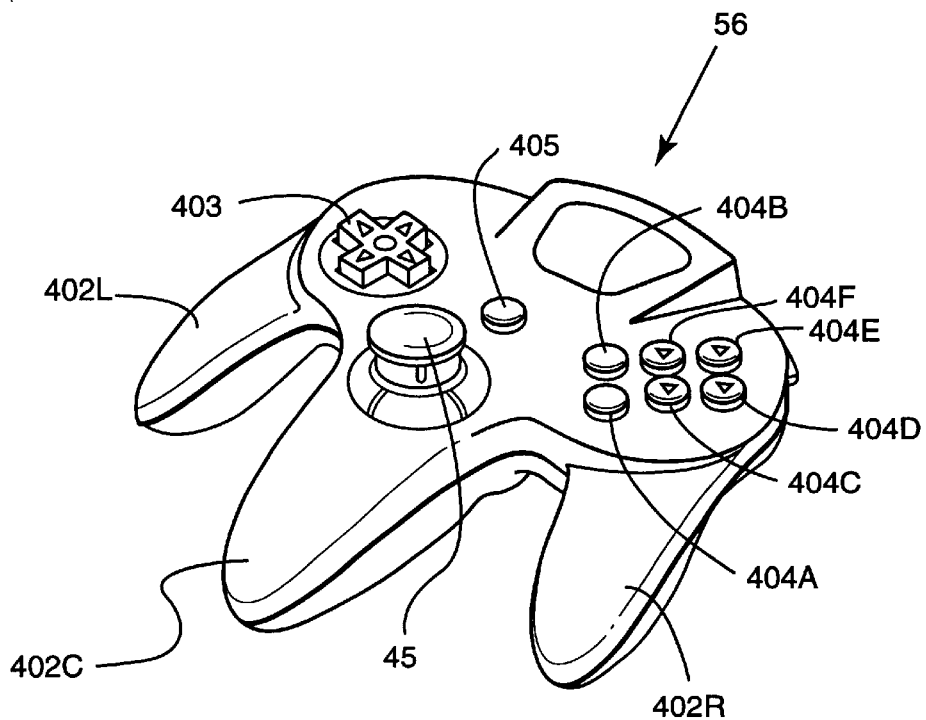
FIG. 6 is an external perspective view of the top portion of a preferred controller.
Figure 7:
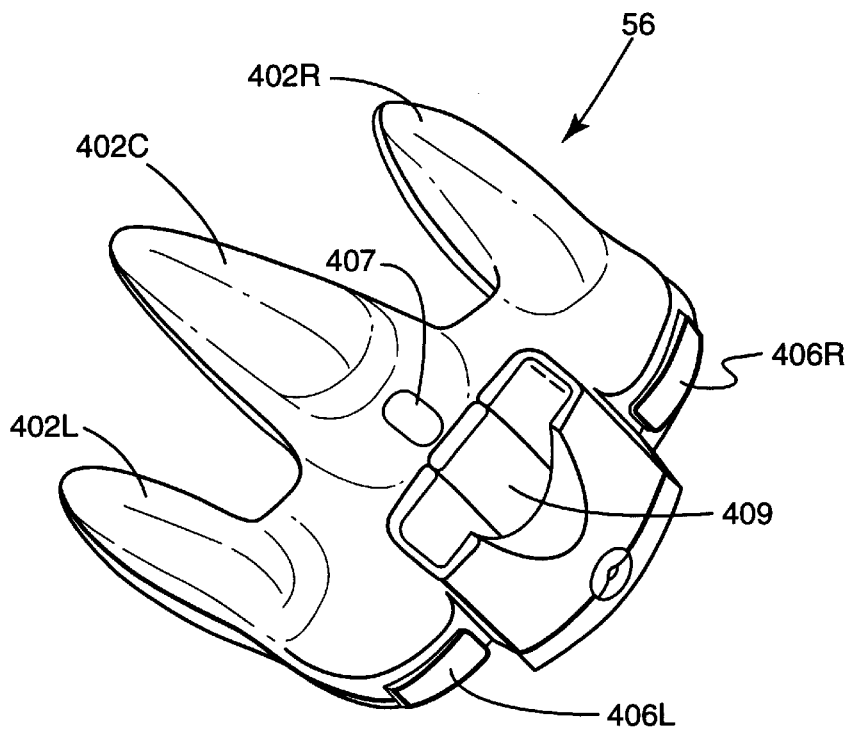
FIG. 7 is an external perspective view of the bottom portion of the FIG. 6 controller.

FIGS. 6 and 7 are external oblique-view drawings of a controller 56. The top housing of the controller 56 comprises an operation area in which a joystick 45 and buttons 403, 404A–F and 405 are situated adjacent 3 grips 402L, 402C and 402R. The bottom housing of the controller 56 comprises an operation area in which a button 407 is situated, 3 grips 402L, 402C and 402R and an expansion device mount 409. In addition, buttons 406L and 406R are situated at the boundary between the top housing and bottom housing of the controller 56. Furthermore, an electrical circuit, to be described below, is mounted inside the top and bottom housings. The electrical circuit is electrically connected to the video processing device 10 by cable 42 and connection jack 41. Button 403 may, for example, be a cross switch-type directional switch consisting of an up button, down button, left button and right button, which may be used to control the displayed position of a displayed moving object such as the well known Mario character. Buttons 404 consist of button 404A (referred to herein as the "A" button), button 404B (referred to as the "B" button), button 404C, button 404D, button 404E and button 404F(referred to collectively herein as the "C" buttons), and can be used, for example, in a video game to fire missiles or for a multitude of other functions depending upon the game program. As described herein in the presently preferred illustrative embodiment, the four arrowhead labeled (up, down, left, and right) "C" buttons permit a player to modify the displayed "camera" or point of view perspective in the three-dimensional world. Button 405 is a start button and is used primarily when starting a desired program. As shown in FIG. 7, button 406L is situated so that it can be easily operated by the index finger of the left hand, and button 406R is situated so that it can be easily operated by the index finger of the right hand. Button 407 is situated on the bottom housing so that it cannot be seen by the operator. In addition, grip 402L is formed so that it is grasped by the left hand and grip 402R is formed so that it is grasped by the right hand. Grip 402C is situated for use when grip 402L and/or, grip 402R are not in use. The expansion device mount 409 is a cavity for connecting an expansion device to the joy port connector 446 shown in FIG. 9.

Figure 8:
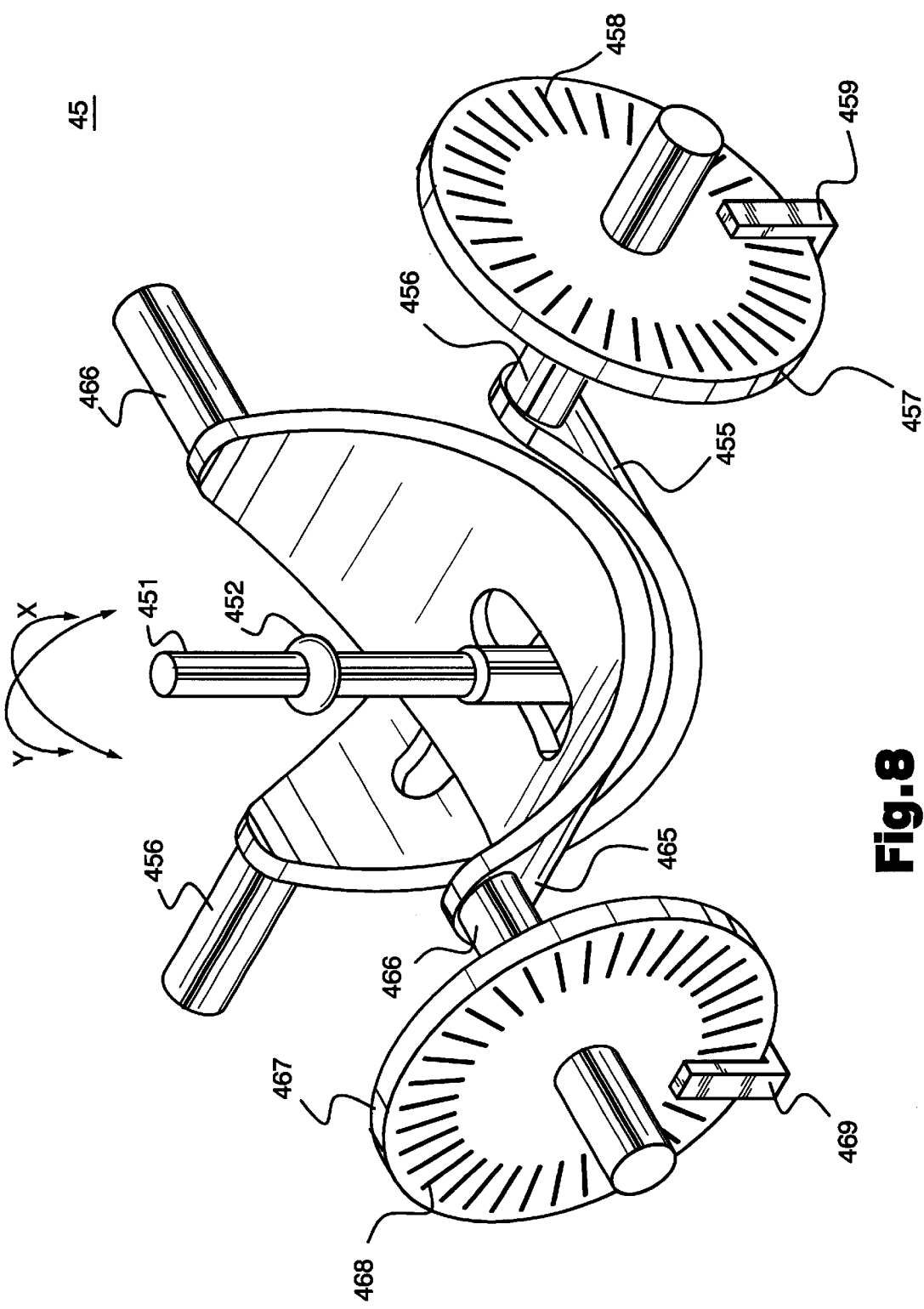
FIG. 8 is the internal construction of an exemplary embodiment of the controller joystick.

The internal construction of an exemplary embodiment of the controller 56 joystick 45 is shown in FIG. 8. Reference is also made to incorporated application Ser. No. 08/765, 474, for its detailed disclosure of an exemplary joystick construction for use as a character control member. See, for example, FIGS. 11–15 and 31–41 therein and the disclosure related thereto. Turning back to FIG. 8, the tip of the operation member 451 protruding from the housing is formed into a disk which is easily manipulated by placing one's finger on it. The part below the disk of the operation member 451 is rodshaped and stands vertically when it is not being manipulated. In addition, a support point 452 is situated on the operation member 451. This support point 452 securely supports the operation member on the controller 56 housing so that it can be tilted in all directions relative to a plane. An X-axis linkage member 455 rotates centered around an X shaft 456 coupled with tilting of the operation member 451 in the X-direction. The X shaft 456 is axially supported by a bearing (not shown). A Y-axis linkage member 465 rotates centered around a Y shaft 466 coupled with tilting of the operation member 451 in the Y-direction. The Y shaft 466 is axially supported by a bearing (not shown). Additionally, force is exerted on the operation member 451 by a return member, such as a spring (not shown), so that it normally stands upright. Now, the operation member 451, support 452, X-axis linkage member 455, X shaft 456, Y-axis linkage member 465 and Y shaft 466 are also described in Japan Utility Patent Early Disclosure (Kokai) No. HEI 2-68404.

A disk member 457 is attached to the X shaft 456 which rotates according to the rotation of the X shaft 456. The disk member 457 has several slits 458 around the perimeter of its side at a constant distance from the center. These slits 458 are holes which penetrate the disk member 457 and make it possible for light to pass through. A photo-interrupter 459 is mounted to the controller 56 housing around a portion of the edge of the perimeter of the disk member 457, which photo-interrupter 459 detects the slits 458 and outputs a detection signal. This enables the rotated condition of the disk member 457 to be detected. A description of the Y shaft 466, disk member 467 and slits 468 are omitted since they are the same as the X shaft 456, disk member 457 and slits 458 described above. The technique of detecting the rotation of the disc members 457 and 467 using light, which was described above, is disclosed in detail in Japan Patent Application Publication No. HEI 6-114683, filed by applicants' assignee in this matter, which is incorporated herein by reference.

In this exemplary implementation, disk member 457 is directly mounted on the X-axis linkage, member 455, but a gear could be attached to the X shaft 456 and the disc member 457 rotated by this gear. In such a case, it is possible to cause the disc member 457 to greatly rotate by the operator slightly tilting the operation member 451 by setting the gear ratio so that rotation of the disc member 457 is greater than rotation of the X shaft 456. This would make possible more accurate detection of the tilted condition of the operation member 451 since more of the slits 458 could be detected. For further details of the controller 56 joystick linkage elements, slit disks, optical sensors and other elements, reference is made to Japanese Application No. H7-317230 filed Nov. 10, 1995, which application is incorporated herein by reference.

An exemplary controller 56 is described in conjunction with the FIG. 9 block diagram. The data which has been transmitted from the video processing device 52 is coupled to a conversion circuit 43. The conversion circuit 43 sends and receives data to and from the peripheral interface 138 in the video processing device 52 as a serial signal. The conversion circuit 43 sends serial data received from the peripheral interface 138 as a serial signal to receiving circuit 441 inside the controller circuit 44. It also receives a serial signal from the send circuit 445 inside the controller circuit 44 and then outputs this signal as a serial signal to the peripheral interface 138.

The send circuit 445 converts the parallel signal which is output from the control circuit 442 into a serial signal and outputs the signal to conversion circuit 43. The receive circuit 441 converts the serial signal which has been output from converter circuit 43 into a parallel signal and outputs it to control circuit 442.

The send circuit 445, receive circuit 441, joy port control circuit 446, switch signal detection circuit 443 and counter 444 are connected to the control circuit 442. A parallel signal from receive circuit 441 is input to control circuit 442, whereby it receives the data/command information which has been output from video processing device 52. The control circuit 442 performs the desired operation based on such received data. The control circuit 442 instructs the switch signal detection circuit 443 to detect switch signals, and receives data from the switch signal detection circuit 443 which indicates which of the buttons have been pressed.

The control circuit 442 also instructs the counter 444 to output its data and receives data from the X counter 444X and the Y counter 444Y. The control circuit 442 is connected by an address bus and a data bus to an expansion port control circuit 446. By outputting command data to port control circuit 446, control circuit 442 is able to control expansion device 50, and is able to receive expansion device output data.

The switch signals from buttons 403–407 are input to the switch signal detection circuit 443, which detects that several desired buttons have been simultaneously pressed and sends a reset signal to the reset circuit 448. The switch signal detection circuit 443 also outputs a switch signal to the control circuit 442 and sends a reset signal to the reset circuit 448.

The counter circuit 444 contains two counters. X counter 444X counts the detection pulse signals output from the X-axis photo-interrupter 469 inside the joystick mechanism 45. This makes it possible to detect how much the operation member 451 is tilted along the X-axis. The Y counter 444Y counts the pulse signals output from the Y-axis photo-interrupter 459 inside the joysticks mechanism 45. This makes it possible to detect how much the operation member 451 is tilted along the Y-axis. The counter circuit 444 outputs the count values counted by the X counter 444X and the Y counter 444Y to the control circuit 442 according to instructions from the control circuit 442. Thus, not only is information generated for determining 360° directional movement with respect to a point of origin but also the amount of operation member tilt. As explained below, this information can be advantageously used to control both the direction of an object's movement, and also, for example, the rate of movement.

Buttons 403–407 generate electrical signals when the key tops, which protrude outside the controller 56 are pressed by the user. In the exemplary implementation, the voltage changes from high to low when a key is pressed. This voltage change is detected by the switch signal detection circuit 443.

The controller 56 generated data in the exemplary embodiment consists of the following four bytes, where the various data bits are represented as either "0" or "1": B, A, G, START, up, down, left, right (byte 1); JSRST, 0 (not used in the exemplary implementation in this application), L, R, E, D, C, F (byte 2); an X coordinate (byte 3) and a Y coordinate (byte 4). E corresponds to the button 404B and becomes 1 when button 404B is pressed, 0 when it is not being is pressed. Similarly, A corresponds to button 404A, G with button 407, START with button 405, up, down, left and right with button 403, L with button 406L, R with button 406R, E with button 404E, D with button 404D, C with button 404C and F with button 404F. JSRST becomes 1 when 405, button 406L and button 406R are simultaneously pressed by the operator and is 0 when they are not being pressed. The X coordinate and Y coordinate are the count value data of the X counter 444X and Y counter 444Y, respectively.

The expansion port control circuit 446 is connected to the control circuit 442 and via an address, control and data bus to expansion device 50 via a port connector 46. Thus, by connecting the control circuit 442 and expansion device 50 via an address bus and a data bus, it is possible to control the expansion device 50 according to commands from the video processing device console 52.

The exemplary expansion device 50, shown in FIG. 9, is a back-up memory card 50. Memory card 50 may, for example, include a RAM device 51, on which data can be written to and read from desired indicated addresses appearing on an address bus and a battery 52 which supplies the back-up power necessary to store data in the RAM device 51. By connecting this back-up memory card 50 to expansion (joy port) connector 46 in the controller 40, it becomes possible to send data to and from RAM 51 since it is electrically connected with the joy port control circuit 446.

The memory card 51 and game controller connector 46 provide the game controller and the overall video game system with enhanced flexibility and function expandability. For example, the game controller, with its memory card, may be transported to another player's video game system console. The memory card may store and thereby save data relating to individual achievement by a player and individual, statistical information may be maintained during game play in light of such data. For example, if two players are playing a racing game, each player may store his or her own best lap times. The game program may be designed to cause video processing device 52 to compile such best lap time information and generate displays indicating both statistics as to performance versus the other player and a comparison with the best prior lap time stored on the memory card. Such individualized statistics may be utilized in any competitive game where a player plays against the video game system computer and/or against opponents. For example, with the memory card, it is contemplated that in conjunction with various games, individual statistics relating to a professional team will be stored and utilized when playing an opponent who has stored statistics based on another professional team such as a baseball or football team. Thus, RAM 51 may be utilized for a wide range of applications including saving personalized game play data, or storing customized statistical data, e.g., of a particular professional or college team, used during game play.

The sending and receiving of data between the video processing device 52 and the controller 56, further controller details including a description of controller related commands, how the controller may be reset, etc., are set forth in detail in the incorporated '019 application.

The present invention is directed to a new era of video game methodology in which a player fully interacts with complex three-dimensional environments displayed using the video game system described above. The present invention is directed to video game methodology featuring a unique combination of game level organization features, animation/character control features, and multiple "camera" angle features. A particularly preferred exemplary embodiment of the present invention is the commercially available Super Mario 64 game for play on the assignee's Nintendo 64 video game system which has been described in part above.

Figure 10:
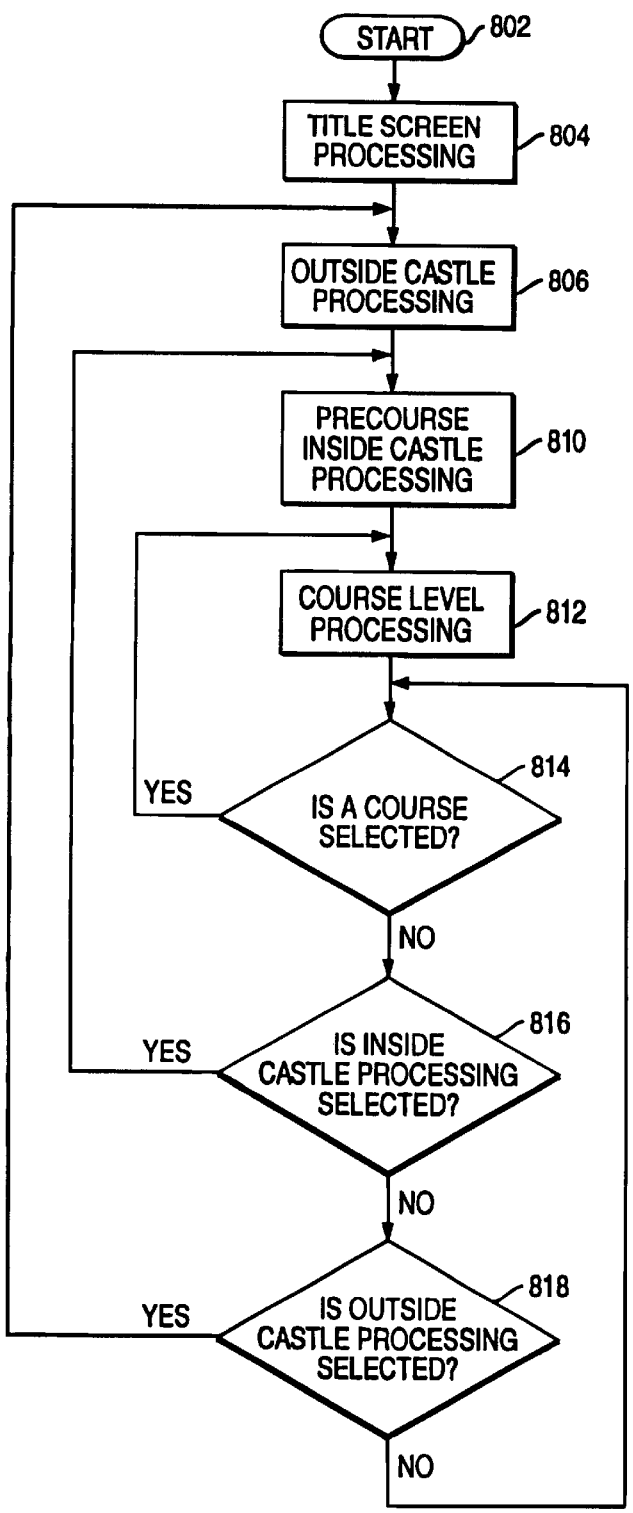
FIG. 10 is a flowchart depicting an exemplary general game program flow and organization.

FIG. 10 is a flowchart depicting the present methodology's general game program flow and organization. Various unique and/or significant aspects of the processing represented in the FIG. 10 flowchart are first generally described and then discussed in detail in conjunction with other figures below. After inserting, for example, a game cartridge having a program embodying the present invention (such as the Super Mario 64 game cartridge) into a console 52 and turning the power on, title screen processing is initiated (802, 804). The unique title processing provides a mechanism for permitting the user to become familiar with controller 56, shown in FIGS. 6 through 9, before beginning game play. As will be described further below, the title processing routine generates a display of Mario's face, while permitting the user to distort the face as desired, using various control keys and, for example, the controller joystick 45.

Additionally, the title screen processing permits the user to change the "camera angle" at which Mario is viewed.

By pressing the controller start key, a select file screen is then displayed in which one of four game files may be selected. A player's progress is saved into the selected file. Additionally, a player is able to choose between stereo, mono, or headset audio modes. The select file screen also permits viewing the score of each saved file, and allows the display to be switched between the player's score and the high score to date. The user, via the select file screen, can also copy the contents of one saved file into another to permit the user to play someone else saved game without affecting the other player's saved data. Additionally, an option is given to erase data saved in a selected file, so that game play may begin from the beginning of the game. The game begins when the player presses the start key again.

In the present exemplary embodiment, the game features the character "Mario" exploring a three-dimensional world which centers around the castle depicted in FIGS. 4A–4F. An outside the castle processing routine is initiated (806), which allows the user to control the character Mario to wander around the castle grounds and swim through a moat surrounding the castle to gain expertise in the many character control techniques available to the player, utilizing the controller joystick 45 and the other control keys.

By controlling Mario to enter the castle door, best shown in FIG. 4E, a precourse inside the castle routine is initiated (810). Once inside the castle, the player has the freedom to control Mario to wander through various rooms in the castle, instead of immediately entering into one of, for example, fifteen three-dimensional courses, access to which is gained via various castle rooms as will be explained further below.

Entry into a course typically occurs by a player controlling Mario to jump through a painting, and into the world (which may be represented by the painting hanging on a castle room wall. Entry into one of fifteen courses initiates the course or level processing routine (812). Each of the fifteen courses has a predetermined number of unique independent objectives, e.g., 7, to be completed within it. Typically, the objective is to touch one of seven stars located in the course. The player exits a course either voluntarily or by succumbing to enemies.

The player may elect to reenter the same or attempt to enter another course (814) and, if so, the routine branches back to the course level processing at block (812). If the same or another course is not selected, then the user is permitted to control character movement inside the castle (816) and hence the routine may branch back to the precourse, inside the castle processing (810). Alternatively, a player may select outside the castle processing (818). If outside the castle processing is selected, then the routine branches back to the outside the castle processing routine (806). In essence, flowchart blocks 814, 816 and 818 depict the user's freedom to select between various three-dimensional world courses or to choose to roam around either inside or outside the castle.

As indicated above, entry into one of the fifteen courses or levels of Super Mario 64, is accomplished by a player leaping into a picture mounted on a castle room wall. A player's ability to gain access to a picture is a function of his or her ability to open a door leading to a course. Access to a door and its associated course is obtained through collecting stars. There are seven stars hidden in each of the fifteen courses. Six of the stars are obtained by completing a course objective and touching the star located on the course. A seventh star may be obtained by collecting a predetermined number of coins scattered at various points in the course. A player does not have to obtain all the stars present in a particular course in order to move on to a further course. Moreover, a player can exit a course and reenter at a later point in time to acquire stars not previously acquired.

Figure 11A:
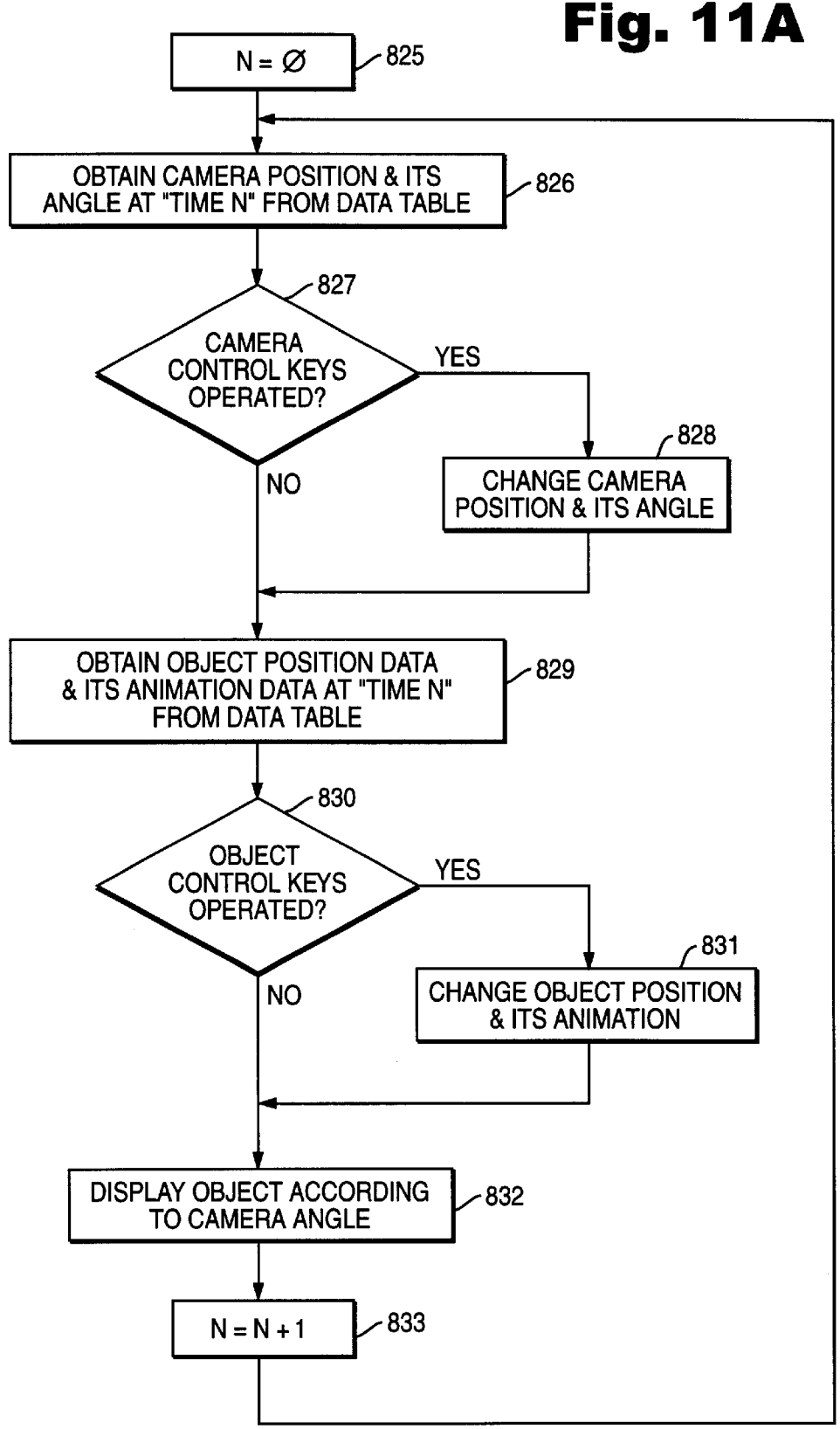
FIG. 11A is a flowchart relating to title screen processing.
Figure 11B:
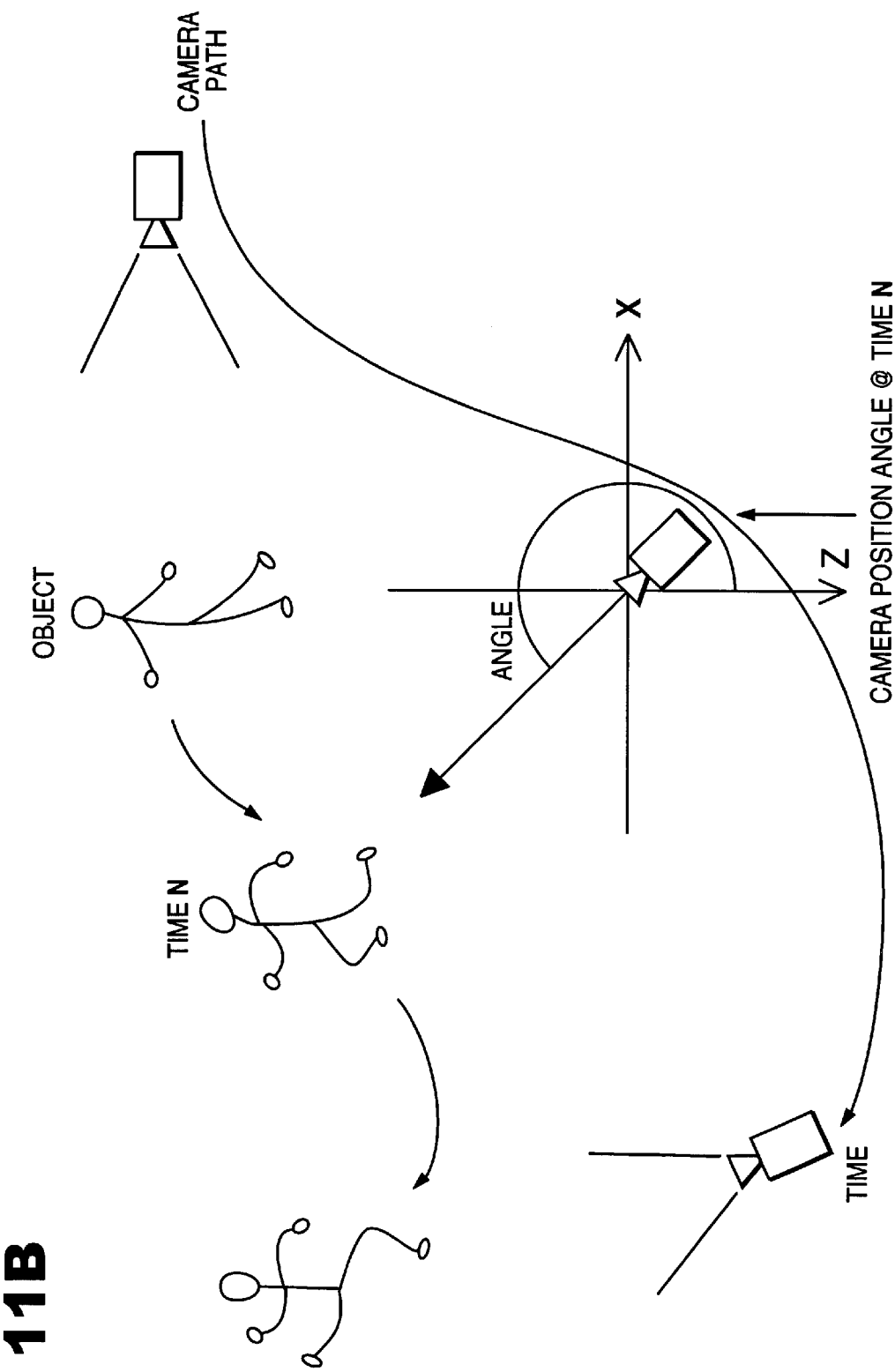
FIG. 11B shows an exemplary animated object and the apparent locus of the camera path following the object relating to the FIG. 11A flowchart.

FIG. 11A is a flowchart relating to title screen processing. However, the flowchart is also applicable to an end of the game demonstration or other demonstrations for which it is desired to permit a player to manipulate a displayed character. FIG. 11B shows an animated object and the locus of the "camera" path (displayed point of view) which appears to be following the object. During such title and game ending demonstrations, the camera position is determined as a function of time. At a given time "N", as shown in FIG. 11B, the camera has an associated camera position angle and a displayed character has associated position and animation data. In demonstrations, such as during title screen processing, a player's random controller operations affects the apparent "camera" position. A player is able to move the camera up, down or in different directions.

As shown in FIG. 11A, at the beginning of a demonstration, the time N is set equal to zero (825). Thereafter, the game processor accesses the camera position and its angle at time N from a data table in memory (826). A check is then made at 827 to determine whether the controller's "camera" controlling "C" buttons have been operated. If so, then the camera position and angle are changed accordingly, in a manner which is described below (828). If the check at block 827 indicates that the camera control keys have not been operated, then object position control is initiated such that the game program processing system accesses the object position and animation data at time N from the data table in memory (829). A check is then made to determine whether a FIG. 6 object control key/joystick has been operated (830). If an object control key or joystick has been operated, then the object position and its animation are changed in accordance with the player control input (831). After the processing at 831, in which the object position and animation data are changed, or if no object control key or joystick has been manipulated, the object is displayed in accordance with the previously obtained camera position and angle (832). Thereafter, the time N is incremented in an associated counter (833) and the routine branches back to block 826 to repetitively continue the title screen processing or other demonstration processing until, for example, in the case of title screen processing, the player chooses to begin game play.

Figure 11C:
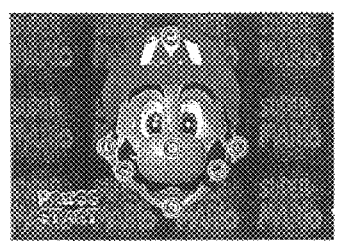
FIGS. 11C, D, E, F, and G show exemplary title screen displays.
Figure 11D:
Figure 11E:
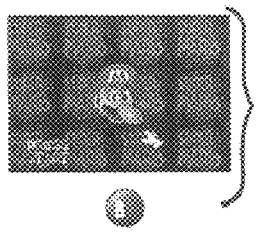
Figure 11F:
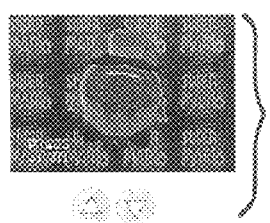
Figure 11G:

FIGS. 11C, D, E and F show an exemplary title screen display sequence. In FIG. 11C on the opening screen Mario's face appears. The user can move Mario and play with his face by pressing the A button to display a hand-shaped cursor. See, e.g., FIG. 11D. The user is able to "pinch" Mario's face. Using the joystick controller shown in FIG. 6, the displayed cursor can be moved to various positions and the A button may used to pinch the displayed character. By holding the A button as the cursor is moved, Mario's face may be stretched. By releasing the A button, the face returns to normal. Before releasing the A button, if the user holds the R button, further areas of Mario's face may be pinched and the face will keep its distorted form as shown in FIG. 11D. By pressing B button, Mario's face can be made to zoom and scale as shown in FIG. 11E. By manipulating the up and down "C" buttons, as shown in FIG. 11F, Mario's face may be rotated. Mario's face may be rotated to the left and right by using left and right "C" control keys as shown in FIG. 11G.

Figure 12:
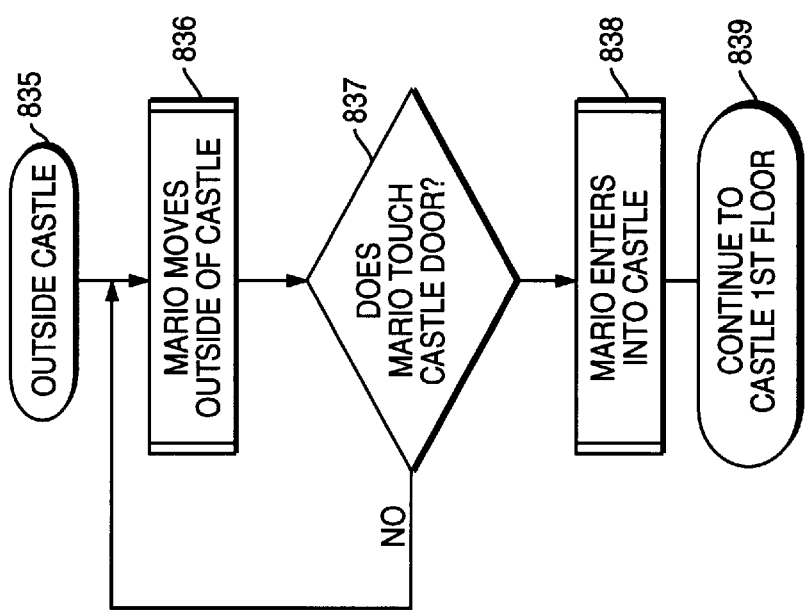
FIG. 12 is a flowchart depicting the general sequence of operations involved in outside the castle processing.

FIG. 12 shows the general sequence of operations involved in outside the castle processing previously described in conjunction with FIG. 10, block 806. After the title screen processing, outside the castle processing is initiated, whereby Mario may be controlled by the player to freely move outside the castle (835, 836), to thereby permit the user to gain experience in the many character control techniques described herein, using the controller 56 shown in FIGS. 6–9. A check is then made at block 837 to determine whether Mario has touched the castle door. If Mario has not touched the castle door, then the routine branches back to block 836, where Mario continues to freely move throughout the outside of the castle grounds, and to swim in the moat surrounding the castle as the player desires. If Mario has touched the castle door, then the castle door opening process is initiated at block 838, which allows Mario to enter into the castle. When Mario enters into the castle, he continues onto the first floor of the castle (839) and the routine branches to the precourse inside the castle processing routine of block 810 of FIG. 10 which is detailed in FIGS. 15A and 15B.

Figure 13B:
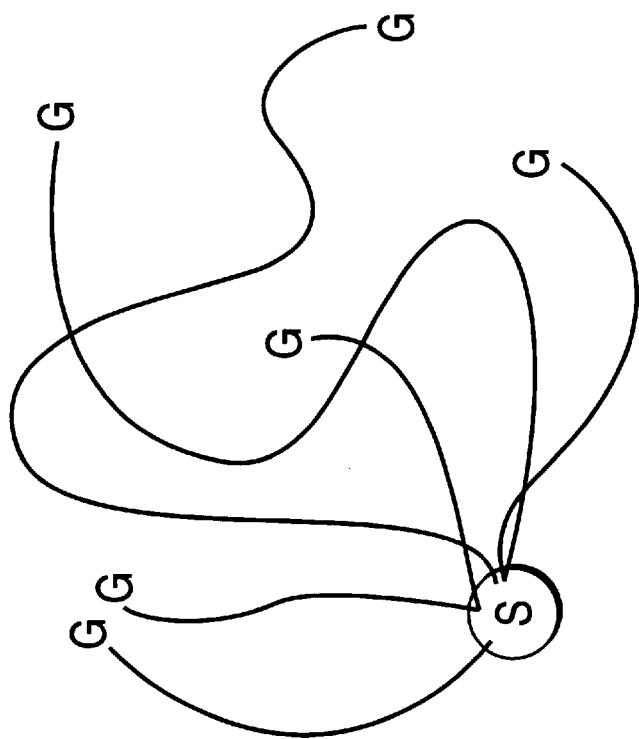
FIGS. 13A and 13B is a flowchart and conceptual diagram for explaining an exemplary sequence of operations for keeping track of a player's achievement of goals.
Figure 13A:
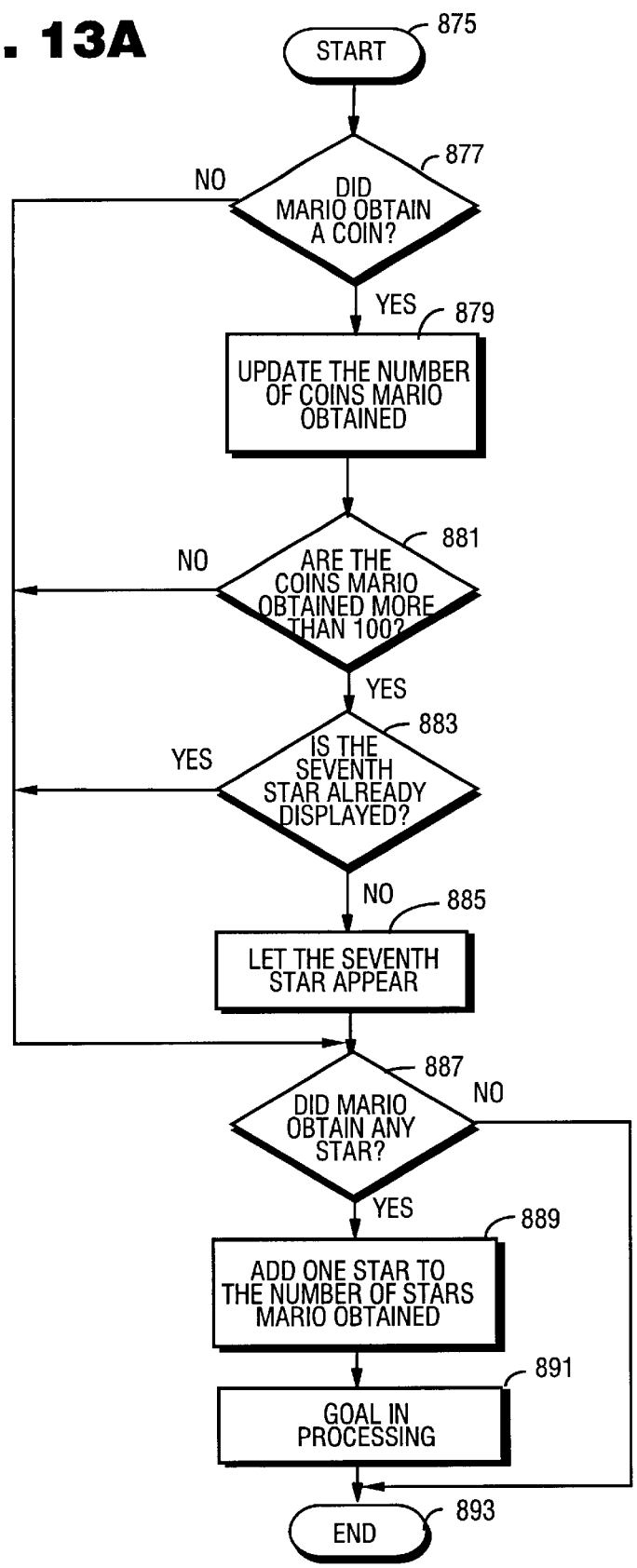

Prior to describing the inside the castle processing routine, goal achievement and course or level progression are first described. FIG. 13A delineates a sequence of operations for keeping track of a player's achievement of goals which are sought to be achieved in, for example, progressing through game courses or levels. Goal check processing begins with a determination as to whether Mario successfully obtained a coin (875, 877). If Mario obtained a coin, then the number of coins obtained by Mario in the course is updated. If Mario did not obtain a coin, then the routine branches to block 887 for further processing. If Mario obtained a coin, then the number of coins Mario obtained is updated (879), and a check is then made to determine whether Mario has obtained more than a hundred coins (881). If the current number of coins obtained is less than a hundred, then the routine branches to 887 for further processing. If Mario has obtained a hundred or more coins, then a check is made at 883 to determine whether the seventh star is already displayed. In accordance with the present exemplary embodiment, each course initially has six stars associated with it which may be accessed by a player. Once a player has accumulated a hundred coins, then the seventh star is caused to appear, if it has not already been displayed (885). In this manner, the seventh star is effectively hidden until a hundred coins have been accumulated. If the check at block 883 indicates that the seventh star is already displayed, then processing branches to block 887. A check is made at block 887 to determine whether Mario has obtained any star during the course processing. If Mario has not obtained a star, then the routine branches to block 893 for returning to the main game processing routine. If Mario has obtained a star, then the number of stars obtained by the player is incremented by 1 (889), and the current total number of stars obtained is stored in memory. The stored number of stars is checked during the door processing, which is described below in conjunction with FIG. 14A. After the number of stars is incremented, a goal achievement display sequence is initiated in which Mario is displayed, for example, giving a victory or peace sign in a celebration animation sequence (891), and the routine branches back to the main routine (893). As conceptually represented in FIG. 13B, once a player starts a course (as represent by S), the player can achieve a predetermined number of independent goals G. In the illustrative embodiment, the goal G is attained, through completing completing predetermined tasks or otherwise discovering a star hidden in the course. In accordance in the illustrative embodiment, attaining one star is not a prerequisite for attaining another star.

Figure 14B:
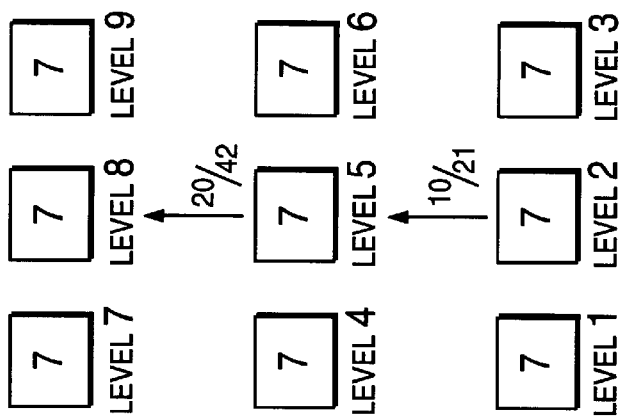
FIG. 14B schematically demonstrates one illustrative and exemplary criteria for opening castle doors and advancing.
Figure 14A:
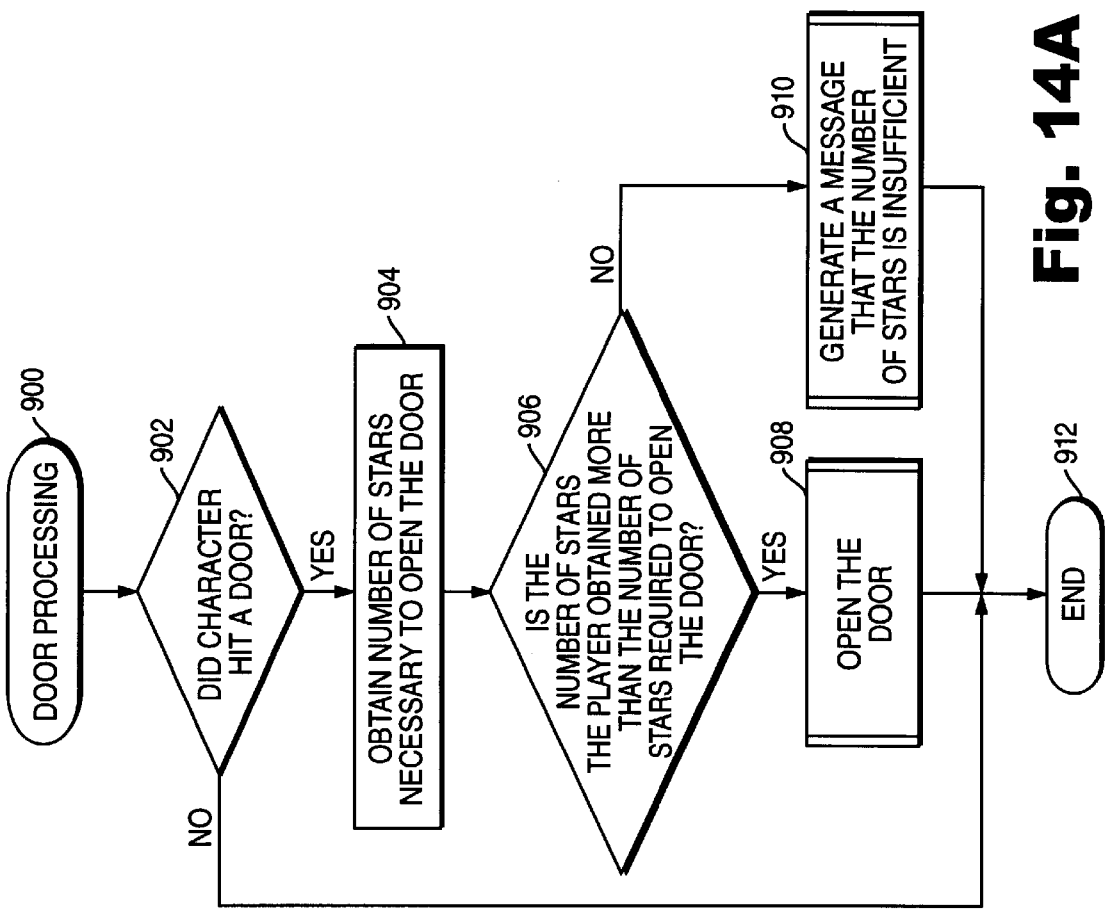
FIG. 14A delineates the sequence of events involved in course advancement related door opening processing routine.

FIG. 14A delineates the sequence of events involved in the course-advancement related, door opening processing routine. The door opening processing routine (900) initially detects whether the player controller character, i.e., Mario, hits a door (902). Thereafter, the number of stars necessary to open the door hit is accessed (904). A check is then made to determine whether the number of stars required to open the door hit is equal to or less than the number of stars currently obtained by the player which is stored as previously described in conjunction with FIG. 13A. If the check at block 906 indicates that the required number of stars has been obtained, then processing is initiated to generate display frames simulating the opening of the door to permit the character to enter and explore the associated castle room. If the required number of stars has not been obtained, then, as indicated at block 910, a message is generated to indicate that an inadequate number of stars has been attained to open the door hit. The door processing routine exits after the door opening processing of step 908 or the message generating step 910 and branches back to the main processing routine. Access to certain doors in the castle may be obtained by a player acquiring a door key. It should be understood that access to a door and its associated course or courses is not limited to obtaining any predetermined required number of objectives such as stars.

In prior art video games, in order to complete a particular course or level and advance to the next level, the completion of a complete set of course goals or objectives typically is required. In accordance with the present invention, each course or level has a set of independent goals such as is schematically represented by FIG. 13B. For example, each course in Super Mario 64 has a goal of acquiring seven stars, one of which is obtained by accessing a predetermined number of coins along the course. As indicated at block 906 in FIG. 14A, a check is made to determine whether the number of stars a player obtained is more than the number of stars required to open the door.

FIG. 14B schematically demonstrates exemplary criteria for opening a castle door and advancing in accordance with one illustrative embodiment of the present invention where, for example, nine of fifteen courses are represented. As noted above, in the exemplary embodiment, each level or course has a predetermined goal of, for example, acquiring seven stars. FIG. 14B schematically represents nine doors on various castle floors, which give access to nine predetermined courses in the castle. Although nine courses are represented in FIG. 14B this number is used for illustrative purposes only (an exemplary embodiment of the present invention, Super Mario 64 includes 15 courses).

As shown in FIG. 14B, associated with each of the nine levels represented therein, is the acquisition of seven stars. In the example shown in FIG. 14B, a player is freely permitted to enter levels 1–3. Typically, as a course is entered, a clue is given concerning the objective of obtaining one or more stars. If desired, a player may exit the course at any time and reenter later to get a new clue. However, in order to advance to, for example, levels 4, 5 or 6, it is necessary for the player to acquire a predetermined number of the twenty-one possible stars. For example, ten stars may be required in order to open doors leading to levels 4, 5 or 6. Similarly, in order for a player to advance to levels 7, 8 or 9, it is necessary for the player to have acquired twenty out of the forty-two possible stars. In this fashion, a player does not have to obtain the maximum number of stars in each level before moving on and is permitted to reenter the course later to get additional stars not achieved during initial attempts. Additionally, there are stars found in areas which are not considered regular courses. Some additional stars are obtained by entering a hidden area in the castle. In such hidden areas, a star may be obtained by discovery of a predetermined number of coins in the hidden area. Additionally, stars may be awarded by a player exceeding a predetermined speed in a particular area. Moreover, a player may receive a star by interacting with a predetermined character. As suggested by FIG. 14B, two different players playing the game may achieve a completely different set of goals, e.g., stars, on levels 1, 2 and 3, and yet both players are permitted to access levels 4, 5 and 6, if they have obtained the required number of total stars in the first three levels.

Figure 15A:
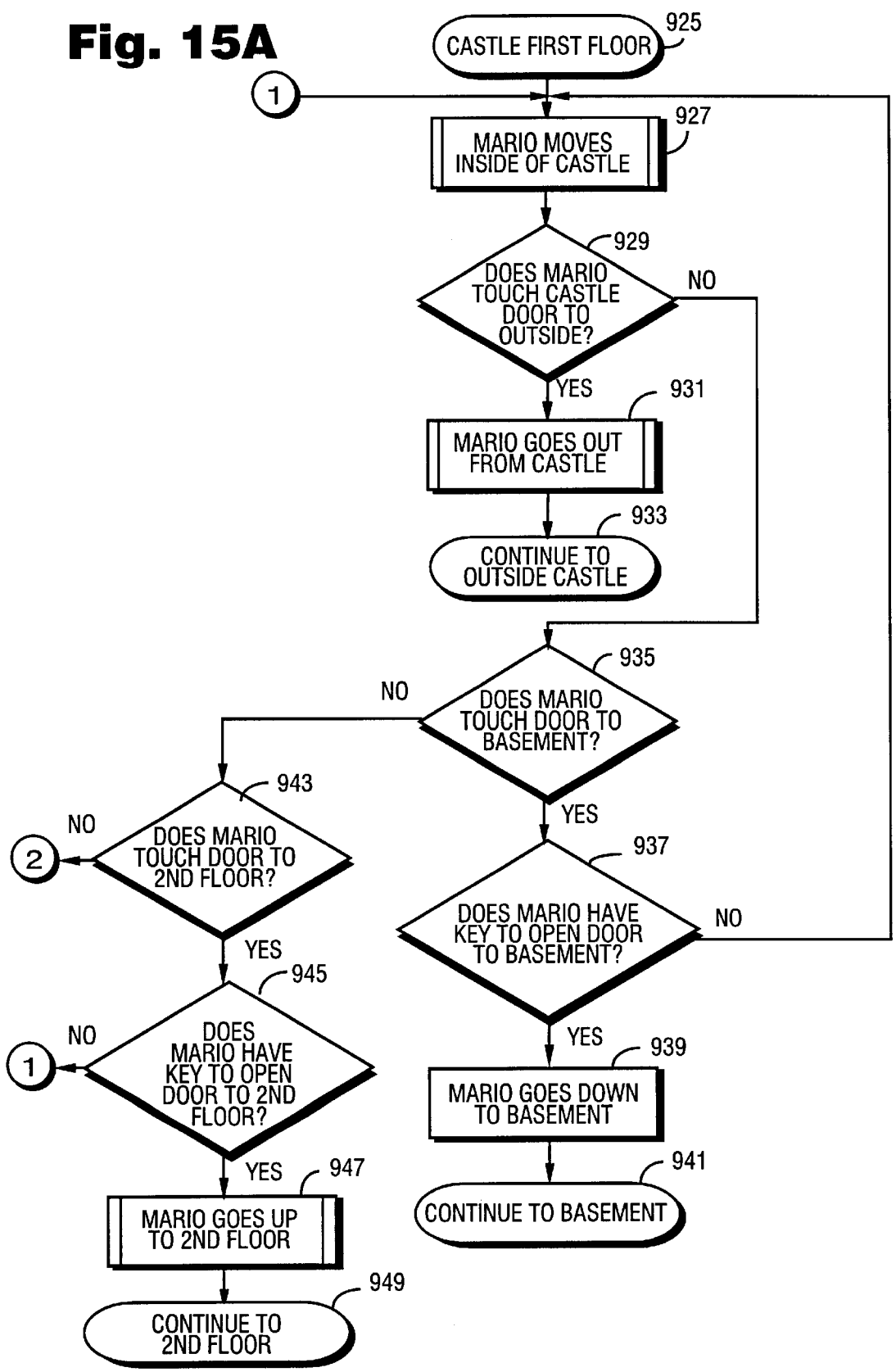
FIGS. 15A and 15B is a flowchart depicting castle first floor processing.

Turning to FIG. 15A, when Mario enters the castle first floor (925), inside the castle processing begins and the castle first floor is displayed (927). The program permits Mario to freely roam around inside the castle. FIG. 15C schematically depicts the castle layout, including the first floor, basement, balcony, second floor, third floor, as well as the courtyard outside the castle. The castle itself and this castle layout is by way of example only. It should be understood that the present methodology envisions a wide range of architectural and geographical layouts that may be used as entry points for courses or levels. In the present exemplary illustrative embodiment, there are fifteen main courses and several mini-courses. To enter most courses, a player enters into a castle room and jumps into a painting hanging on the castle wall in a three-dimensional display sequence as shown at FIG. 15D. The pictures, which serve as the entry points into the various courses, also typically represent the world into which the player-controlled character may leap.

Turning back to FIG. 15A, at block 929, a check is made to determine whether Mario has touched the castle door leading to the outside of the castle. If Mario contacted the door leading to the outside of the castle, Mario exits the castle to, for example, explore the courtyard shown in FIG. 15C, and the routine branches to the outside the castle processing as indicated in 933 to re-enter the FIG. 12 outside the castle processing routine.

If Mario did not touch the door to the outside of the castle, a check is made at block 935, to determine whether Mario touched the door to the basement, shown in FIG. 15C. If Mario touched the door to the basement, then a further check is made at block 937 to determine whether Mario has the key to open the door to the basement. This sequence exemplifies that, in addition to doors which are opened based upon the achievement of a predetermined goal, i.e., accessing a predetermined number of stars, there may be doors that cannot be opened without a key (the basement door is one of these doors). The player may be required to accomplish a predetermine task to find a key. If Mario does have a key to open the basement door, then Mario is permitted to enter and roam around in the basement (939), and the routine branches to the basement processing routine (941). If Mario does not have a key to open the basement door, as determined by the check at 937, the routine branches back to block 927 to repeat the first floor inside the castle processing as described above.

If the check at block 935 reveals that Mario did not touch the door to the basement, then a check is made at 943 to determine whether Mario touched the door to the second floor as is shown in FIG. 15C. If Mario did touch the door to the castle second floor, then a farther check to determine whether Mario has a key to open the second floor door (945). If Mario does have the key to open the second floor door, then Mario is permitted to go to the second floor, which is then displayed with Mario roaming around the second floor (947) and the routine branches to a second floor processing routine (949). If the check at block 945 reveals that Mario does not have the key to open the second floor door then the routine branches back to block 927 for further castle first floor processing.

Figure 15B:
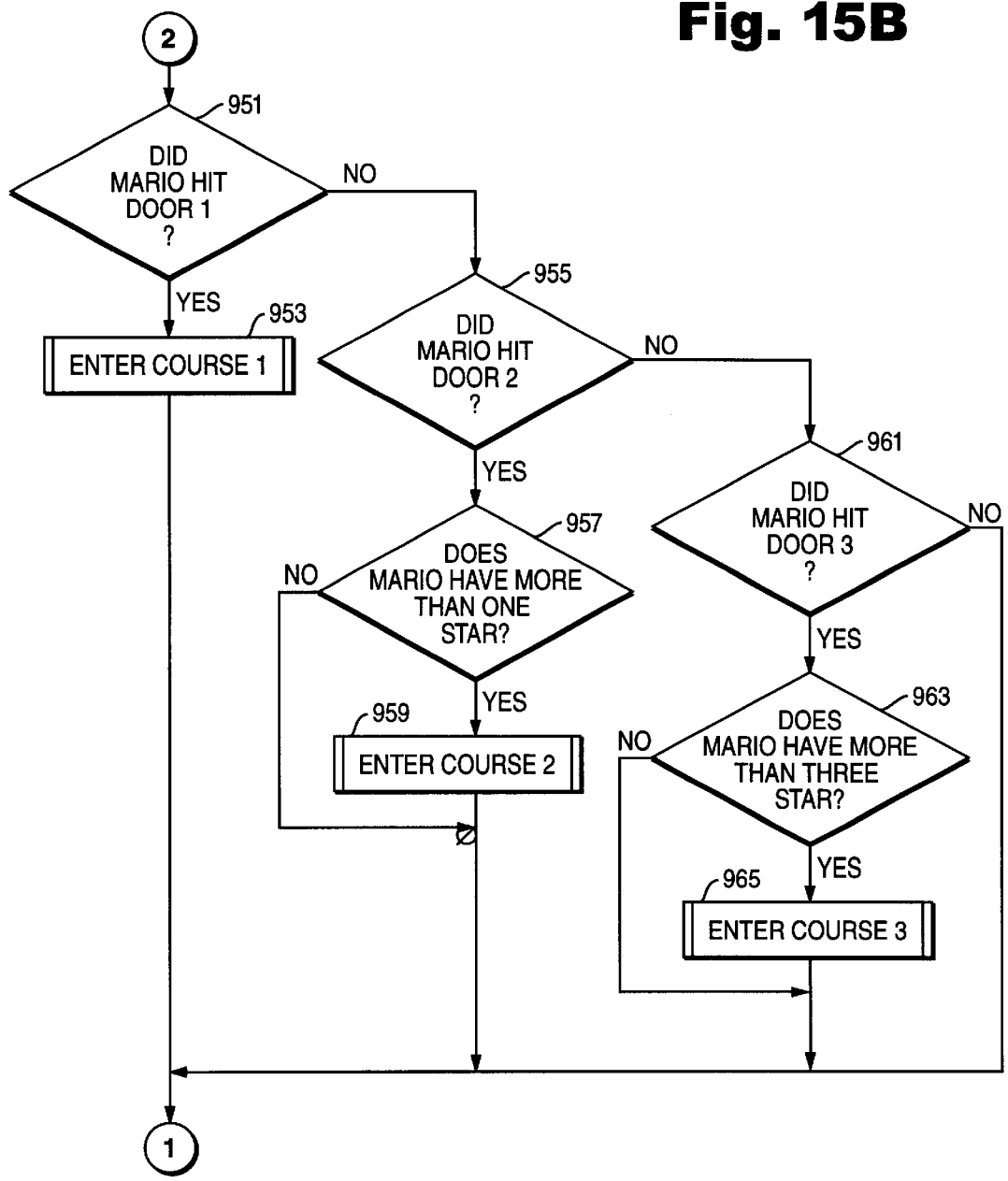
Figure 15C:
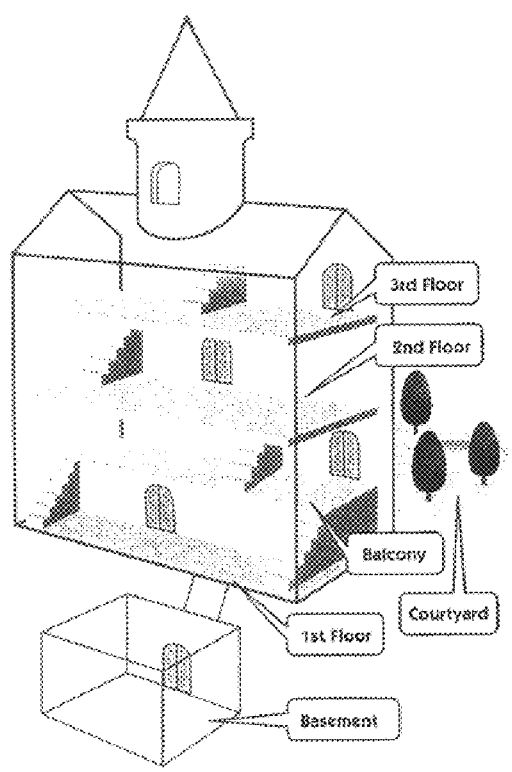
FIG. 15C schematically depicts the castle layout, including the first floor, basement, balcony, second floor, third floor, and the courtyard outside the castle.
Figure 15D:
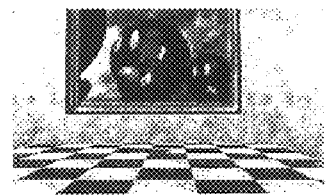
FIG. 15D shows an exemplary course entry related screen display.

If the check at 943 reveals that Mario did not touch a door to the second door then, as shown in FIG. 15B, a check is made to determine whether Mario touched door 1 of the first floor. If Mario hit door 1, then Mario is permitted to enter course 1 by leaping through the course 1 picture, without any goal achievement requirement. After completing or exiting course 1 (953), the routine branches back to block 927 permitting Mario to roam freely around the castle first floor. If Mario did not hit door 1, then a check is made at block 955 to determine whether Mario touched door 2. In the exemplary embodiment shown in FIG. 15B, if Mario hit door 2, then a check is made to determine whether Mario has more than one star (957). In this exemplary embodiment, if Mario has more than one star, then Mario is permitted to enter course 2 by leaping through a course 2 related picture of the nature shown in FIG. 15D. If Mario has not accomplished the goal defined for entering course 2, then the routine branches back to block 927 for further inside the castle first floor processing. The FIG. 15B door processing related steps such as, for example, represented by blocks 955, 957, 959 for door 2, is a simplified version of the door/goal achievement processing shown in FIG. 14A, which shows the door opening related processing in further detail. If the check at 955 indicates that Mario did not hit door 2, then a check is made at 961 to determine whether Mario touched door 3. If Mario did not touch door 3, then the routine branches back to block 927 as previously described. If Mario did hit door 3, then a check is made to determined if Mario accomplished the goal for entering course 3. For example as shown at block 963, a check is made to determine whether Mario has more than three stars. If Mario has accomplished the goal for entering course 3, then door 3 is opened and Mario is permitted to leap through a FIG. 15D type picture to enter course 3 (965). After completing or exiting course 3, the routine branches back to block 927 for first floor castle processing.

As described above in conjunction with FIG. 15D, entry into a course typically takes place by a player controlling Mario to leap through a picture hanging on the wall in the three dimensional castle. In accordance with the video game methodology of the present invention in an exemplary embodiment, the state of a course changes depending upon the manner in which the course was entered. By way of example only, in one embodiment of the present invention, the height at which Mario jumps into a picture for course entry is used to control, for example, the water level of a body of water displayed in the course. The height or the level of the water may, in turn, impact the ability of the player to achieve a predetermined course goal. As opposed to leaping into a picture to enter a course, in accordance with an exemplary embodiment of the present invention, a clock or a representation of any other person, place or thing may be used. Under the circumstances where a clock is used, the position at which Mario leaps into the clock or the line, i.e., the relationship between Mario's entry and the position of an hour or minute hand of the clock, may be used to control the state of the course entered.

Figure 16:
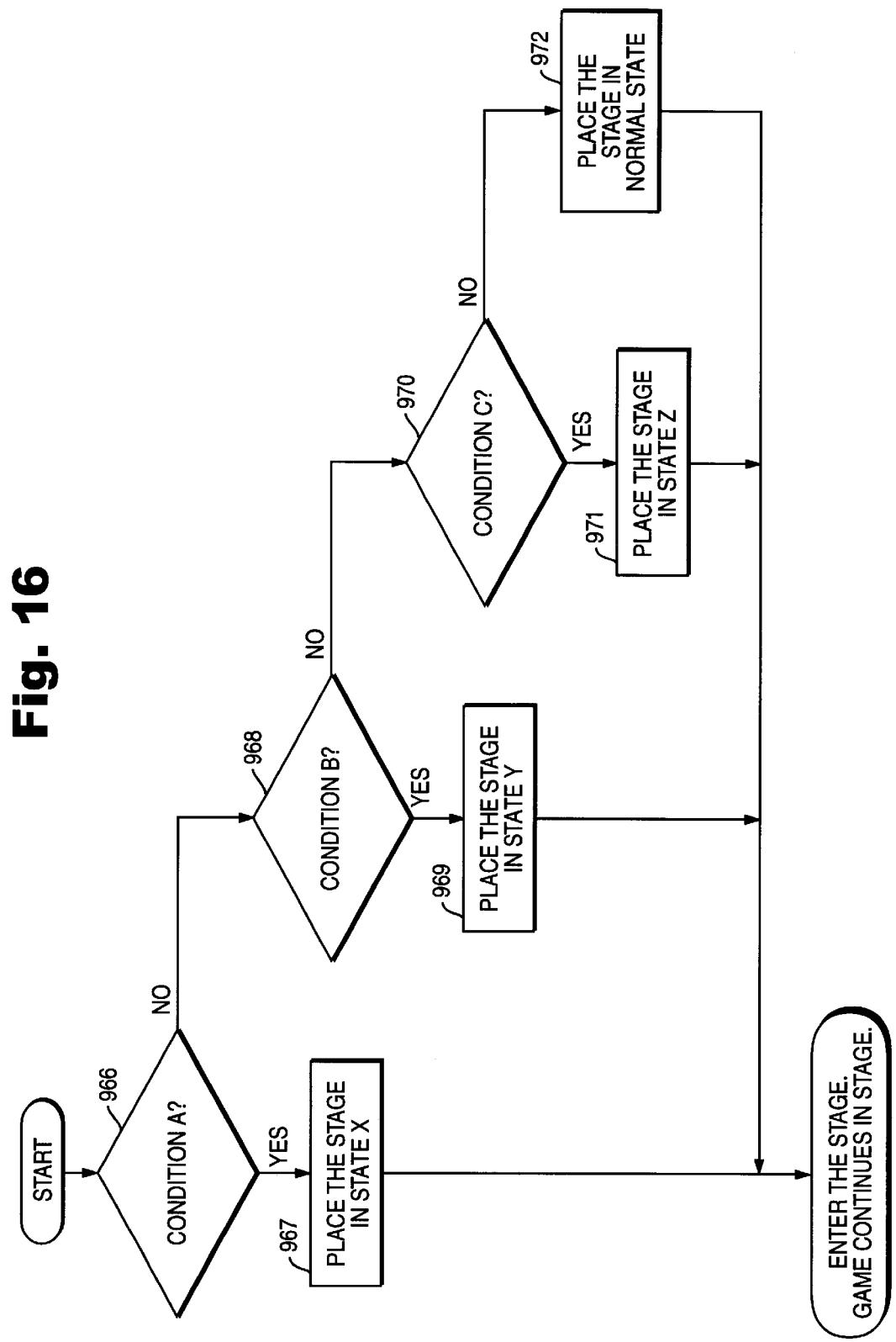
FIG. 16 is a flowchart showing the effect of a character's manner of course entry on the state of the course.

Such course state processing is shown in FIG. 16, wherein a check is first made at 966 to determine whether the player has entered a course under condition A, where condition A may, for example, be a character's entry via the hour hand of a clock being at 10 o'clock. If this condition is met, then the course is set to a predetermined state X (967), associated with entry at 10 o'clock.

If the check at block 966, indicates that entry via condition A was not met, then a check is made at 967 to determine whether entry by condition B was detected, where condition B may be the hour hand being at 12 o'clock. If entry was accomplished via condition B, then the stage or course entered is set to another state Y (969). If the check at block 968 indicates that the entry was not by condition B, then a check is made at block 970 to determine whether entry was made in condition C, which may be, for example, the minute hand at 6. If entry was made via condition C, then the entered course or stage is set to a further different state Z. If entry was not made in condition C, as determined by the check at 970, then the stage or course is entered in its normal state. If the course is not entered in its normal state, then after the appropriate modification has been made to set the course into state X, Y or Z (e.g., changing the displayed water level to one of three levels), the course is entered and game play continues. It should be understood that more or less than three conditions may be utilized to set the course state in accordance with the present invention.

Figure 17:
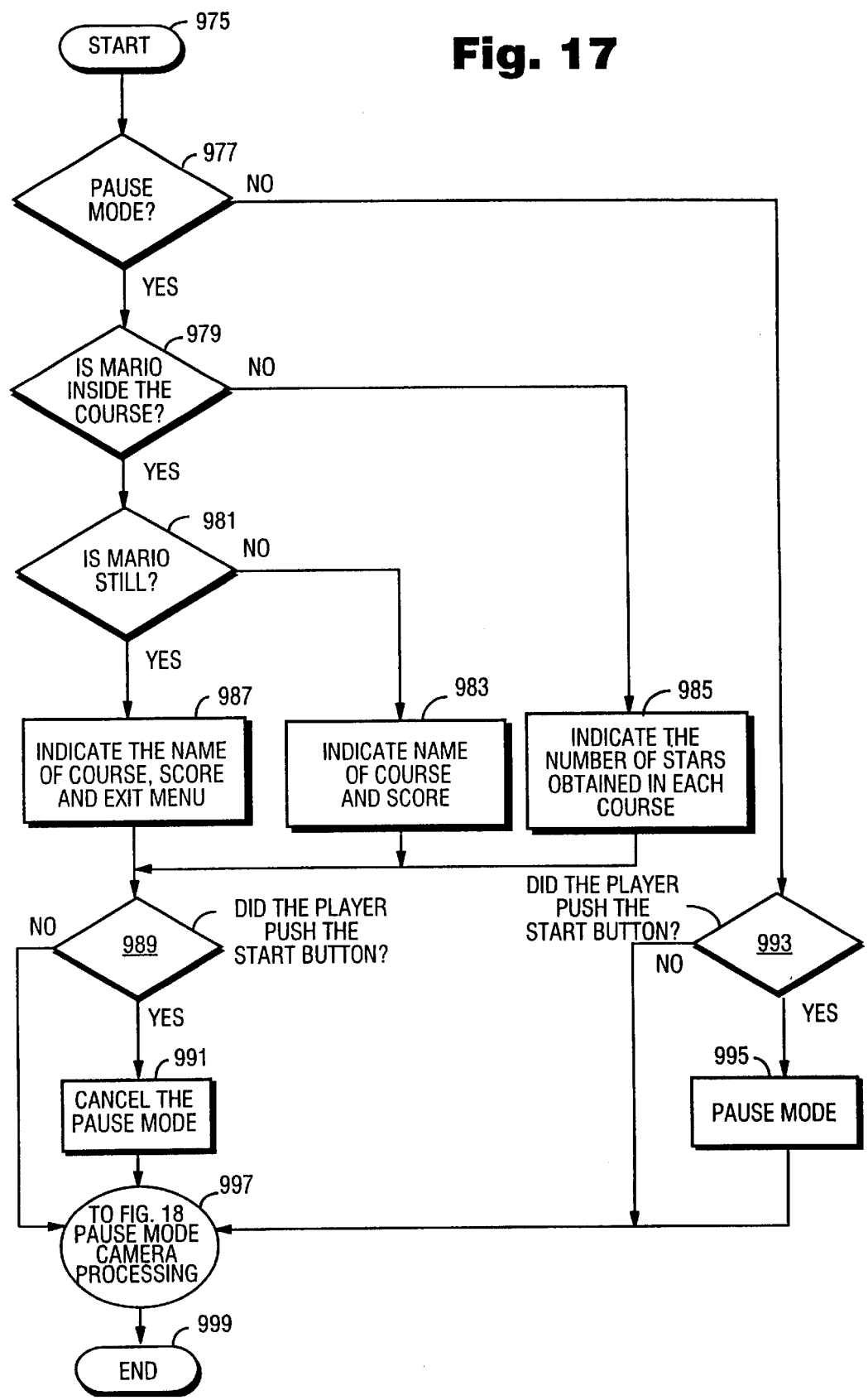
FIG. 17 is a flowchart relating to pause mode processing.

As exemplified by the FIG. 17 flowchart, the video game methodology of the present invention contemplates expansive pause mode features. The exemplary embodiment of the present invention utilizes three different types of pause features. Initially, in the pause processing routine, a check is made to determine whether a pause mode has been initiated (975, 977). If the system was not in the pause mode, then a check is made to determine whether the player pushed the start button on the FIG. 6 controller 56 (993). If the start button was depressed, then the system is placed in the pause mode such that a pause flag is set (995). If the player did not press the start button or after the pause mode has been set, the routine continues at 977, where FIG. 18 pause camera mode processing begins.

If the system is in the pause mode, then a check is made at 979 to determine whether Mario is inside one of the many three-dimensional world courses. If Mario is not inside one of the courses, but rather in the castle, for example, then as indicated at 985, under such circumstances, the pause mode display indicates the number of stars obtained in each course, as of the pause time. Thus, when Mario is not inside a particular course, the system may, for example, display the number of stars achieved or other goals accomplished during each of the plurality of courses or levels constituting the game.

If the check at block 979 reveals that Mario is inside a course, then a check is made to determine whether Mario is moving or still (981). If Mario is not still, then the pause screen displays the name of the course and the current score (983). If Mario was still at the time of the pause, then the name of the course, the score, and an exit menu for exiting the course is displayed (987). The exit menu is not generated if Mario is moving since permitting a player to exit under moving conditions would allow a player, who, for example, has erroneously controlled Mario to run off a cliff, to avoid suffering the penalty for such a mistake, e.g., dying. After processing at 987, 983 or 985, a check is made to determine whether the player pushed the start button (989). If so, then the pause mode is cancelled (991). If not, then the routine branches to block 997, 999 and the pause routine exits for return to the main game processing routine. The pause processing routine is repetitively called by the game processing routine once per frame to thereby continuously check for the pause mode by, for example, checking a pause mode indicating flag stored in RAM.

Figure 18:
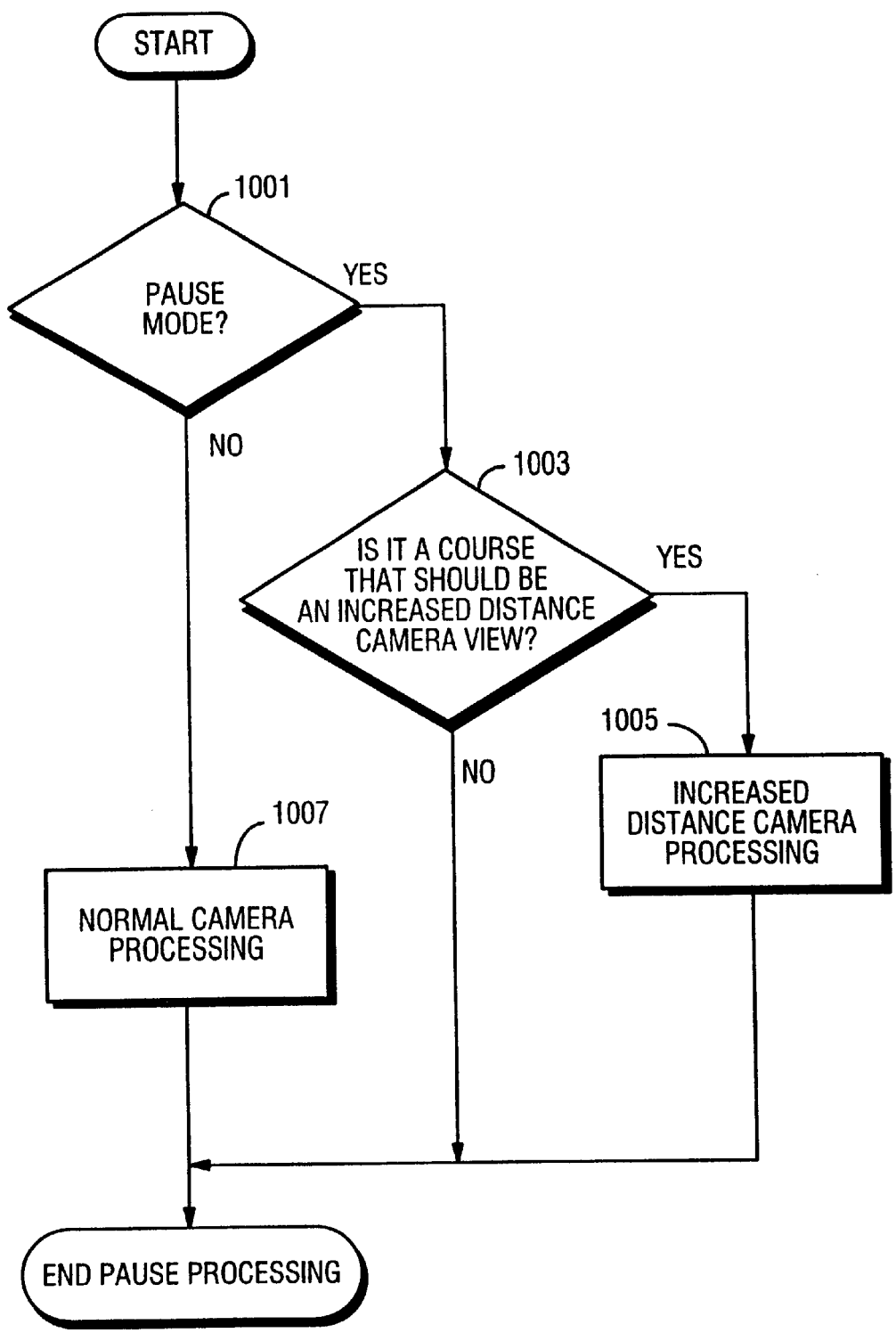
FIG. 18 is a flowchart relating to pause mode camera processing.

After the processing at 989, 991, 993, or 995, pause mode camera processing shown in FIG. 18 is initiated. Initially a check is made to determine whether the pause mode is in operation by checking the pause mode flag (1001). In the pause mode on a given course, it may be desirable to show a more distant view of the course to show the surrounding terrain area. However, if the pause is initiated when the player is inside the castle or in a small room or dungeon, such a view is not appropriate. If the check at 1001 indicates that the pause is not set, then normal camera processing for the game is employed (1007), pause processing ends (999 FIG. 17) and the routine branches back to the main game processing routine. If the check at 1001 indicates that the pause mode has been initiated, then a check is made to determine whether a course in which the pause mode has been initiated is a course in which an increased distance view is desirable. If the check at block 1003 indicates that the present course from which the pause mode was entered should not be depicted with increased distance camera processing, the pause processing exits at 999 of FIG. 17. If increased distance processing is desired as determined by the check at 1003, then increased distance camera processing is commenced (1005), after which the pause processing routine exits at 999 of FIG. 17.

The present invention permits the player-controlled game character, e.g., Mario, to explore a wide range of 3-D environments, such that the player has a wide variety of "camera" perspectives or points of view. In contrast with typical 3-D games, where the camera perspective is fixed such that it may be difficult to appropriately judge the most desirable movement, the present invention allows the player to view the game from many different angles and distance ranges. Game strategy requires the user to switch perspectives so that critical parts of a course are in the user's view.

The present invention allows the user to manipulate the "camera angle". As explained below, some camera angle adjustments are made automatically. Other camera angle adjustments are advantageously controlled by the user depressing control keys 404C–405F shown in FIGS. 6 and 7 (the "C" buttons). The number of camera control keys may be modified to meet the individual game designer's needs.

Figure 20A:
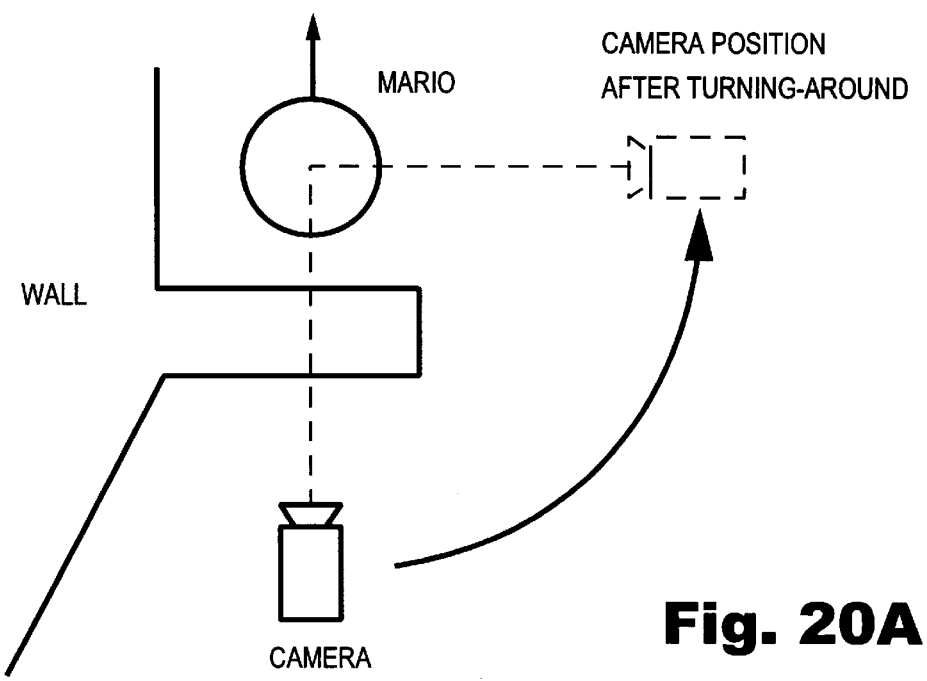
FIGS. 20A–20H are camera processing related diagrams used to explain the FIGS. 19A and 19B processing.

An explanation is now made concerning changing the camera perspective (point of view) in three-dimensional space. That is, typically in the conventional 3D game, when an object (e.g., a wall or an enemy character) exists between a camera and a player controlled object (e.g., Mario) as shown in FIG. 20A, the player-controlled object (or Mario) cannot be viewed or "photographed" by the camera. In contrast, it is possible in accordance with the present invention to continuously display Mario at all times by, in effect, turning the camera around Mario up to a lateral side thereof as shown in FIG. 20A.

Figure 20B:
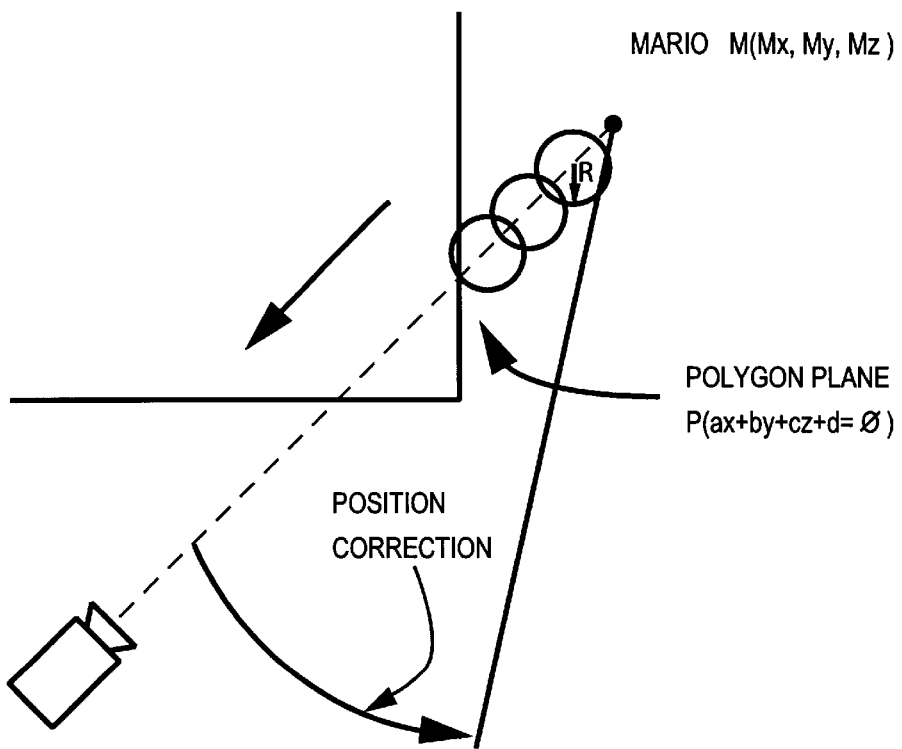

Stated briefly, where the objects are situated as shown in FIG. 20B, a determination is made of a potential collision with a topographical polygon extending from Mario's side, at several points on a straight line between Mario and the camera. On this occasion, checking is made for a polygon that is perpendicular to an XZ plane inside a radius R from each point. The process of turning-around of the camera is performed on a polygon P determined as collisional. The wall surface P is expressed by the flat-plane equation as given by Equation (1).

$$Ax+By+Cz+D=0 \tag{1}$$

The correction in "camera" position is done by moving the "camera" in parallel with this plane P. Incidentally, the angle of the Y-axis in parallel with the plane is calculated by the same flat-plane equation.

Figure 19A:
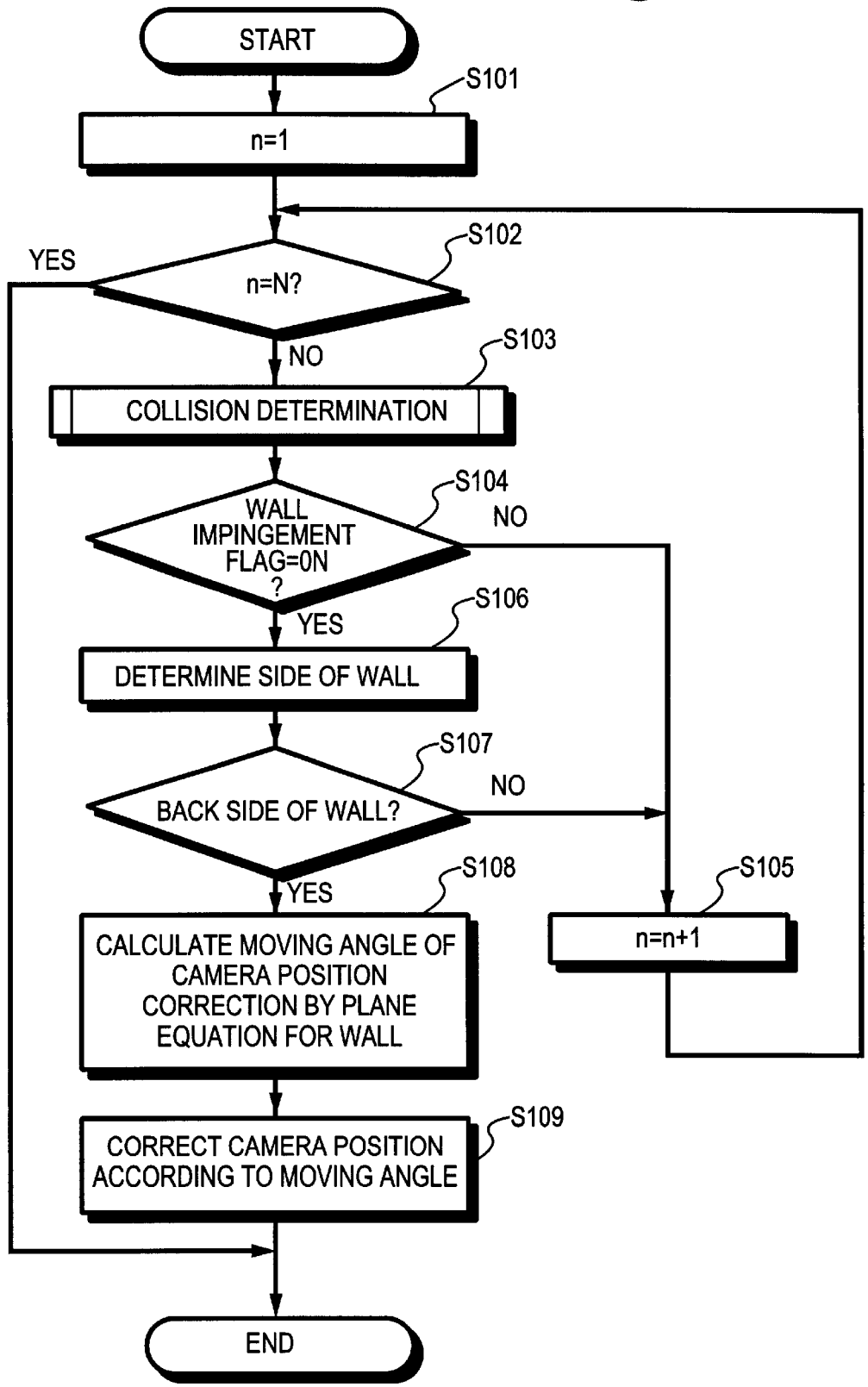
FIGS. 19A and 19B show changing camera perspective related processing.

Explaining in further detail, in conjunction with the flowchart of FIG. 19A, the No. n of a polygon to be collision-determined is initialized (n=1) at a first step S101. At a next step S102, it is determined whether or not the number N of polygons desired to be checked and the polygon No. n are equal, that is, whether or not collision-determination has been made for all necessary polygons. If the check at step S102 indicates that more polygons need to be checked then a collision-determination is made at step S103.

Figure 19B:
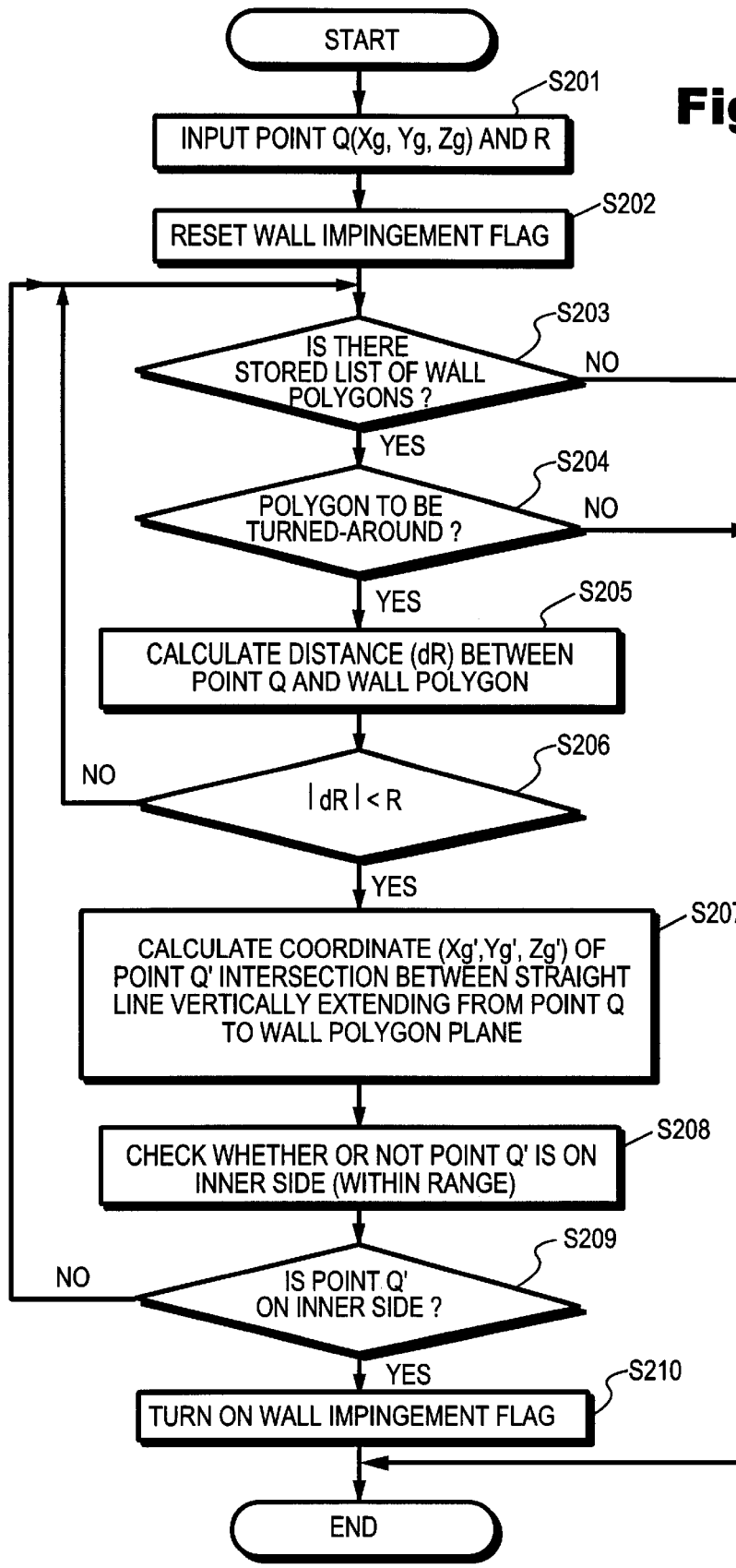
Figure 20C:
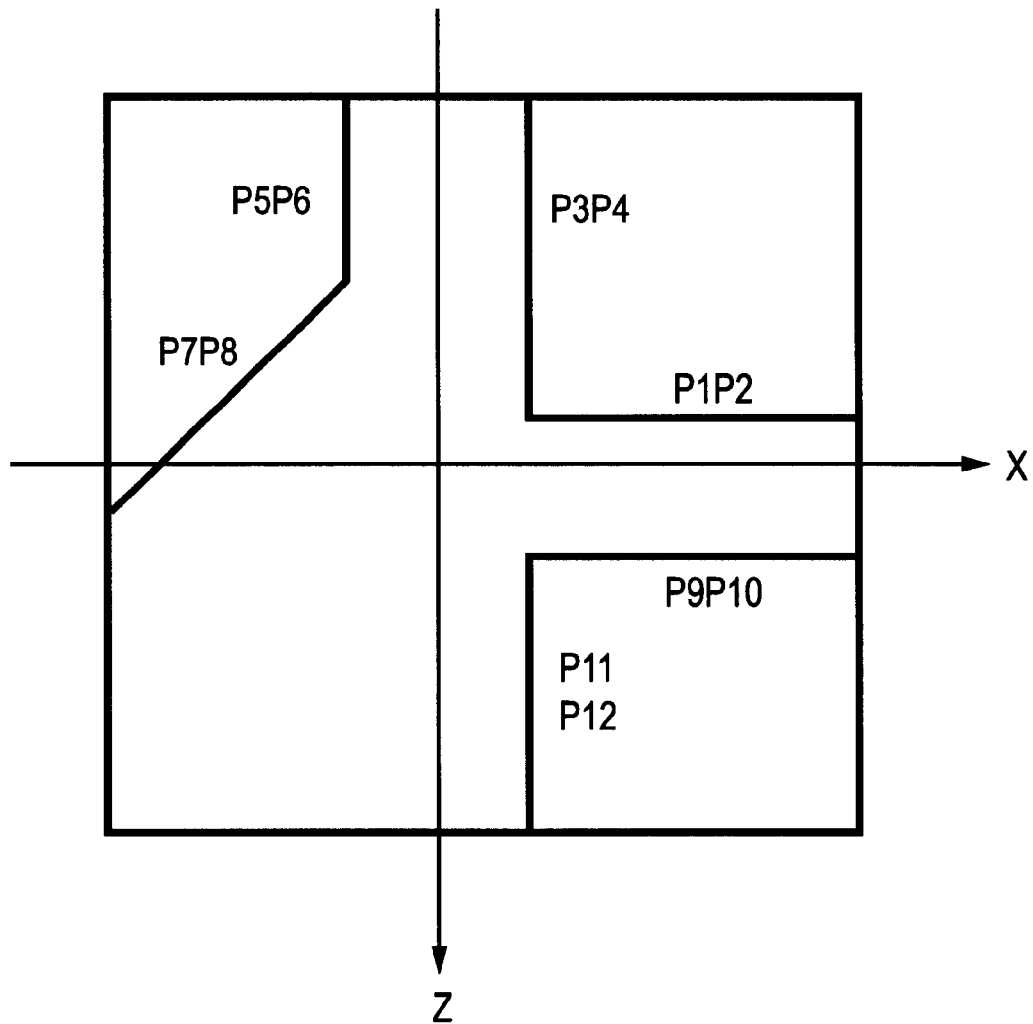
Figure 20D:
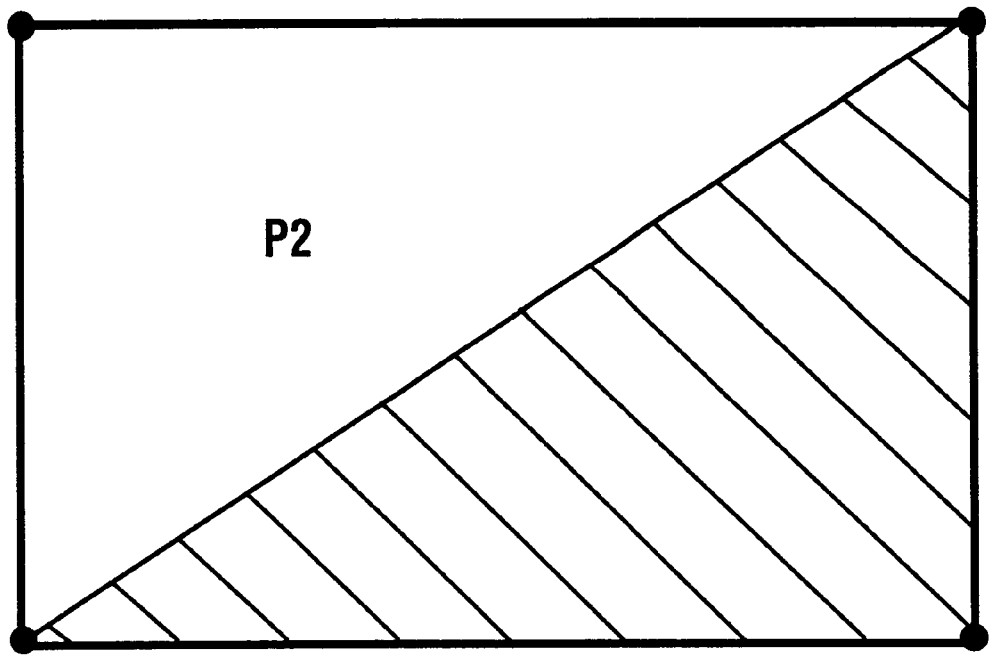

FIG. 19B shows step S103, i.e., an illustrative collision-determination routine, in detail. Before explaining this collision-determination routine, reference is made to FIG. 20C and FIG. 20D, which show exemplary wall data to be collision-determined. That is, wall data is depicted as in FIG. 20C, wherein triangular polygons as in FIG. 20D are gathered together. These respective polygons are stored as a listing of wall polygons in memory.

At a first step S201 in FIG. 19B, a point Q (Xg, Yg, Zg) and a radius R are input. Incidentally, the point Q is a point to be checked and the radius R is a distance considered to be collisional. At step S202, a wall-impingement flag is then reset. At a step S203, it is determined whether or not the wall-polygon list identified above is stored in memory. If a wall polygon list exists, it is determined at a next step S204, whether or not the polygon under consideration is a polygon to be processed by turning around of the camera. If so, the process proceeds to a step S205.

At step S205, the distance (dR) between the point Q and the plane of the wall polygon is calculated according to Equation (2).

$$dR=Axg+Byg+Czg+D \tag{2}$$

Then at a step S206 it is determined whether or not the distance dR calculated at the step S205 is smaller than the radius R. When the distance dR is greater than the radius R, there is no collision between Mario and the wall, and accordingly the process branches back to step S203.

Figure 20E:
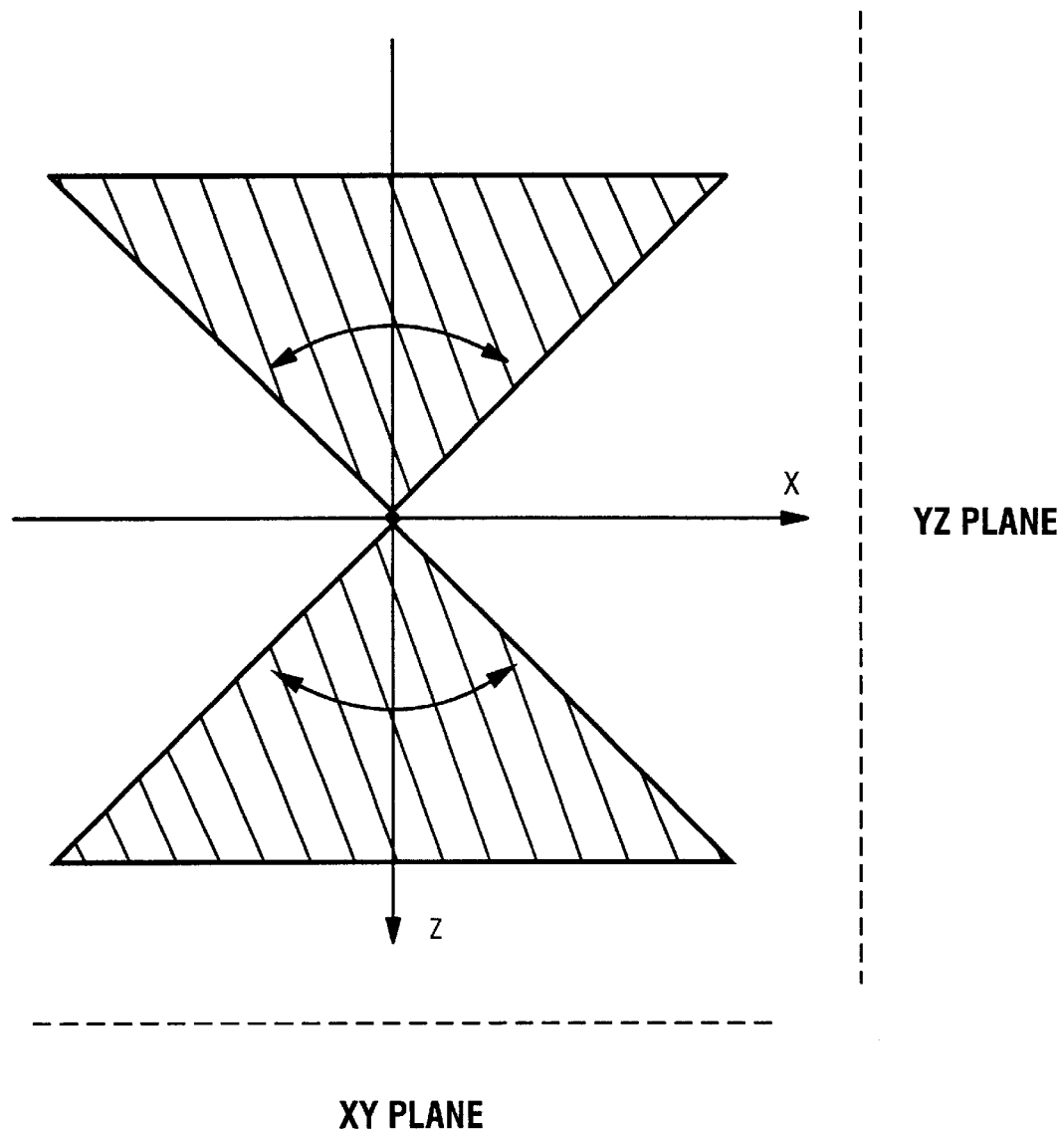
Figure 20F:
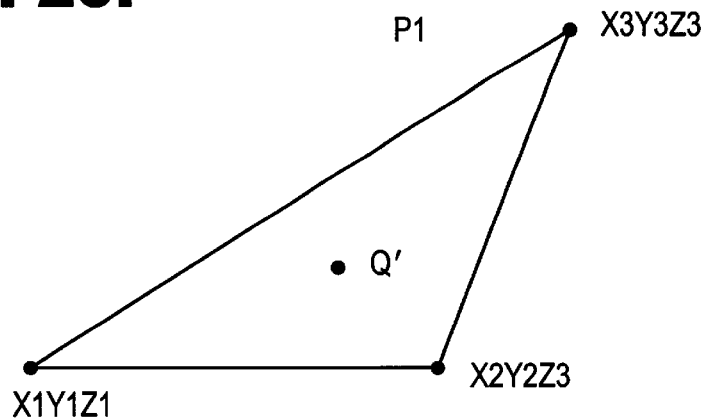

If step S206 indicates that |dR|<R, a calculation is made at step S207 according to Equation (3) for determining the positional coordinate (Xg', Yg', Zg') of a point of intersection Q' (FIG. 20F) between a straight line extending from the point Q vertically to the wall polygon P and the plane of the wall polygon.

$$Xg'=Xg+A\times dR$$

$$Yg'=Yg+B\times dR$$

$$Zg'=Zg+C\times dR \tag{3}$$

Then at step S208, it is determined whether or not the point Q' is on the inner side of the polygon (within range). At step S208, it is determined onto which plane projection is to be made in dependence upon the direction of the wall (a value A). That is, when A<−0.707 or A>0.707, projection is onto a YZ plane shown in FIG. 20E. Otherwise, the projection is onto an XY plane. Where the projection is onto the YZ plane, it is determined whether or not in FIG. 20F the point Q' is on an inner side of the polygon P1.

Figure 20G:
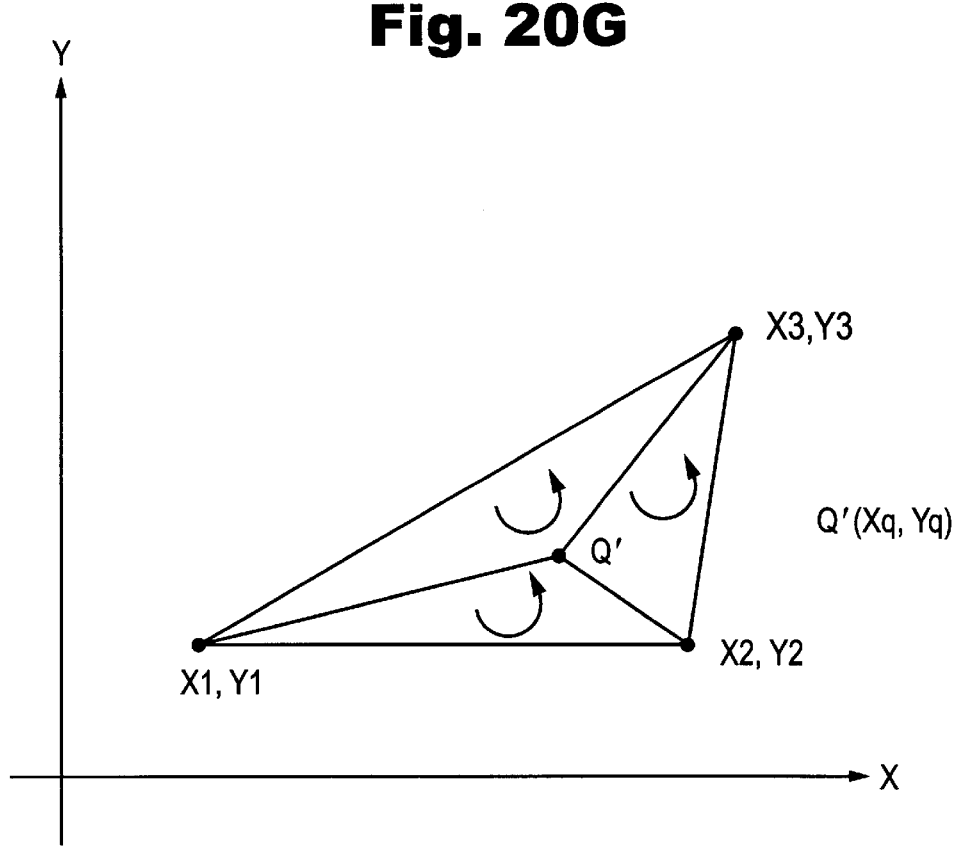

Meanwhile, where the projection is onto the XY plane, it is determined on the point Q' and apexes of the polygon P1 in FIG. 20G whether the value of counterclockwise cross product is positive or negative. That is, when C in the polygon-plane equation is C≧0, if each of the resulting cross products is 0 or negative, then determination is that the point Q' is on the inner side of the polygon P.

$$(Y1-Yq) \times (X2-X1) - (X1-Xq) \times (Y2-Y1) \leq 0$$

$$(Y2-Yq) \times (X3-X2) - (X2-Xq) \times (Y3-Y2) \leq 0$$

$$(Y3-Yq) \times (X1-X3) - (X3-Xq) \times (Y1-Y3) \leq 0 \quad (4)$$

Meanwhile, when C<0, if each of the resulting cross products is 0 or positive, then determination is that the point Q' is on the inner side of the polygon P.

$$(Y1-Yq) \times (X2-X1) - (X1-Xq) \times (Y2-Y1) \geq 0$$

$$(Y2-Yq) \times (X3-X2) - (X2-Xq) \times (Y3-Y2) \geq 0$$

$$(Y3-Yq) \times (X1-X3) - (X3-Xq) \times (Y1-Y3) \geq 0 \quad (5)$$

In this manner, the point Q' is checked at the step S208 as to whether it is on the inner side of the polygon or not, and thus within range. Based upon this check at step S209, it is determined whether or not the point Q' is on the inner side of the polygon. If "Yes" at this step S209, the wall-impingement flag that had been reset at the aforesaid step S202 is set (step S210). Thereafter the process returns to FIG. 19A.

Note that the above stated collision-determination is merely one example, and it should be recognized that the collision-determination is possible by other methods as would be understood by those skilled in the art.

Referring back to FIG. 19A, after the collision-determination at step S103, it is determined at step S104 whether or not the wall-impingement flag is set. If "No" at this step S104, the process of turning around is unnecessary, so that the No. n of a point to be checked is incremented at step S105 and the routine branches back to step S102.

Figure 20H:
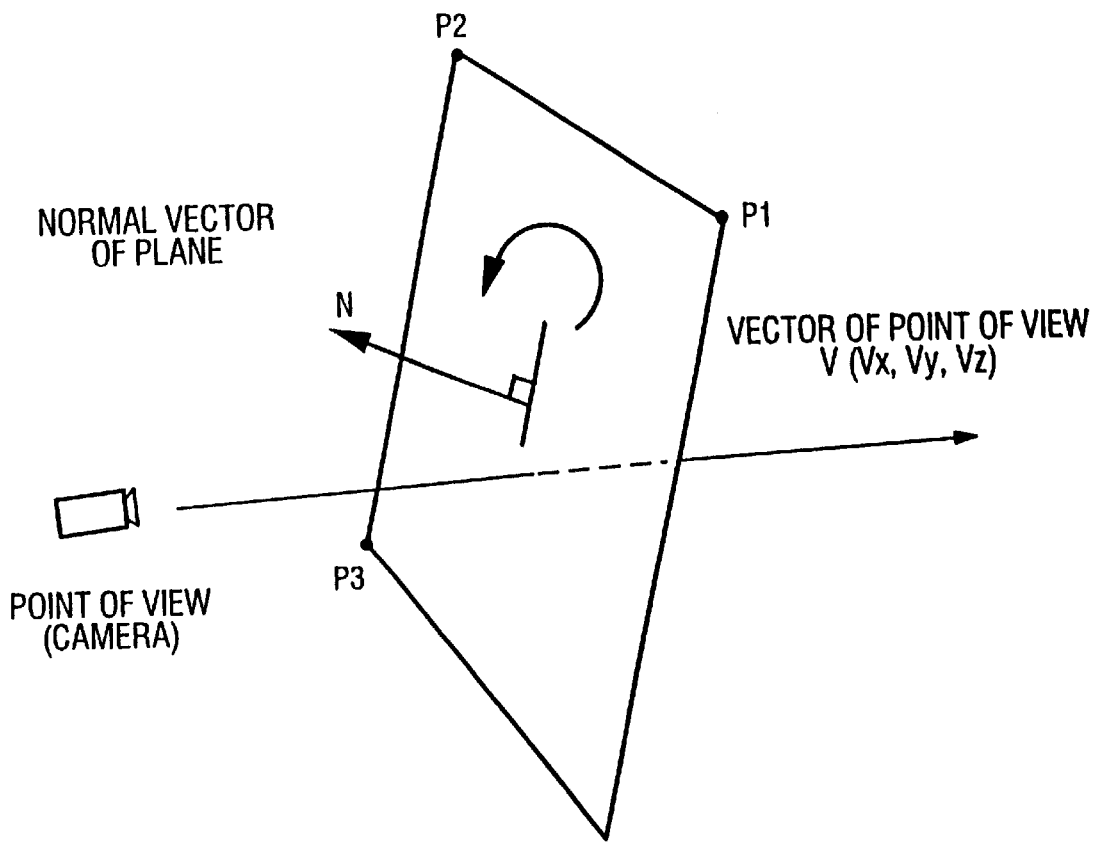

If step S104 indicates that the wall impingement flag is set, it is determined at a step S106 and a step S107 whether it is on a back side of the wall. That is, the directionality of the polygon is determined. Whether the polygon is directed to the camera (the point of view) or not can be determined by examining the sign of the dot product of a normal vector N and an eye (point of view) vector V in FIG. 20H. The conditional expression therefore is given by Equation 6.

$$A = V \cdot N = VxNx + VyNy + VzNz \quad (6)$$

With Equation (6), determinations are respectively possible such that if $A \geq 0$, the wall is directed to the camera (frontward) while if A<0, the camera is directed to a backside of the wall. If a plane existing between the camera and Mario is directed frontward relative to the camera, the turning-around of camera in FIG. 20A is not done. In this case, the No. n of the point is incremented at step S105, and the process branches back to the step S102.

If the plane between the camera and Mario is directed backward, the answer to the check at S107 is "Yes", and the turning-around process is carried out at subsequent steps S108 and S109. At step S108, the angle of movement through which the position of camera (photographing position) is altered is based on the flat-plane equation for the wall. That is, the flat-plane equation in terms of three points P1 (X1, Y1, Z1), P2 (X2, Y2, Z2), P3 (X3, Y3, Z3) on the flat-plane equation is expressed by a multi-term equation of Equation (7).

$$Ax + By + Cz + D = 0$$

where, $$A = Y1(Z2-Z3) + Y2(Z3-Z1) + Y3(Z1-Z2)$$

$$B = Z1(X2-X3) + Z2(X3-X1) + Z3(X1-X2)$$

$$C = X1(Y2-Y3) + X2(Y3-Y1) + X3(Y1-Y2)$$

$$D = X1(Y2Z3-Z2Y3) + Y1(Z2X3-X2Z3) + Z1(X2Y3-Y2X3) \quad (7)$$

The angle Ry of the normal vector with respect to the Y-axis is given by Equation (8).

$$Ry = \tan^{-1}(A/C) \quad (8)$$

Therefore, the turning-around angle of camera is either Ry+90° or Ry−90°. That is, at step S109 the camera is rotationally moved about Mario, or the operable object, in either direction Ry+90° or Ry−90°. Specifically, the movement is to a location closer to the presently-situated camera position (C in FIG. 20B).

The present methodology advantageously provides a wide range of camera modes, both automatic and user controlled. For example, one camera control key automatically causes the three dimensional world display from the perspective of the camera disposed above and behind the player controlled character, e.g., Mario. Depending upon obstacles in the way or the size of a particular room, the camera may not move right behind Mario. As will be explained more fully below, a player can control moving in for a close up or pulling back for a more distant view. Also, it is possible to move the camera right and left to change the angle to enable the player to see more of the course in which Mario is presently disposed. It is also useful for a player to manipulate the camera control keys to better judge jumps or determine more precisely where an object is located in relation to Mario. By striking a predetermined control button, one can switch to a perspective that is always adjusted to being right behind Mario. This mode is useful on very narrow platforms, and in enclosed spaces. One can switch between wide angle and close-up and can pan left or right, but ultimately the camera returns to right behind Mario in such a camera mode. A fixed perspective camera mode allows a user to have an objective view as Mario jumps around the courses as opposed to the subjective view from Mario's perspective. If the camera were disposed in one spot, Mario can appear to run out of sight extremely fast. In a look around camera mode, a player can come in for an extreme closeup, and move Mario's is head around to scan the entire surroundings using the control joystick. This look around camera mode permits the user to look everywhere, including up to see how huge the level is or to look down over a cliff to see if there are any objects not viewable previously, or to look off in the distance to discover coins. The present methodology of supplying the user with the ability to selectively choose camera angles, permits the user to perform better in the game. By moving the camera back, it is possible to get a better feel for what is ahead. By panning left and right, the user can gain a better angle to attack a jump, navigate a narrow ledge or see what is around the corner. By changing Mario's perspective, it is possible to increase the obtainable degree of agility and precision. If a cliff or a high tower is associated with Mario's present position, by changing the camera angle to look down and to the side, for example, it is possible to view aspects of the course which were not viewable previously.

Figure 21:
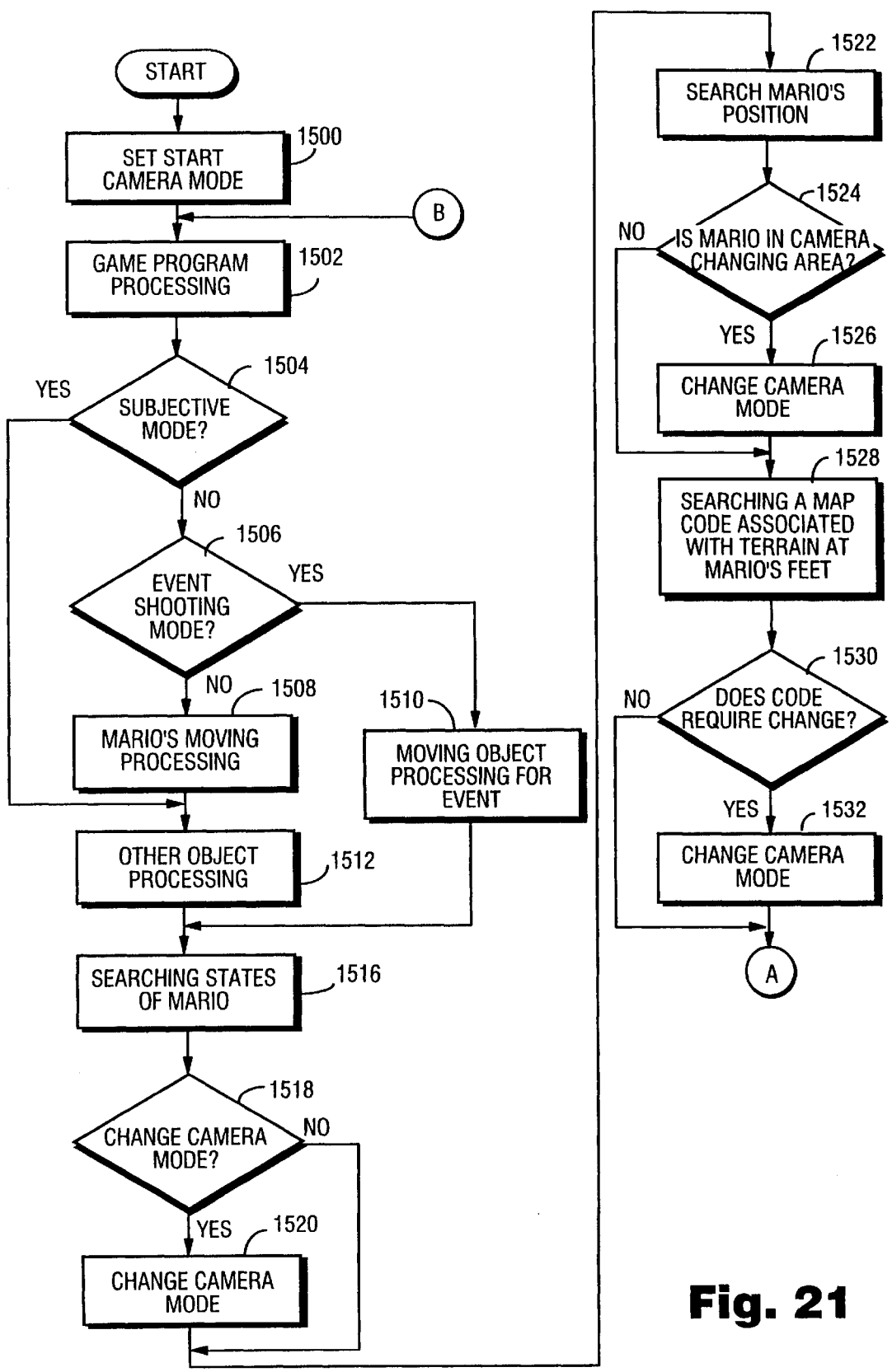
FIGS. 21 and 22 are flowcharts depicting camera mode processing.
Figure 22:
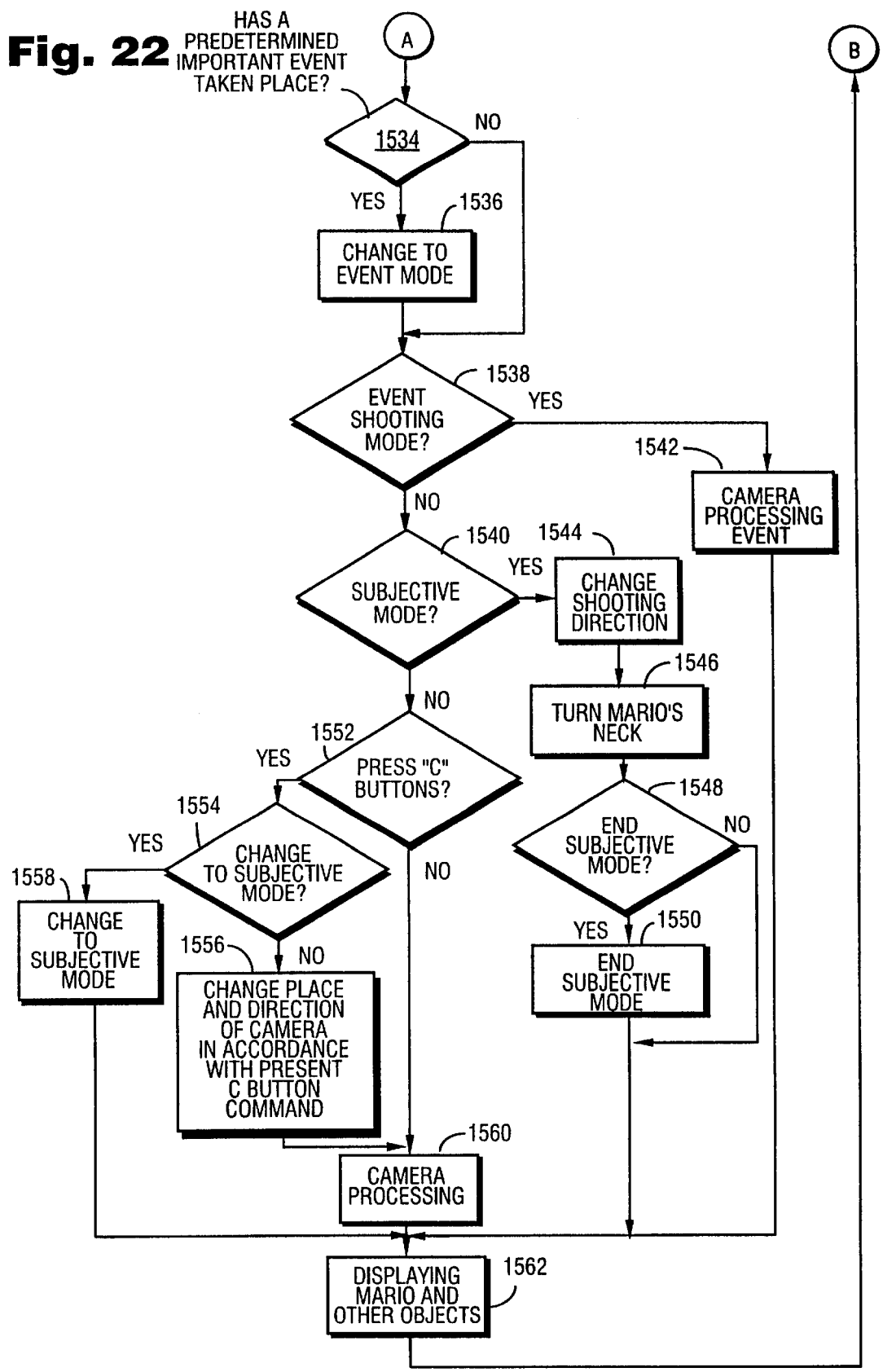

FIGS. 21 and 22 are a flowchart delineating the sequence of operations performed during camera mode processing. As indicated at block 1500, an initial camera mode is set. The initial camera mode set may vary depending upon the particular game status from which the game is starting. Thus, the initial camera mode may be modified depending, for example, on what course or level is being entered, to thereby set the camera mode to the best available automatic camera mode for the particular portion of the game resumed upon initialization. As indicated at block 1502, other game program processing is then performed in addition to camera mode control, such as display generation, tallying the number of stars and coins attained, etc. A check is then made at block 1504 to determine whether the camera mode is the subjective mode, as indicated, for example, by the state of a subjective mode flag. The subjective camera mode indicates that the camera mode perspective is from the subjective point of view of the player-controlled character, e.g., from directly behind the head of Mario. If the current camera mode is the subjective mode, then the routine branches to perform other object processing 1512, to thereby skip Mario's movement processing, since Mario is not displayed as moving or otherwise in the subjective mode.

If the current camera mode is not in the subjective mode, then a check is made to determine whether the current camera mode is in the event shooting mode (1506). The event shooting mode is a camera mode in which, for example, a sequence of display frames is generated to dramatize the discovery of a star by a player. This mode also encompasses display sequences associated with game title screen and ending screen demonstrations. The event shooting mode may be triggered by any predetermined game event. If the camera mode is the event shooting mode, then Mario's movement (i.e., the player controlled object) and the movement of "enemy characters" are stopped to thereby maintain the relative positioning between Mario and an enemy prior to the event detection (1510). Additionally, in the event shooting mode, different moving objects are generated in accordance with the event detected, e.g., star generation and celebration display sequence.

If the check at 1506 indicates that the system is not in the event shooting mode, then normal game processing movement of Mario and other objects take place (1508, 1512). Thus, in accordance with the processing at 1508, 1512, normal game play control of Mario and enemy movement occurs.

After the object processing in 1512, the program enters into a camera mode changing sequence of operations. Initially, a search is made of the states of Mario to determine whether Mario is in a state of jumping, swimming, flying, etc. (1516). There are three basic conditions which determine change in camera mode: (1) the state of Mario, (2) the position of Mario requiring a camera mode change and (3) the condition of the terrain or ground over or through which Mario passes, as determined by information associated with the detected terrain information at Mario's foot position.

Turning back to block 1516, after searching to determine the present state of Mario, a check at block 1518 determines whether the camera mode need be changed. Associated with the character Mario, is a stored indication of the objects present state, e.g., running 10, flying 13, etc. Depending upon the detected state of Mario, a determination is made as to whether such a state requires a change in the camera mode. For example, if Mario is swimming, the camera mode is switched to optimize the view of the water-filled terrain. If the check at block 1518 indicates that the camera mode needs to be changed because of Mario's state, then the camera mode is changed accordingly (1520).

After changing the camera mode at 1520, or if the camera mode need not be changed as determined at 1518, a search is made as to Mario's display position. Associated with the character Mario is a stored indication of his coordinate position in the current display frame. Based on the check of Mario's position on the display screen, as will be explained further below, a determination is made as to whether Mario's current position indicates that the camera mode should be changed (1524). If the current position check indicates that the camera mode should be changed then, as indicated at block 1526, the camera mode is changed. See FIGS. 25A–C, 26A and 26B and the related camera mode description set forth below.

The game program then initiates a search of the map code, then associated with Mario (1528). The map code indicates the current terrain associated with Mario's feet to indicate, for example, whether Mario is on a slippery slope or is under water, etc. A check is then made as to whether the current map code requires a camera mode change (1530). If the current map code check indicates that the camera mode needs to be changed, then such change is initiated (1532).

Turning to FIG. 22, a check is then made to determine whether a predetermined important game event is taking place (1534). If it is determined that a predetermined important event has taken place, then the mode is switched to event mode (1536). If a predetermined important event has not been detected as having taken place, then the routine branches to block 1538 where a check is made as to whether the routine is in the event shooting mode. If the camera mode is in the event shooting mode, then camera processing for the event is initiated (1542) and the routine branches to block 1562 in which Mario and other objects are displayed in accordance with the predetermined event.

If the check at block 1538 reveals that the routine is not in the event shooting mode, then a check is made at block 1540 as to whether the camera mode is currently in the subjective mode. If the camera mode is in the subjective mode, then the camera shooting direction is modified, as previously described, to be from Mario's personal perspective (1544). In the subjective mode, the manipulation of the controller joystick results in turning Mario's head and the shooting direction is changed accordingly (1546). A check is made at block 1548 to determine whether the subjective mode is ended. If so, the subjective mode is concluded, the subjective mode flag is turned off, and processing continues by displaying Mario and other objects (1562).

If the check at block 1540 reveals that the current camera mode is not the subjective mode, then a check is made to determine whether any of the C buttons on the controller have been pressed. As previously described, the controller C buttons are shown in FIG. 6 as buttons 404C–F. If one of the C buttons has been depressed, a check is made at block 1554 to determine whether it is necessary to change to the subjective mode. If the C button depression indicates that a change should be made to the subjective mode, then such a change is initiated (1558) and the routine displays Mario and other objects in accordance with the then active camera mode at 1562. If there has not been a change to the subjective mode as indicated by the check at block 1554, then the direction of the camera and the apparent physical disposition of the camera is changed in accordance with the particular "C" button depressed (1556). After camera processing at 1560 has been completed to change to the new camera perspective, Mario and other objects are displayed in accordance with the new point of view (1562). The depression of particular C buttons modifies the apparent distance and/or angular relationship between the camera and Mario.

After camera processing in block 1560 and in accordance with the various camera modes described herein, Mario and other objects are displayed in accordance with the particular camera mode and the routine branches back to block 1502 in FIG. 21 for normal game program processing and the camera mode processing continues in accordance with the previously described methodology.

Figure 23A:
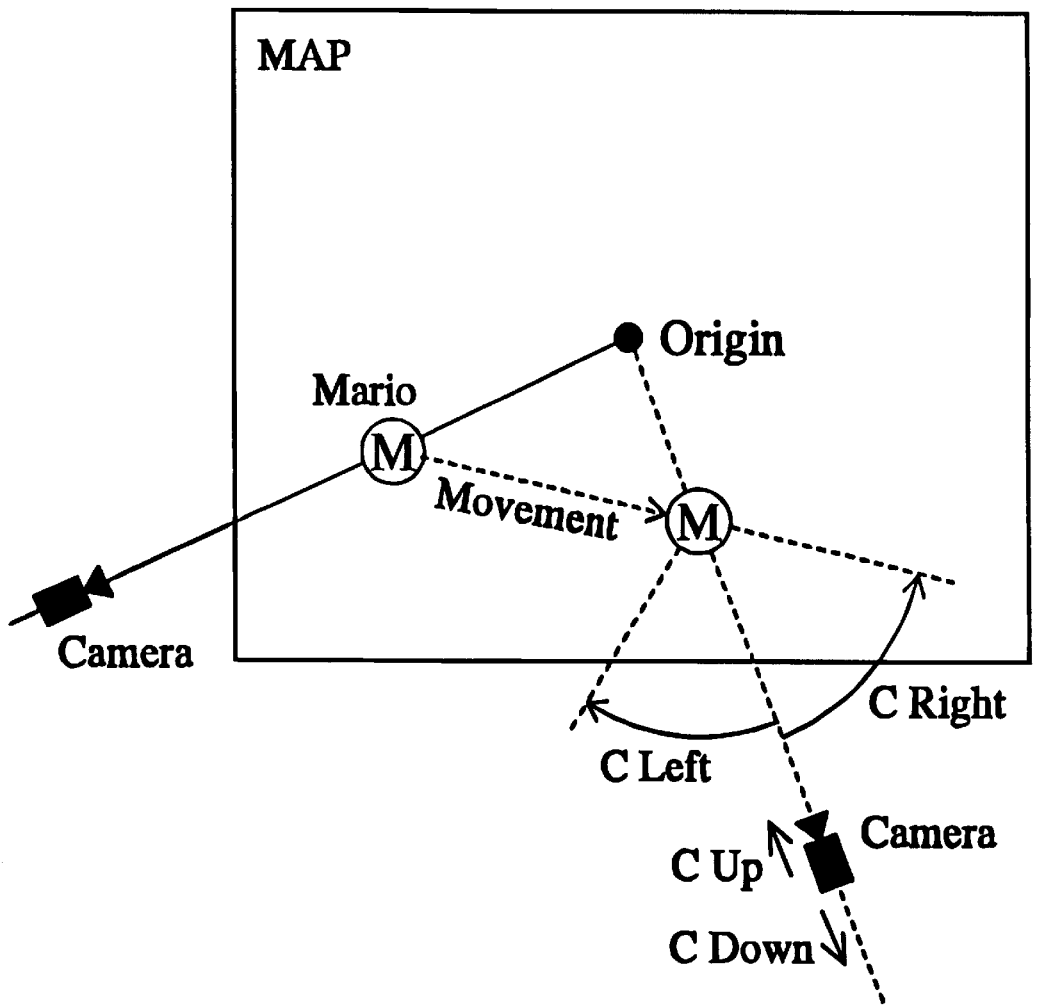
FIGS. 23A–23E depict exemplary camera modes.
Figure 26A:
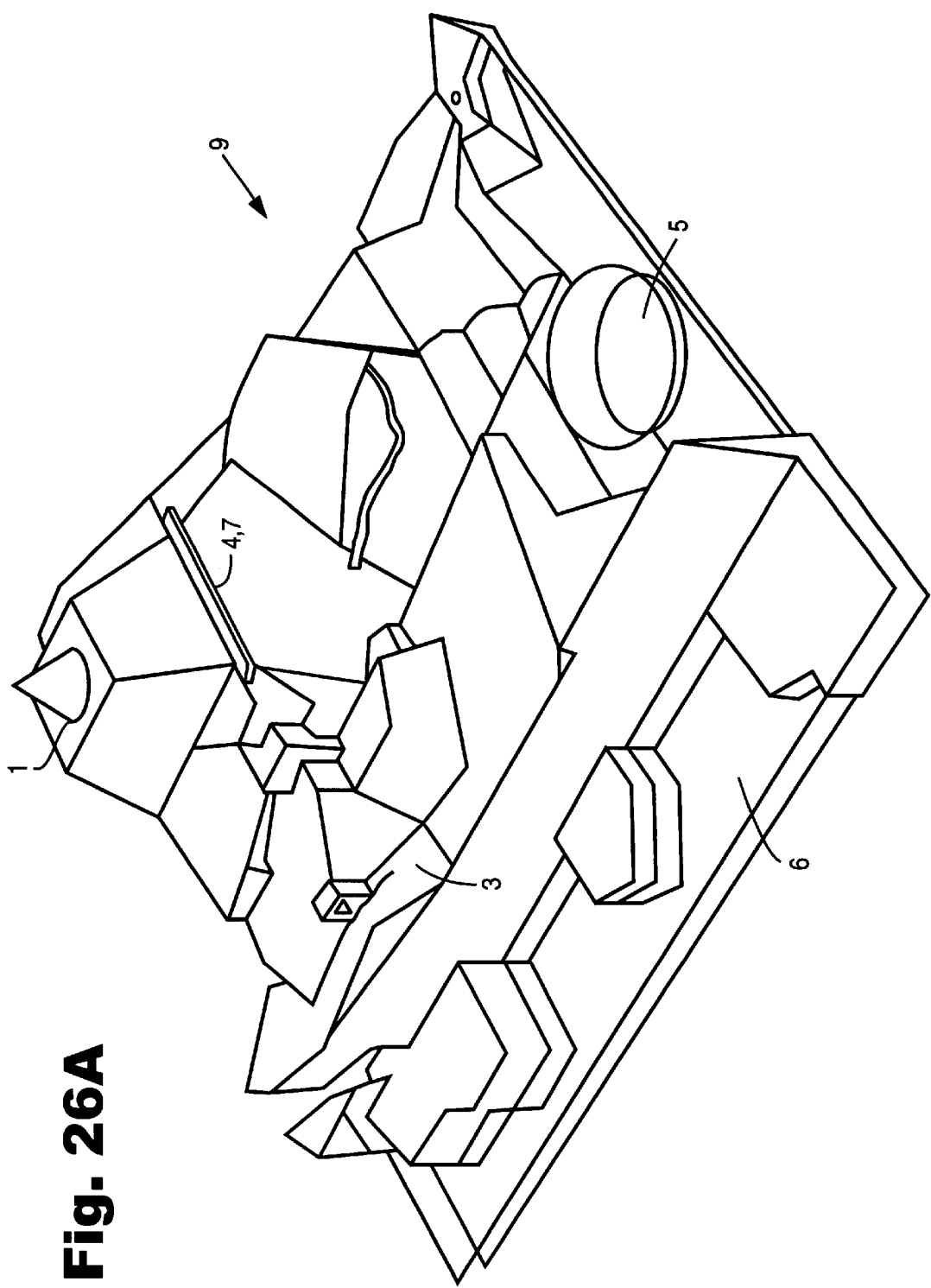
FIGS. 26A and B depict exemplary topographical surfaces and associated camera modes.
Figure 26B:
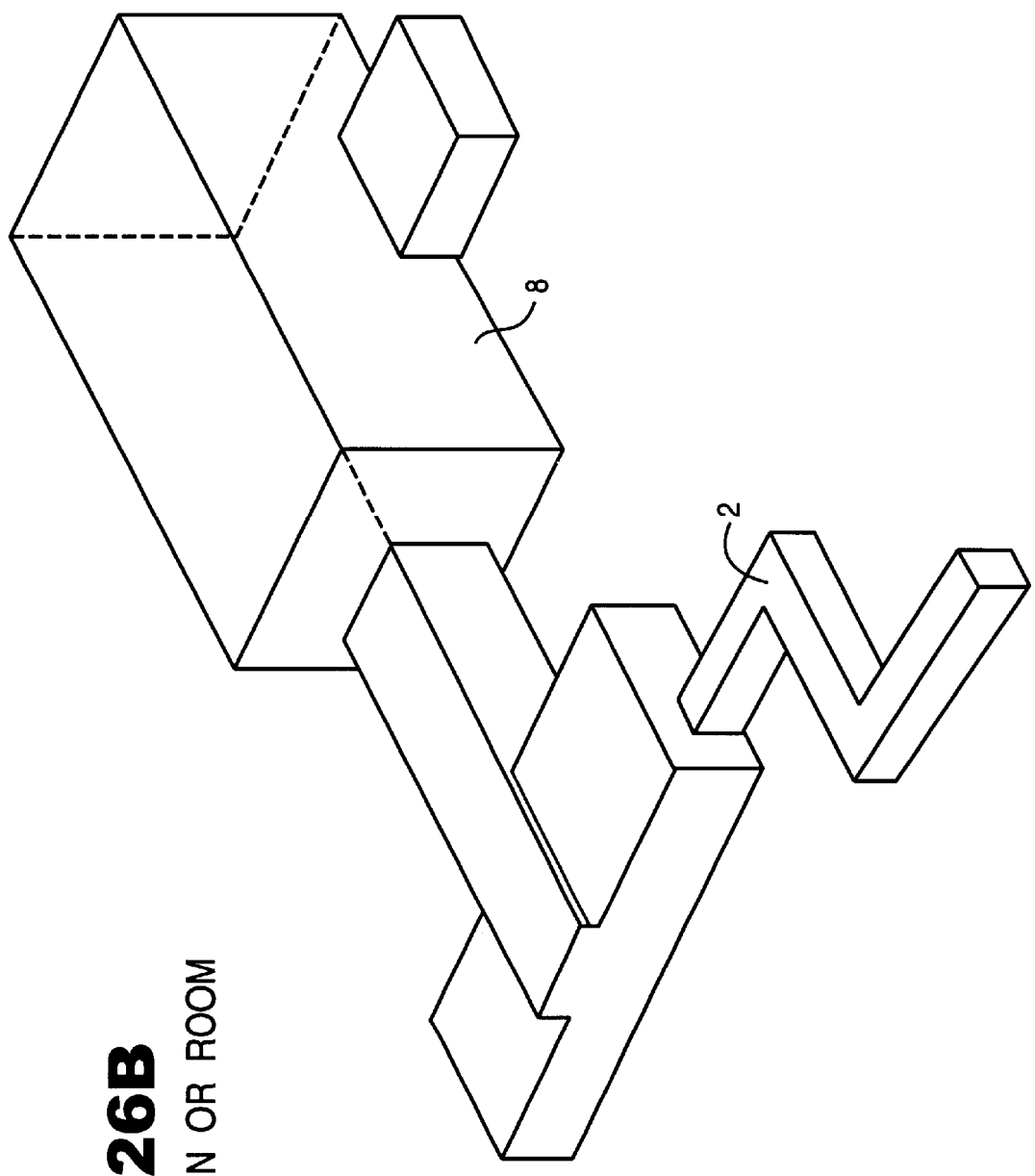

In the normal camera processing such as indicated in block 1560, the video game system is programmed to generate nine camera mode patterns, where program controlled switching from one mode to another occurs dependent upon Mario's detected condition or position in the three dimensional world course. Although nine camera patterns or modes are described below, it should be understood that the number of camera position patterns are given by way of example only, and should not be construed as limiting in any way. FIGS. 23A–23E visually portray five of the nine camera position patterns in accordance with the present methodology. These various modes are automatically invoked when a player is in course positions such as is shown in FIGS. 26A and 26B. It should be understood that the depiction of the camera represents the point of view in the displayed three dimensional world which is utilized in processing calculations for creating display frames in the particular camera position mode. In a particular mode, by depressing the C button on the controller shown in FIG. 6, the player can further modify the camera perspective as described below. For example, FIG. 23A depicts camera mode pattern 1 (which is referred to as the tower camera mode), where the circled "M" represents Mario, whose movement is indicated by the dashed line in FIG. 23A. From the first position indicated to the second position indicated, the apparent camera perspective changes with Mario's movement with the line of view of the first and second positions intersecting at the identified origin. With Mario at the point indicated in FIG. 23A by the arrow, if the left C button is depressed, the camera swings 60 degrees to the left of the center of Mario as shown. Similarly, if the right C button is depressed, the camera swings 60 degrees to the right of the center of Mario. If the C up button is depressed, the camera gets close to Mario, and if the C down button is depressed, the camera pulls away from Mario.

Figure 23B:
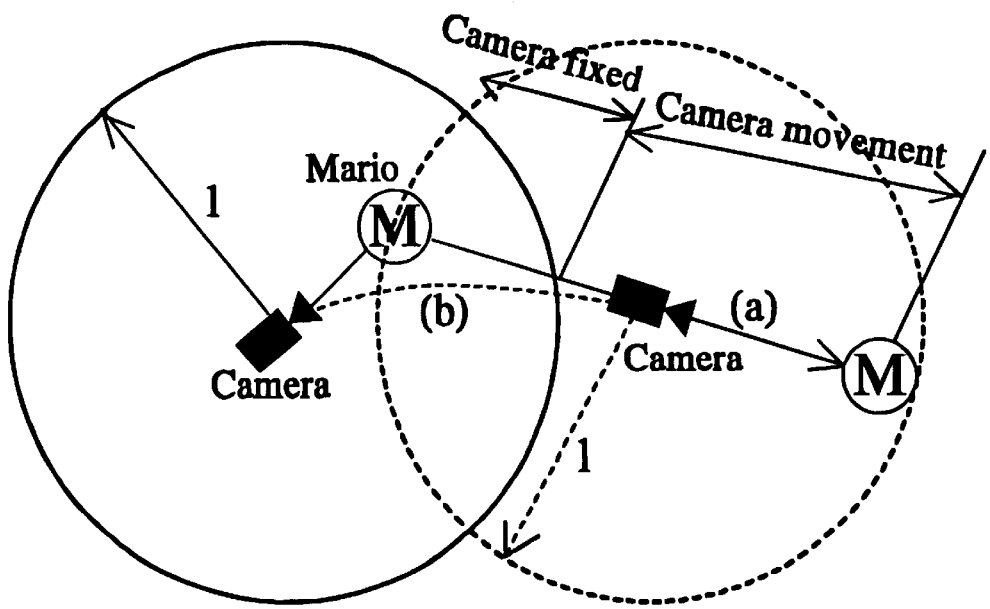

FIG. 23B shows a second camera mode (camera mode 2), which is referred to as the dungeon camera mode. In this mode, as the the character being controlled, e.g., Mario, is moved, the displayed camera view appears to chase Mario. If Mario exceeds a fixed distance from the camera, the camera moves to follow Mario. If the joystick is not used to control Mario, the camera view appears to automatically circle to the back of Mario. In FIG. 23B, the solid line with the arrowhead indicates the locus of Mario's movement, the dashed line indicates the locus of the camera, and the "small 1" indicates the maximum distance between the camera and Mario. Camera mode 3 is the slide camera mode in which the camera always is always located at the back of Mario. In this mode, Mario travels in one direction, and generally not in the reverse direction.

Figure 23C:
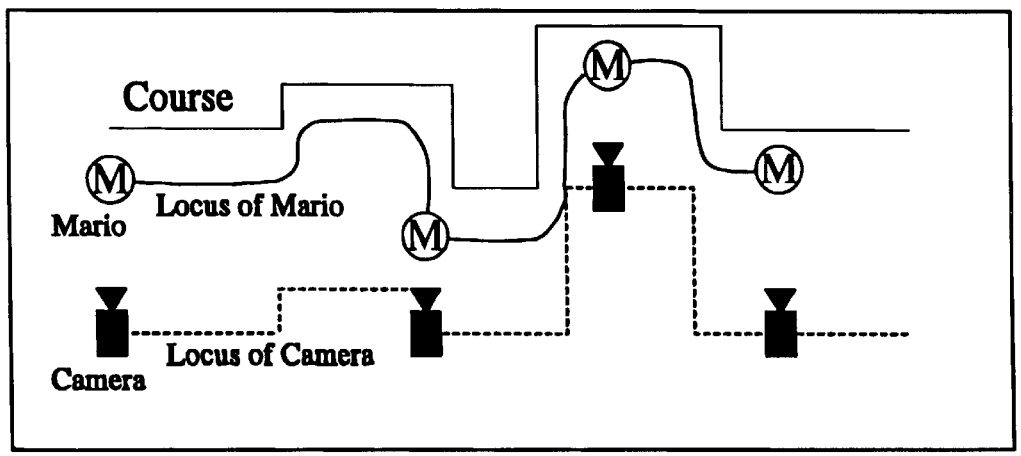

Camera mode 4 is referred to as the "parallel tracking" mode and, as shown in FIG. 23C, the camera always moves in parallel with the course. When Mario moves deeper into the course, the camera chases Mario in parallel with the course. The camera mode may be switched to parallel tracking camera mode 4, for example, under conditions when Mario is traversing a narrow bridge.

Figure 23D:
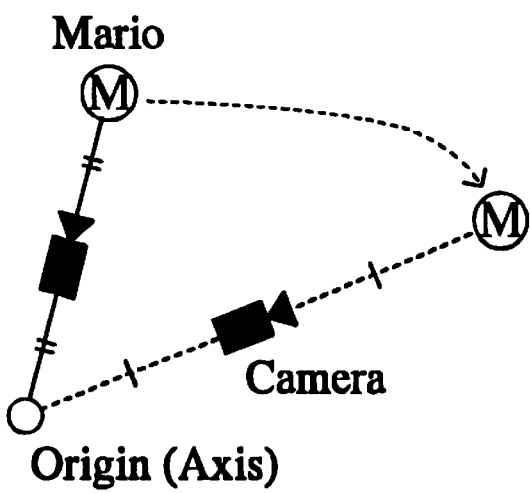

Camera mode 5 shown in FIG. 23D is referred to as the "fixed" camera mode. In this mode, the camera moves to a midpoint between the indicated origin point and Mario. The fixed camera mode provides a wider angled view of a course to ensure that the player controlled character will not be lost from the scene.

Camera mode 6 is the underwater camera mode. This mode is similar to the dungeon mode described above as camera mode 2. However, when Mario swims up the camera looks up at Mario and when Mario swims down, the camera looks down to Mario. In the underwater camera mode, when Mario stops, the camera automatically circles to the back of Mario.

Camera mode 7 is referred to as the VS camera mode. This mode is the same as the parallel camera tracking mode 4 shown in FIG. 23C. However, when two characters separate the camera pulls away from the two characters to display them on the screen. When the two characters approach, the camera gets close to them.

Figure 23E:
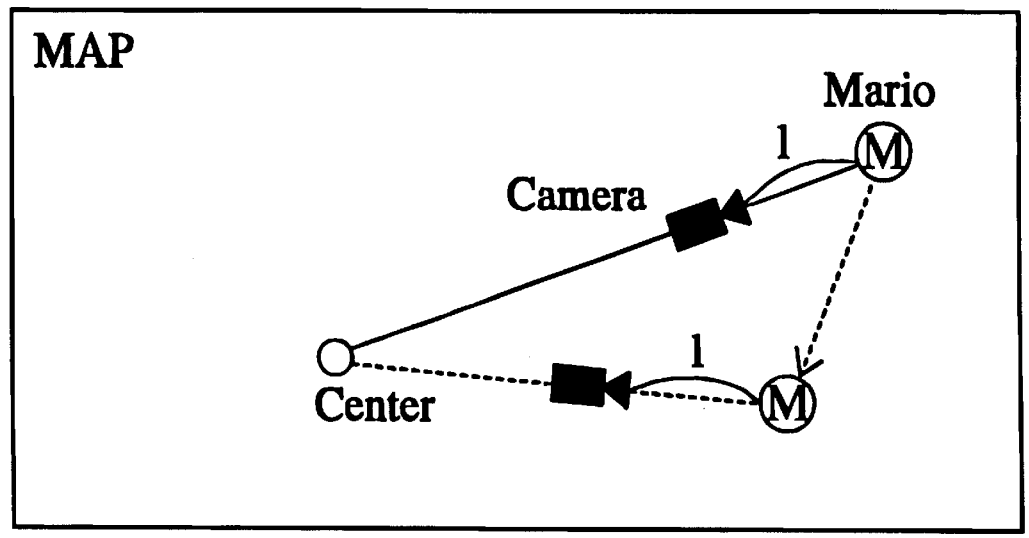

Camera Mode 8 is shown in FIG. 23E and is referred to as the opposite tower camera mode. This mode is similar in principle to the tower camera mode 1. As indicated in FIG. 23E, the distance between the camera and Mario remains a fixed distance L. The ninth camera mode is referred to as the flight camera mode. This mode is similar to the underwater camera mode 6.

FIGS. 26A and B depicts portions of two display screens and show the associated camera mode that will be switched on depending on the detected position of Mario. For example, if Mario is detected at the top of the tower, as indicated by the "1" in FIG. 26A, then the tower camera mode perspective is generated. If Mario is detected as being on the polygon representing a narrow ledge, then the parallel tracking camera mode 4 is switched to as indicated in FIG. 26A. If Mario is flying in the air then the flight camera mode 9 is switched.

Figure 24A:
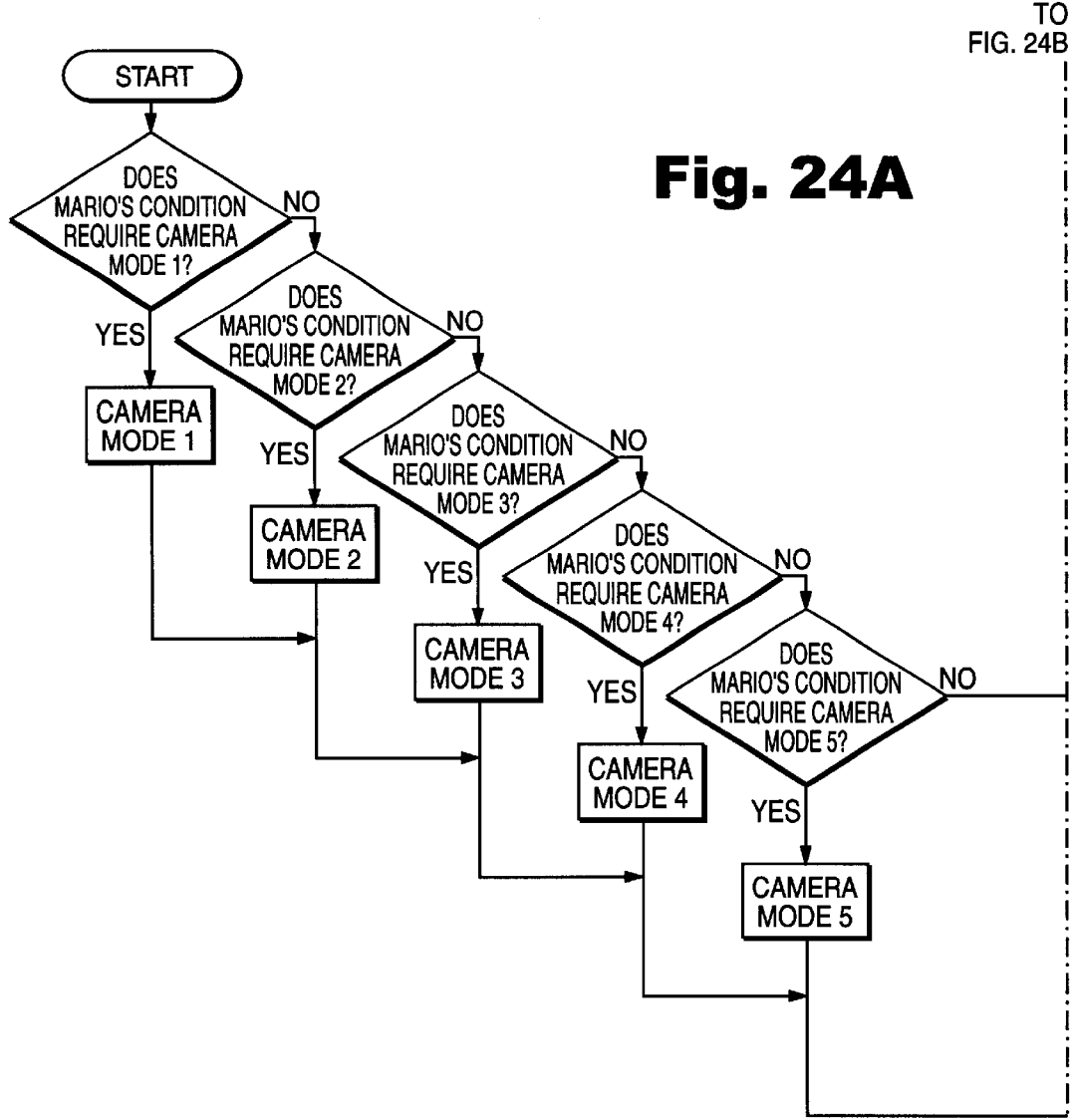
FIGS. 24A and 24B is a flowchart indicating how the camera mode is automatically controlled to change dependent upon a detected condition of Mario, or upon detecting Mario being in a particular situation.
Figure 24B:
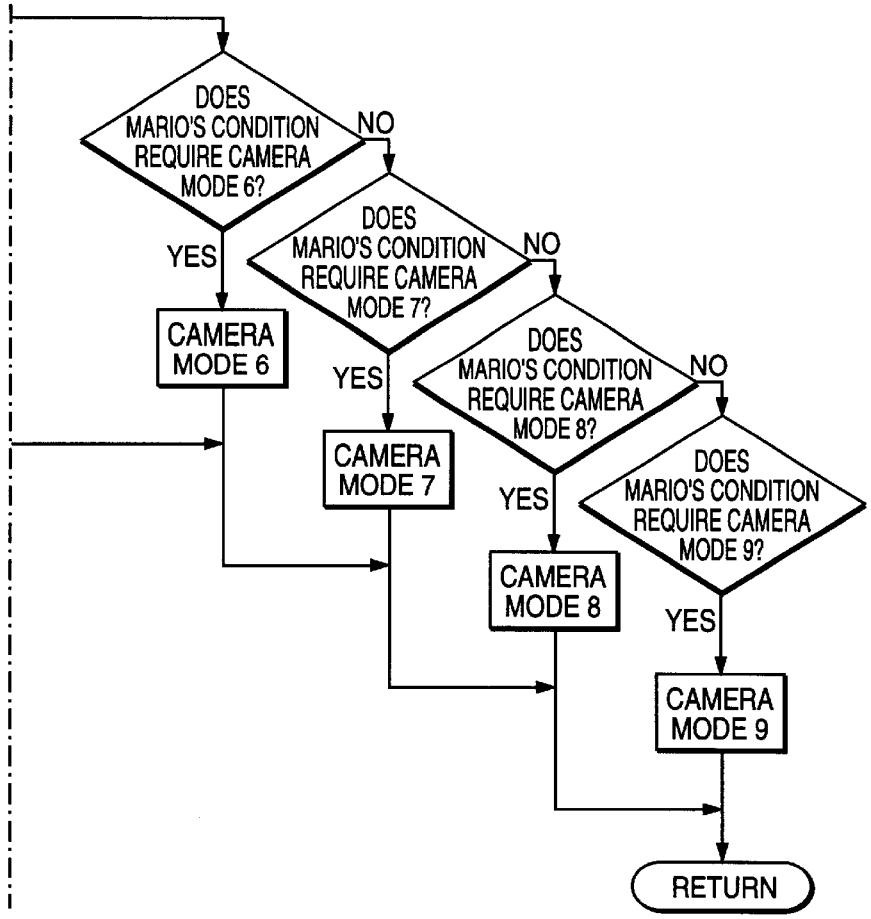

In each of the modes 1–9, as noted above, a players can change the viewpoint between the subjective mode and the objective mode by depressing the C buttons. A change in modes is also switched as the course changes. For example, when Mario passes through a door, or dives into the water, the modes automatically switch. FIGS. 24A and 24B are a flowchart indicating how the camera mode is automatically controlled to change dependent upon a detected condition of Mario, or upon detecting Mario being in a particular situation. The camera mode changing routine begins by checking as to whether Mario's condition or situation requires camera mode 1. If so, the camera processing automatically switches to generating displays from the perspective of camera mode 1. Upon completion of camera mode 1 processing, the routine branches back to the calling routine. If Mario's condition does not require camera mode 1, then a check is made as to whether Mario's condition requires camera mode 2. If so, then the routine generates displays in accordance with camera mode 2 as explained above. This process is repeated for each camera mode. With each check, the routine determines whether Mario's condition requires one of the respective nine camera modes, which checks are repetitively made. Thus, in accordance with FIG. 24 processing, upon detecting that Mario has been controlled by the user to be in an underwater situation, the camera mode is automatically controlled to result in camera mode 4 operation.

With respect to FIGS. 24A and 24B, whether Mario's condition requires switching to a particular camera mode is determined by monitoring the stored condition or status of Mario, and determining whether such stored condition or status is indicative of the conditions or status desired to initiate one of the nine camera modes. As explained in conjunction with FIG. 21, stored information relating to Mario's state condition and terrain, are utilized to control switching into one of the automatic camera modes. The precise conditions utilized to switch to one of the particular modes may be selected by the game designer depending upon a particular application. Moreover, on top of the automatic program control camera mode perspectives, the user has the flexibility to superimpose the four C button operations to result in changing the camera's perspective as described above in conjunction with FIG. 23A.

As described in detail above, a wide variety of camera perspective options are available both under player control and under automatic program control. FIGS. 23F–L exemplify displays which may be generated by a player actuating one of the FIGS. 6 control keys to initiate a change in camera perspective. FIG. 23F shows the character Mario in the center of a three dimensional scene. By depressing the left and right keys as indicated by the arrows which correspond to 404F and 404E of FIG. 6, the displays in FIGS. 23H and 23J are generated to simulate circling left and right around Mario. If keys 404C and 404D are actuated (the up and down arrow keys), the displays shown in FIGS. 23I and 23G are generated which simulate the effect that the camera angle or point of view appears to pull away from Mario or get close to Mario. Focusing on FIG. 23G, if the control stick is manipulated from the close up viewpoint shown, Mario's head turns and the viewpoint follows Mario's line of sight, as shown in FIGS. 23L and 23K. By "looking around" and manipulating Mario's head in this manner, it is possible to observe objects which would otherwise not be seen to enhance the players ability to achieve goals.

During game play, depending on the scene, the camera mode automatically switches to the optimum view as described above. If a player presses the "R" button, a change may be made to a special camera mode. There are two optional camera modes that can be set from the pause screen as explained above during the pause processing description. On the pause screen, a player is able to select one of two optional modes. By pressing the "R" button, the player is able to switch between these camera modes. When operating in these modes, the same controls are available as previously described in conjunction with FIGS. 23F–23L. In one embodiment of the present invention, the distance between Mario's current position and the camera is displayed. If the player presses and holds the "R" button to halt the camera movement, the camera position is fixed, which is usefull when it is not desired for the camera to follow Mario. By releasing the "R" button, the camera mode will return to its normal state.

Figure 25A:
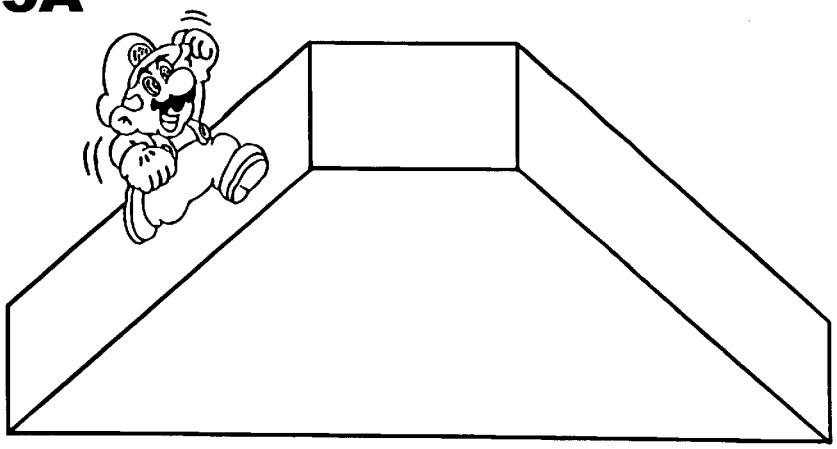
FIGS. 25A–C show a player controlled character on surfaces having different slopes.
Figure 25B:
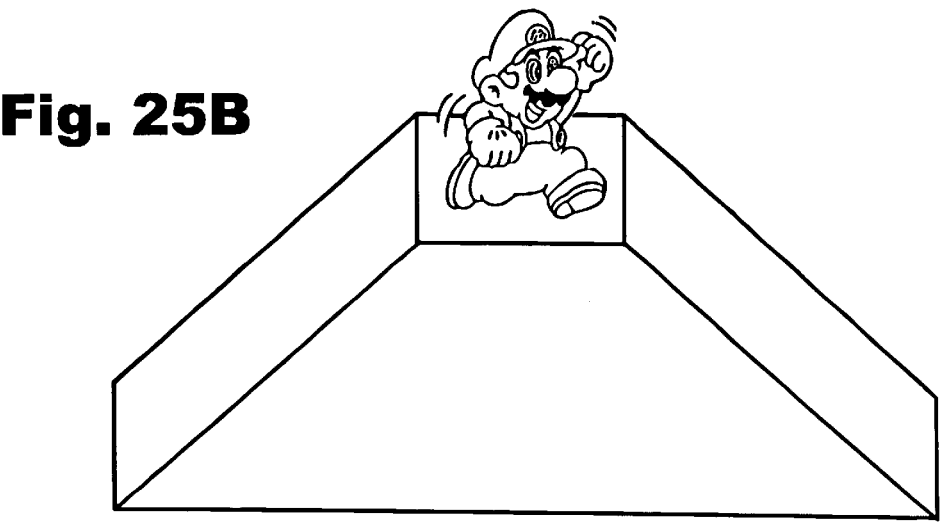
Figure 25C:
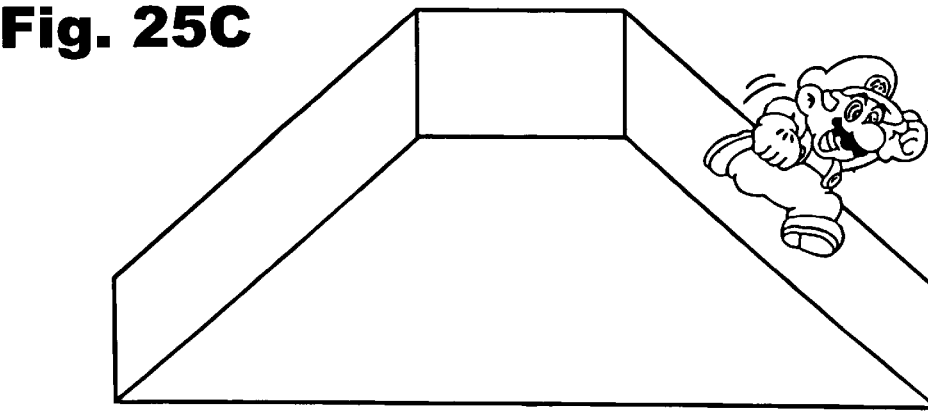

FIGS. 25A–C shows Mario traversing terrains having three different slopes, i.e., an upwardly sloping terrain with respect to Mario's motion direction, a level horizontal surface, and a downwardly sloping terrain with respect to Mario's motion direction, respectively. As can be seen in FIGS. 25A–C, each of the terrains identified is associated with a polygon on which Super Mario's feet contact. Such polygons may, if desired, have associated desired camera mode indicators stored. In such cases, when Mario is detected as being on such a polygon bounded terrain, a camera mode switch is initiated, as previously described in conjunction with FIG. 21.

The present invention also utilizes a wide range of character control and animation techniques to realistically display a character in a three-dimensional world. The player controller shown in FIGS. 6 through 9 permits a user to control a character to precisely perform a wide variety of jumps such as wall jumps, long jumps, triple jumps, back flips, etc., and to control flying, swimming, crawling and many other simulated maneuvers.

Figure 27A:
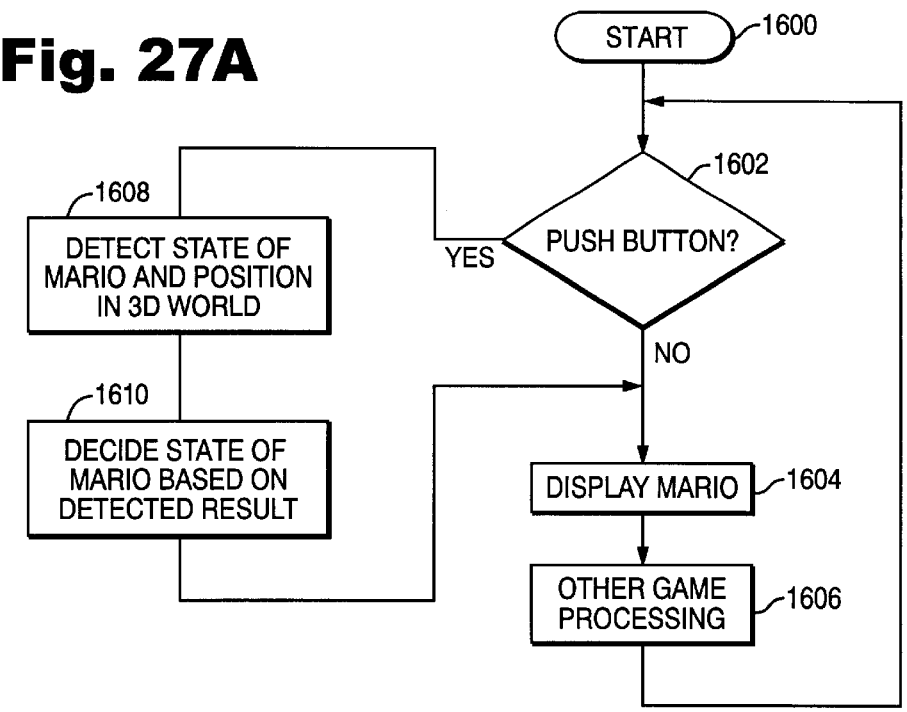
FIGS. 27A and 27B are flow diagrams which indicate the manner in which a player controlled character, e.g., Mario, is controlled.
Figure 27B:
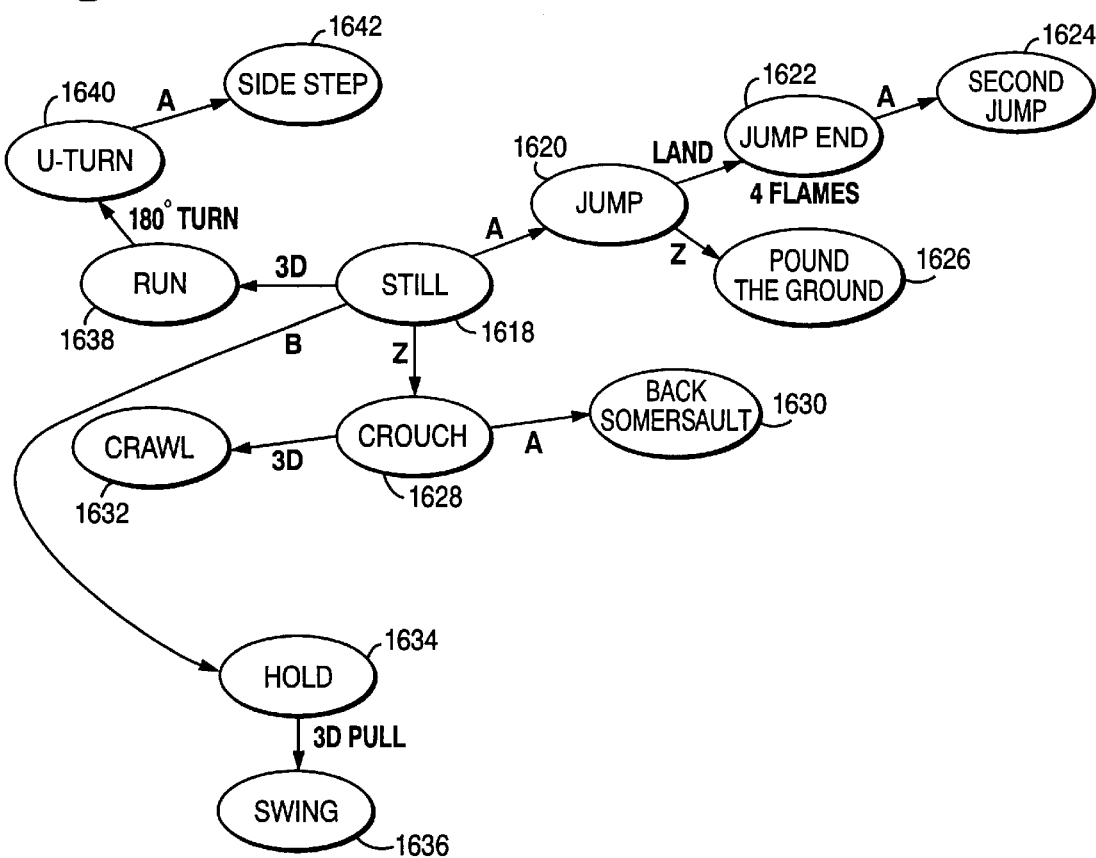

FIGS. 27A and 27B are flow diagrams which indicate the manner in which a player-controlled character, e.g., Mario, is controlled. Turning to FIG. 27A, after power-up and initialization routines are completed, the program checks to determine whether any of the control keys/push buttons/switches or the analog joystick have been actuated (1602). If such control members, keys or switches have not been actuated, then the character is displayed in his current position (1604), other game processing continues (1606), and the routine branches back to block 1602, where key actuation is again checked. If it is determined that a control key/switch/joystick has been operated, then the current state of the player controlled character and its position in the three-dimensional world is detected (1608). Based on the detected state and position of Mario in the 3D world, a decision is made as to Mario's desired next display position and state (1610). Mario is then displayed in the desired state as controlled by the processing at block 1604.

FIG. 27B is a state diagram exemplifying how a character's next state is based on its current state and the actuation of a particular control mechanism. As shown in FIG. 27B, if Mario is detected as being in a still position (1618), and the "A" button (FIG. 6, 404A) is depressed, Mario is controlled to jump (1620). If the A button is pressed again as Mario lands, then a second jump is initiated (1622, 1624) to thereby initiate a sequence of continuous jumps as shown, for example, in FIG. 27C. If after an initial jump, the Z button (FIG. 7, 407) is depressed, Mario is controlled to pound the ground (1626). Turning back to node 1618, if the Z button is depressed when Mario is still, Mario is controlled to crouch (1628). If the A is then depressed, then a back somersault is controlled as shown in FIG. 27D. If the 3D joystick controller is utilized when Mario is detected as being in a crouched position, then Mario is controlled to crawl or slide as shown in FIG. 27E.

Turning back to node 1618, if the B button (FIG. 6, 404B) is depressed when Mario is in a still position, Mario is controlled to hold onto an "enemy" (1634) and if the 3D joystick is swiveled, then Mario swings the enemy (I636), as shown in FIG. 27F. By pressing the B button again, the enemy is tossed. The faster the 3D joystick is swiveled, the further Mario tosses the enemy.

Figure 27G:
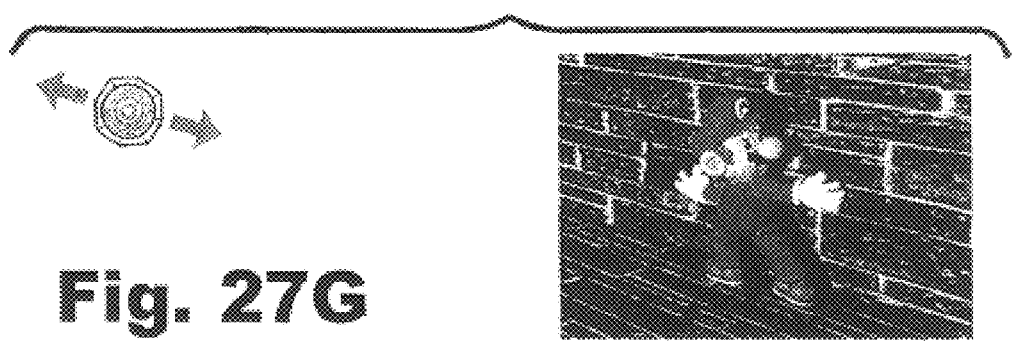

Turning back to node 1618, if the 3D joystick is manipulated while Mario is still, Mario is controlled to run or walk, as is explained further below. If the joystick is turned 180 degrees, a U-turn is controlled (1640). If the A button is then depressed, Mario is controlled to sidestep up next to a wall (1642) by tilting the control stick in the direction Mario is to move along the wall as shown in FIG. 27G.

Figure 27H:
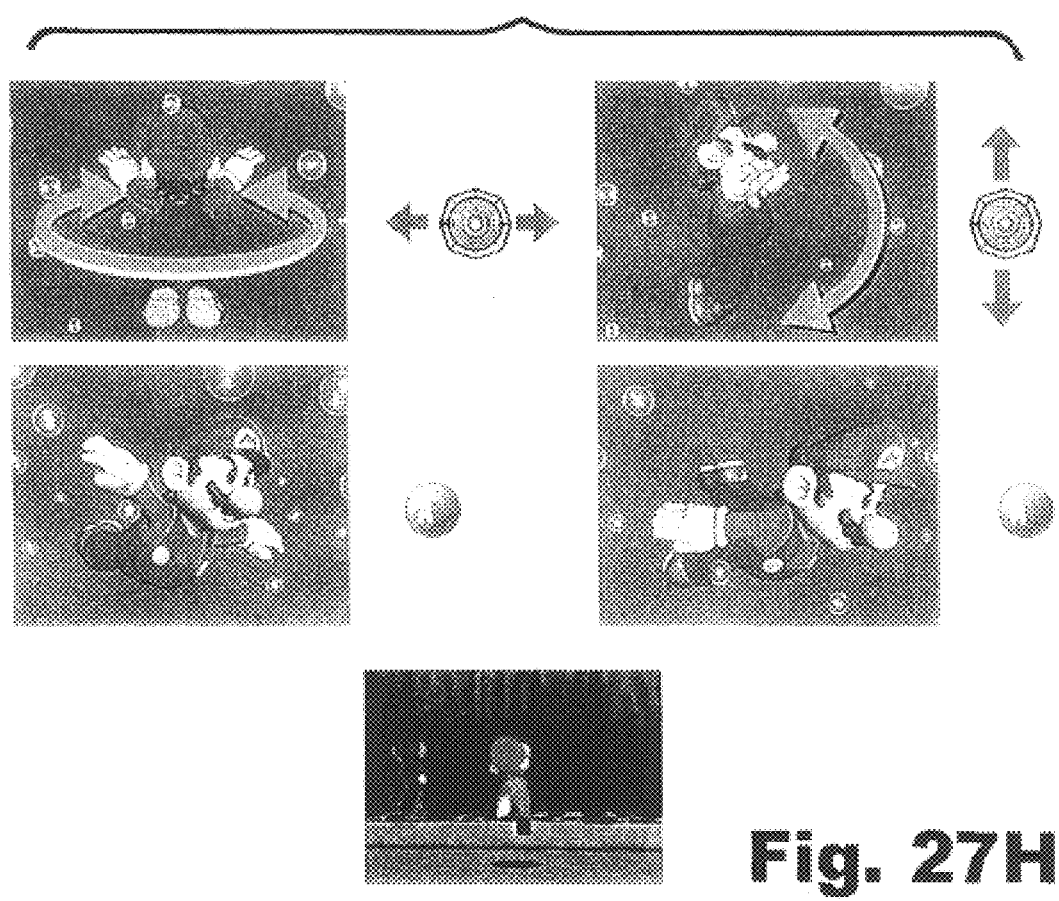
Figure 27I:
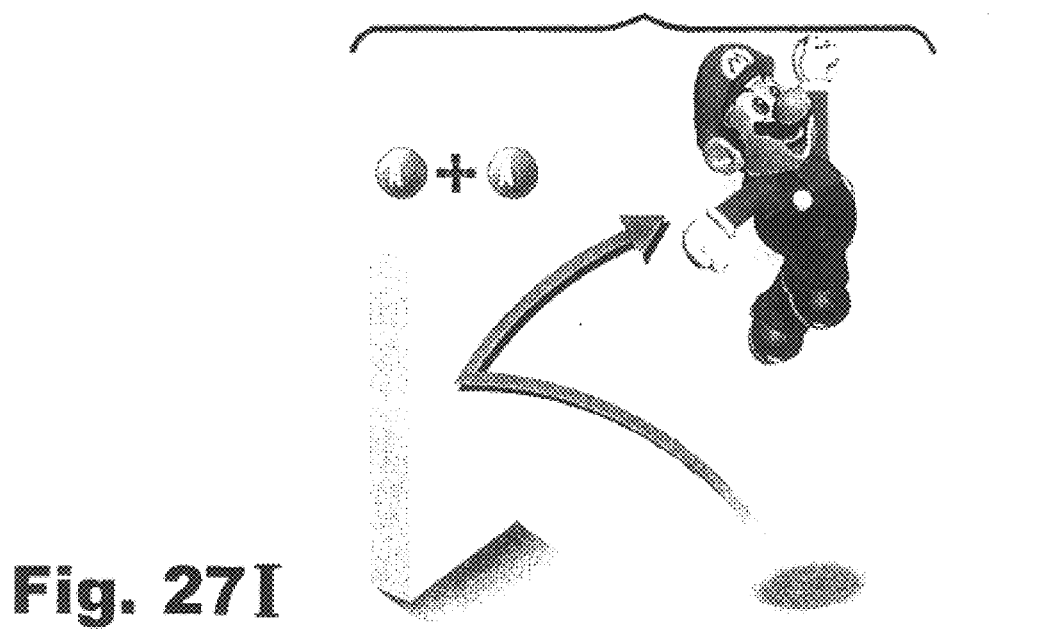
Figure 27J:
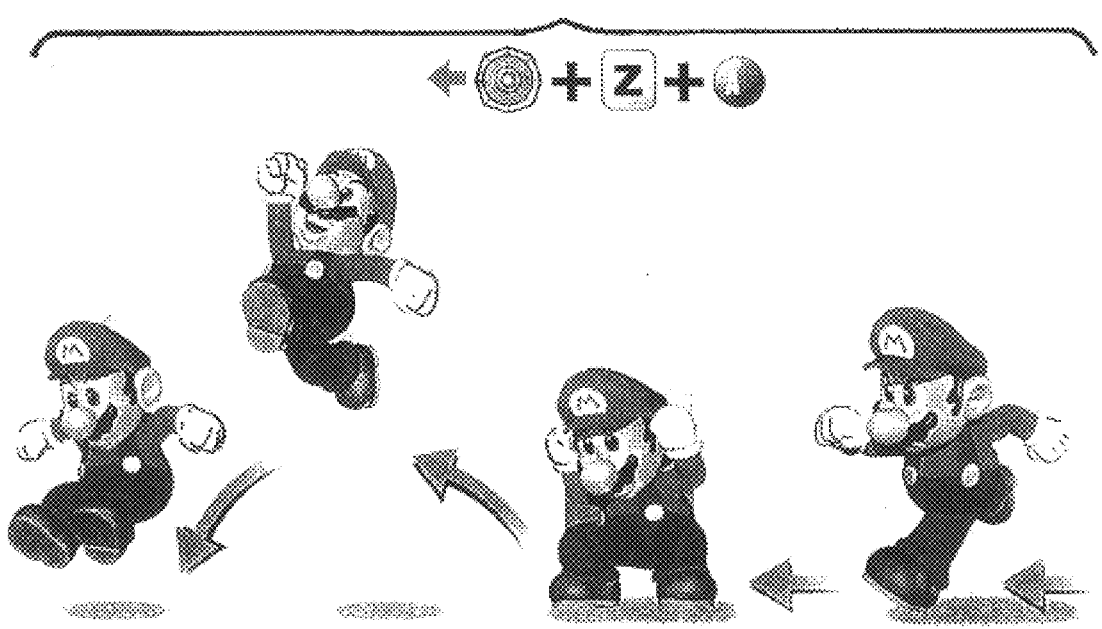

The present invention also contemplates numerous other control techniques, including controlling the character to swim in a direction which the control stick is tilted and to control a breast stroke and/or flutter kick as indicated in FIG. 27H. When Mario's face is detected as being above the water, by pressing the A button as the control stick is pulled forward, Mario is controlled to appear to jump out of the water. Many other character maneuvers are contemplated by the present invention, including controlling a wall kick by jumping toward the wall and jumping again as the character hits the wall by depressing the A button as shown in FIG. 27I. A long jump is controlled by manipulating the joystick and then successively depressing the Z button to crouch and slide and pressing the A button to jump, as shown in FIG. 27J. The distance jumped depends on how fast the character is controlled to run. A wide variety of punching and kicking operations are controlled by manipulation of the control buttons, where by way of example only, a punch is controlled by depressing the B button, kicks are controlled if the B button is repeatedly depressed, and a jump kick is controlled if the B button is depressed while jumping, which is controlled by hitting the A button. Using the A and Z buttons permits the character to be controlled to pound the ground and a tripping operation is controlled by pressing the Z button to crouch and then the B button while crouching. A slide kick is controlled by utilizing the joystick, then the Z and B buttons and sliding is controlled by utilizing the joystick, then the B button.

Figure 28A:
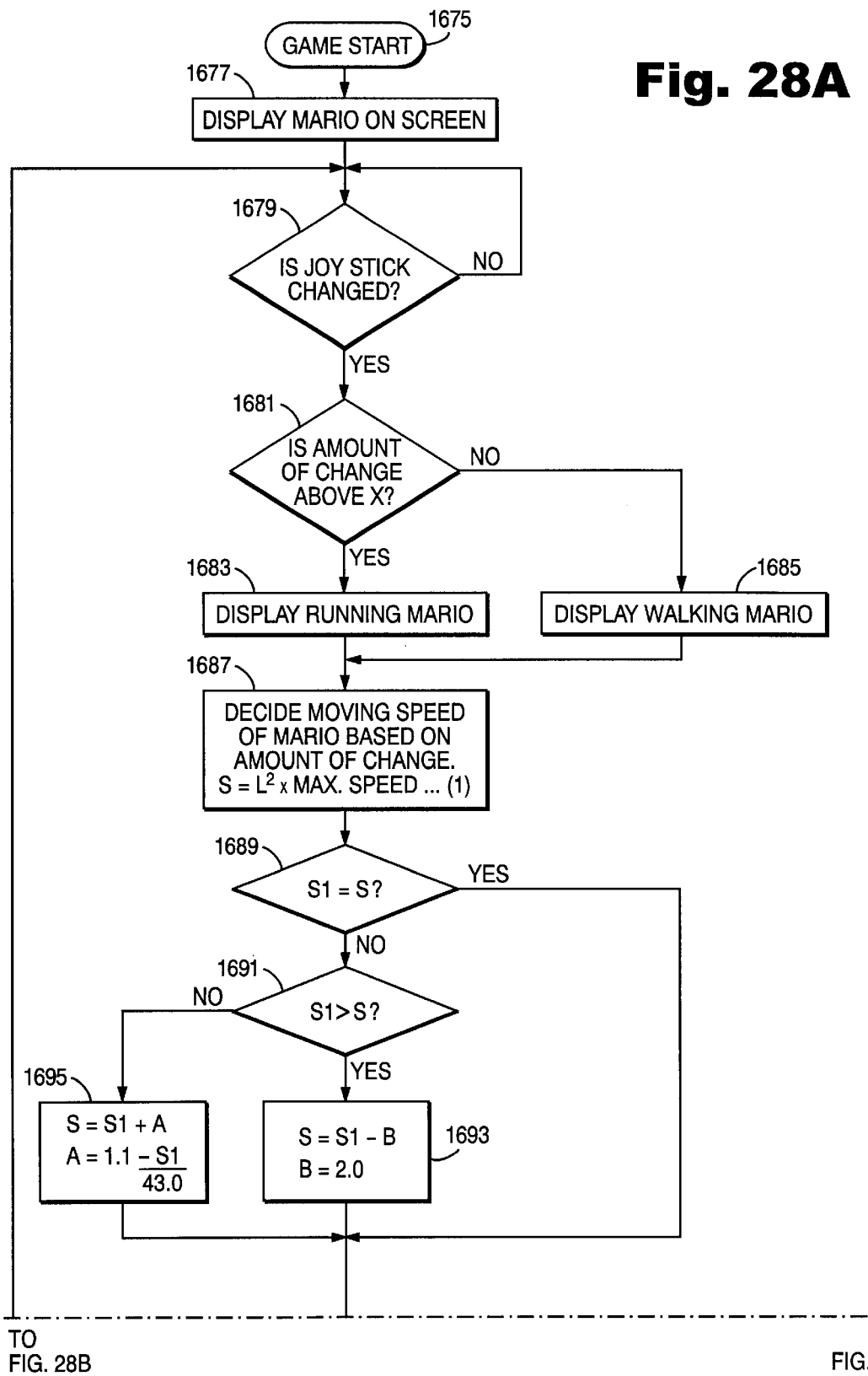
FIGS. 28A, 28B and 28C are flowcharts and a diagram depicting a routine controlling the velocity of a displayed character.
Figure 28B:
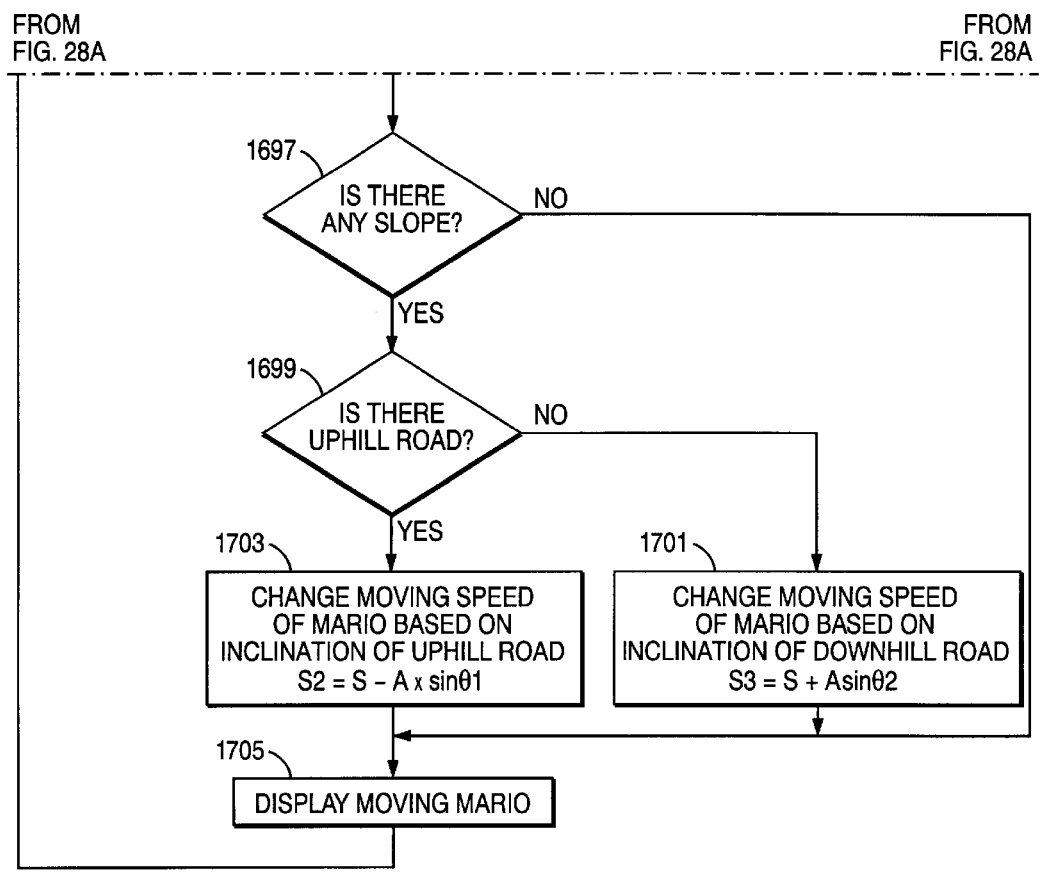

FIGS. 28A and 28B are a flowchart of the routine controlling the velocity of a displayed character, e.g., Mario, based upon joystick manipulation and the slope of a surface on which Mario is traversing. As shown in FIG. 28A, after the game is started, a character such as Mario is displayed on the display screen (1675, 1677). A check is then made to determine whether the FIG. 6 controller joystick has been moved from its origin position (1679). If not, the routine repetitively checks for changes in joystick position. The manner in which the angular rotation of the FIG. 8 joystick is detected, is disclosed in applicant's assignee's copending PCT application serial number PCT/JP96/02726 (FNP-225), and entitled "Three Dimensional Image Processing System" filed on Sep. 20, 1996, which application is hereby incorporated herein by reference.

Figure 28C:
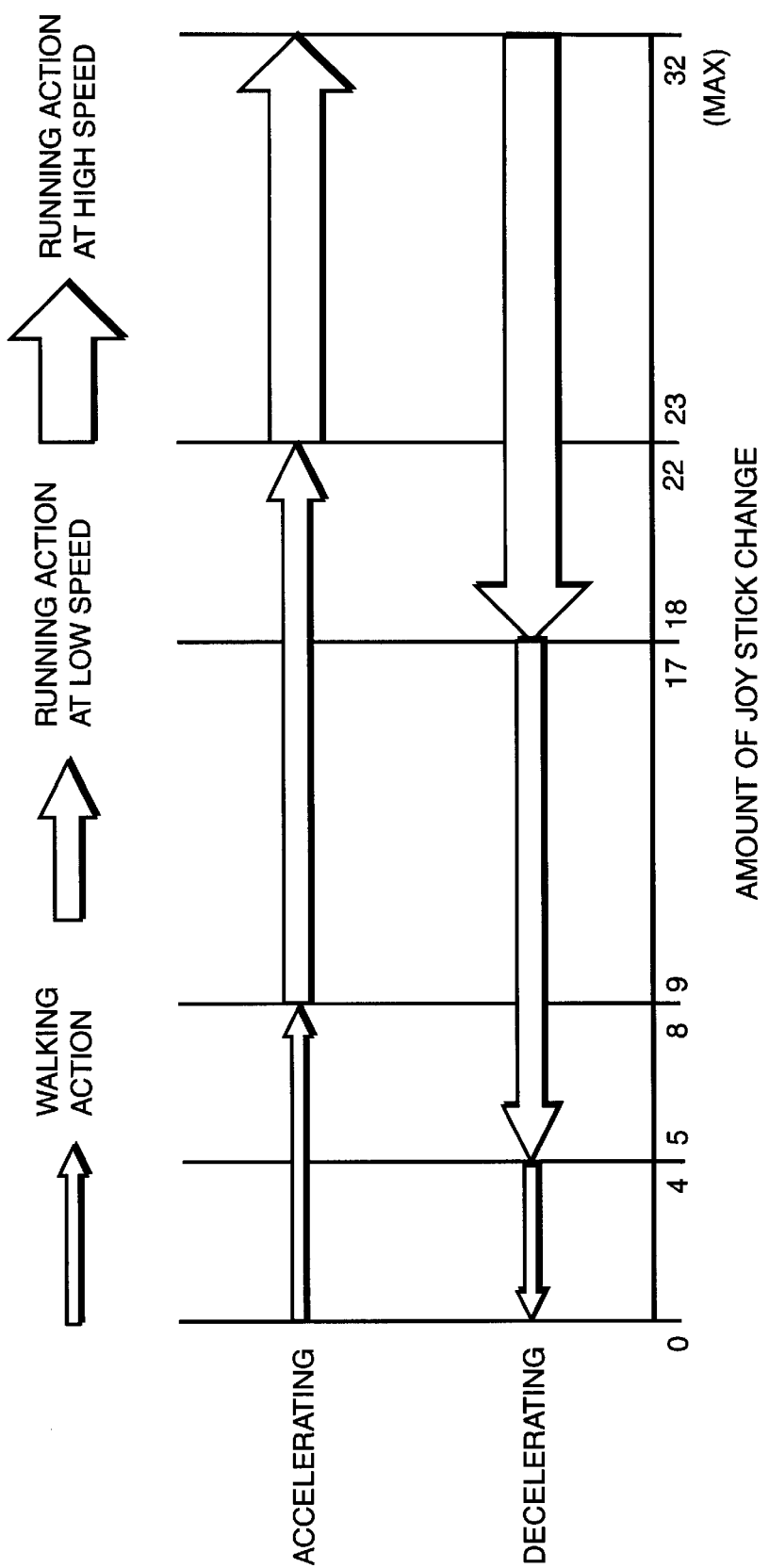

If the joystick position has been changed, a check is made at block 1681 to determine whether the amount of the change is greater than a predetermined amount X. FIG. 28C shows an exemplary three states for the controlled character which are displayed depending upon the amount of joystick angular rotation: 1) a walking action, 2) a low speed running action, and 3) a high speed running action. With respect to the x axis shown in FIG. 28C, zero amount of joystick change represents no manipulation of the joystick from its origin position. The maximum angular rotation permitted by the FIG. 6 joystick has been assigned a value of 32 units. Thus 32 angular rotation units have been indicated in FIG. 28C varying from no change (zero) to maximum angular rotation (32).

When Mario is accelerating, if the amount of joystick change is 8 units or less, then Mario is displayed as walking. If the amount of joystick change is between 9 and 22, then Mario is displayed as running at a low speed, and if the amount of joystick change is over 23, then Mario is displayed as running at a high speed. In a deceleration mode, if the amount of joystick change is greater than or equal to 18, then Mario is shown as running at a high speed. If the amount of joystick change in the decelerating mode is between 5 and 17 units, then Mario is displayed as running at a low speed and if the amount of joystick change is less than 4, then Mario is displayed as walking. By including a different relationship between the amount of joystick change and the above-described three states of Mario for the accelerating and decelerating modes, more natural realistic animation screen effects are generated.

Turning back to FIG. 28A, if the detected amount of change (1681) is above the indicated FIG. 28C values, as described above, then Mario is displayed as running (1683), and if the amount is below the predetermined value, Mario is displayed as walking (1685). The velocity of Mario is controlled in accordance with the processing at block 1687. Although not expressly indicated in the flowchart in FIG. 28, the running control is preferably based on the multiple speed running modes depicted in FIG. 28C. Accordingly, the joystick mechanism may be advantageously utilized as controlling dual functions by, for example, not only defining a vector along which a character is to move but also defining the velocity for object travel along such vector.

As indicated above, at block 1687, Mario's moving speed is determined based on the detected amount of joystick change. Mario's moving speed S11 is determined by multiplying the square of the detected amount of joystick change by a predetermined maximum speed by which Mario can travel which, for example, may be 32 centimeters per frame. In the present exemplary embodiment, one centimeter is equal to one pixel or dot. A check is then made at block 1689 to determine whether Mario's previous speed is equal to the desired present speed. If yes, then the speed remains the same and the routine branches to FIG. 28B, block 1697.

If no, then a check is made at block 1691 to determine whether the previous frame speed is greater than the present speed to determine whether acceleration or deceleration is to take place. This determination is made based on the angle of inclination of the joystick. If the previous frame speed is larger than the desired present frame speed, then deceleration is to take place, otherwise acceleration is to take place. If deceleration is to take place, then in accordance with the processing at 1693, the present speed is set to equal the previous frame speed minus B, where B equals 2, which is a deceleration factor. If S1 is smaller than S, then acceleration takes place in accordance with the processing at 1695. In accordance with the processing at 1695, the present speed is set to be equal to the previous frame speed plus an acceleration factor A, where A is equal to $1.1-(S1 \div 43.0)$. After the acceleration or deceleration calculations are made in 1695 or 1693, or if the speed is maintained to be the same, processing continues at 1697.

A check is made at FIG. 28B, block 1697 to determine whether the path on which Mario travels is on any sloped surface such as shown in FIGS. 25A, C and FIG. 26A. The determination as to whether Mario is on a sloped surface is determined in part by detecting on which polygon Mario is currently traversing. Each polygon, e.g., a triangle, includes polygon data in the form $ax+by+cz+d=0$. Each polygon has, for example, the parameters a, b, c and d as terrain data associated therewith. If, for example, the values of x and z are known then y can be calculated to find the height at the position. The parameter b identified above, is equal to the cosine of the angle of inclination. The parameters a, b and c are related such that the square root of $a^2+b^2+c^2$ is equal to 1.

The check at block 1697 determines whether, based on the terrain data, there is any slope of the surface over which Mario traverses. If there is not any slope such as in FIG. 25B, then the routine branches to block 1705 to display Mario moving. If there is a slope, a check is made at block 1699 to determine whether there is a uphill angle of inclination. If there is an uphill angle of inclination, then Mario's speed is moved based on the inclination of the uphill path (1703). In calculating Mario's moving speed S2, based on an uphill inclination angle, the speed S2 is equal to S1, Mario's moving speed minus A times the sine of the angle of upward inclination, where A is a fixed number based on the surface state of the earth. For example, for a very slippery surface such as ice, A=5.3. If the surface is somewhat less slippery, such as snow or sand, A=2.7. If the surface is non-slippery, such as soil or concrete, A=1.7. The above values for the parameter A may be varied from the above stated values and have been chosen based upon trial and error studies. Only when the angle of inclination is equal to or greater than a predetermined angle will the moving speed, slope-related angle of inclination calculations be carried out. The angle of inclination of a particular surface, may be varied depending upon various factors as desired, but preferably, the angle of inclination for very slippery surfaces should be greater or equal to 5 degrees, for somewhat more slippery surfaces greater or equal to 10 degrees, and for a non-slippery surface, greater or equal to 15 degrees.

If the check at 1699 determines that the road or surface over which Mario traverses is not an uphill road, then the speed of Mario is modified based upon the down hill inclination (1701). The formula for calculating the speed of Mario S3 based upon the downward inclination angle is S1, which is the moving speed of Mario based upon the amount of joystick change plus the A times the sine of the angle of downward inclination. The parameter A is again based upon the slipperiness of the surface and may have the same values identified above. Based on the processing of block 1703 or 1701, Mario is displayed at the appropriate moving speed (1705) and the routine branches back to block 1679 where the change in the joystick angle of rotation is detected.

Figure 29:
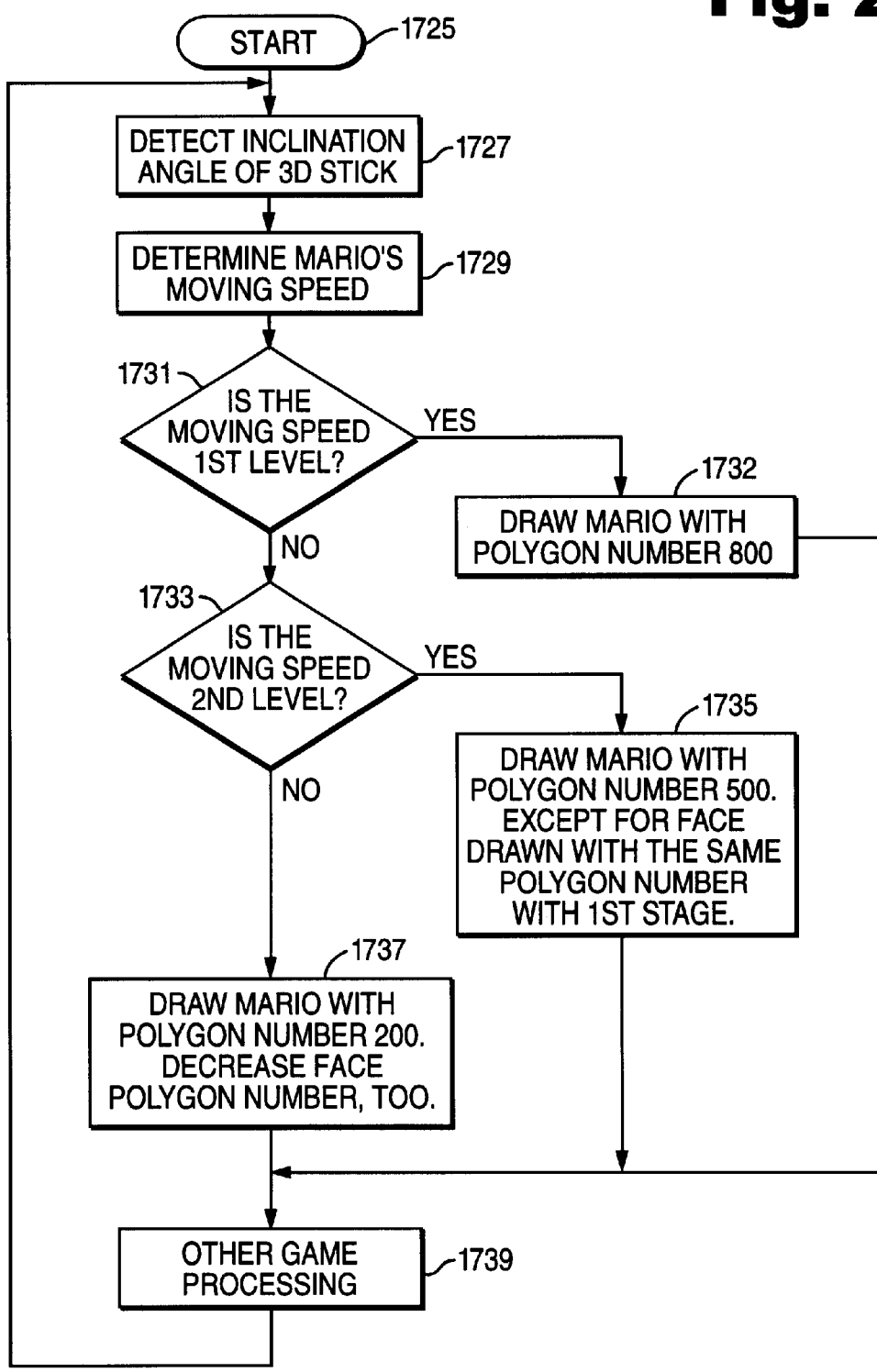
FIG. 29 is a flowchart relating to selecting the number of polygons used to generate a character.

In accordance with one exemplary embodiment of the video game methodology of the present invention, the number of polygons which are utilized to form a moving object character, such as Mario, is controlled as a function of character speed. In accordance with this embodiment, in addition to conventional level of detail processing (where the number of polygons utilized to form a character is reduced as the character travels further and further from the line of sight), the method described in FIG. 29 provides a mechanism for reducing the burden on the polygon generating subsystem when Mario is controlled to rapidly move around the screen. The method described in FIG. 29 is designed to reduce the likelihood that the user will notice the reduction in the number of polygons. It is premised in part on the user paying more attention to the face and head than the body of the character.

Turning to FIG. 29, after the game program is started and initial processing is completed, game play begins and the program detects the inclination angle of the joystick (1725, 1727). As previously described, based upon the angle of inclination of the joystick, the character speed is determined (1729). A check is then made at block 1731 to determine whether the character's speed is at a first level, which indicates either no motion or travelling at a slow speed. If Mario is moving at a predetermined first slow speed, Mario is drawn with a predetermined number of polygons, e.g., 800 (1732), and other game processing continues as the routine branches to block 1739. Accordingly, the character is drawn at a high resolution at such slow speeds.

If the character is moving at a speed higher than the predetermined first level, then a check is made at 1733 to determine whether the speed of Mario is moving at a predetermined, but moderate, higher level of speed. If Mario is moving at the predetermined higher second level speed, then the character is drawn with a reduced polygon number, e.g., 500, but the face is drawn with the same number of polygons as was utilized to draw the character when movement was detected as static or the first level speed. If the character speed is detected to be higher than the moderate, predetermined second level speed, then the character is drawn with 200 polygons and the number of polygons utilized to draw the face is lo reduced as well (1737). After the character is drawn at either blocks 1732, 1735 or 1737 other game processing continues (1739) and the routine branches back to the detecting the inclination of the joystick step (1727).

Figure 30:
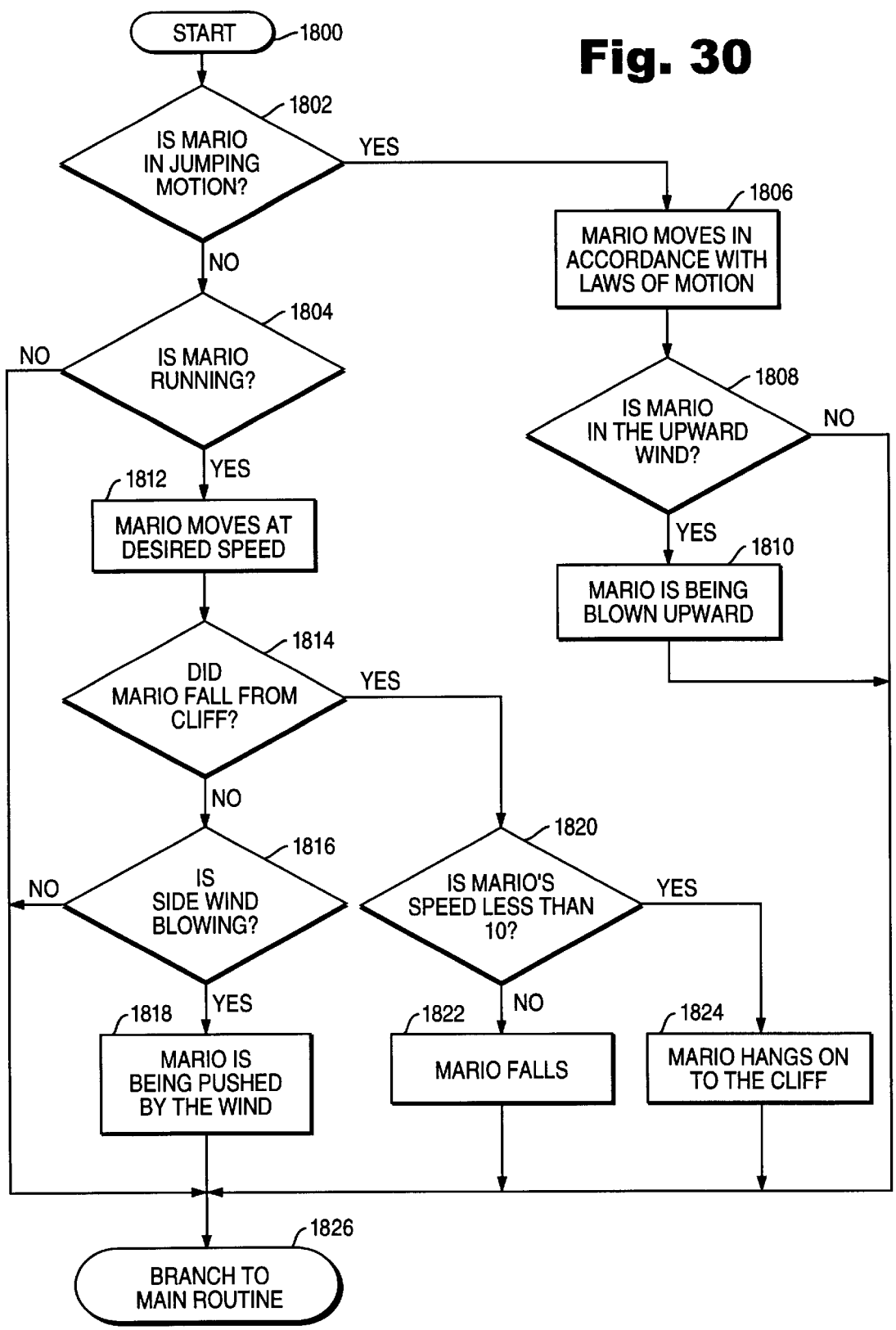
FIG. 30 is a flowchart exemplifying how a character responds to environmental conditions.

FIG. 30 is a flowchart exemplifying how the character Mario responds to environmental conditions. The flowchart should be construed as merely exemplifying the concept without exhaustively treating the environmental conditions that may be taken into account. The environmental condition processing routine starts by detecting whether Mario is in a jumping motion (1800, 1802).

If Mario is jumping, as determined by the check at block 1802, then the motion of Mario is controlled in accordance with the known laws of physics, including the law of gravity (1806). A check is then made at block 1808 to determine whether Mario is in an upward wind current. If it is detected that Mario is in an upward wind, then the motion of Mario is controlled such that Mario is blown in the direction of the wind current (1810). When the motion controlled by the laws of gravity is equal to the force of the wind current blowing upward, Mario is displayed to appear to be floating. After wind processing is completed, the routine branches back to the main routine (1826).

If the check at block 1802 reveals that Mario is not in a jumping motion, then a check is made to determine whether Mario is running (1804). If Mario is not running, then the routine branches back to the main routine (1826). If Mario is detected as running, then the speed of Mario is controlled as previously described (1812). A check is then made to determine whether Mario has fallen from a cliff or any other predetermined bounded surface (1814). If Mario has not fallen from a cliff or other bounded surface, a check is made at block 1816 to determine whether a side wind is blowing. If a side wind is blowing, then Mario's motion is controlled such that it appears that Mario is being appropriately pushed by wind (1818), and the routine branches back to the main routine (1826). If the check at block 1816 reveals that no side wind is blowing, then the routine branches back to the main routine (1826).

If the check at block 1814 reveals that Mario did fall from a cliff, then a check is made to determine whether Mario's speed was less than 10 pixels per frame. If Mario's speed is less than 10 pixels per frame, Mario is controlled such that he's displayed hanging on to the cliff (1824). If Mario's speed is equal to or greater than 10 pixels per frame, then Mario is displayed as falling from a cliff (1822). The fastest speed that Mario can be depicted as running is 32 dots or pixels per frame. After the processing at 1818, 1822 or 1824, the routine branches back to the main routine (1826).

Figure 31:
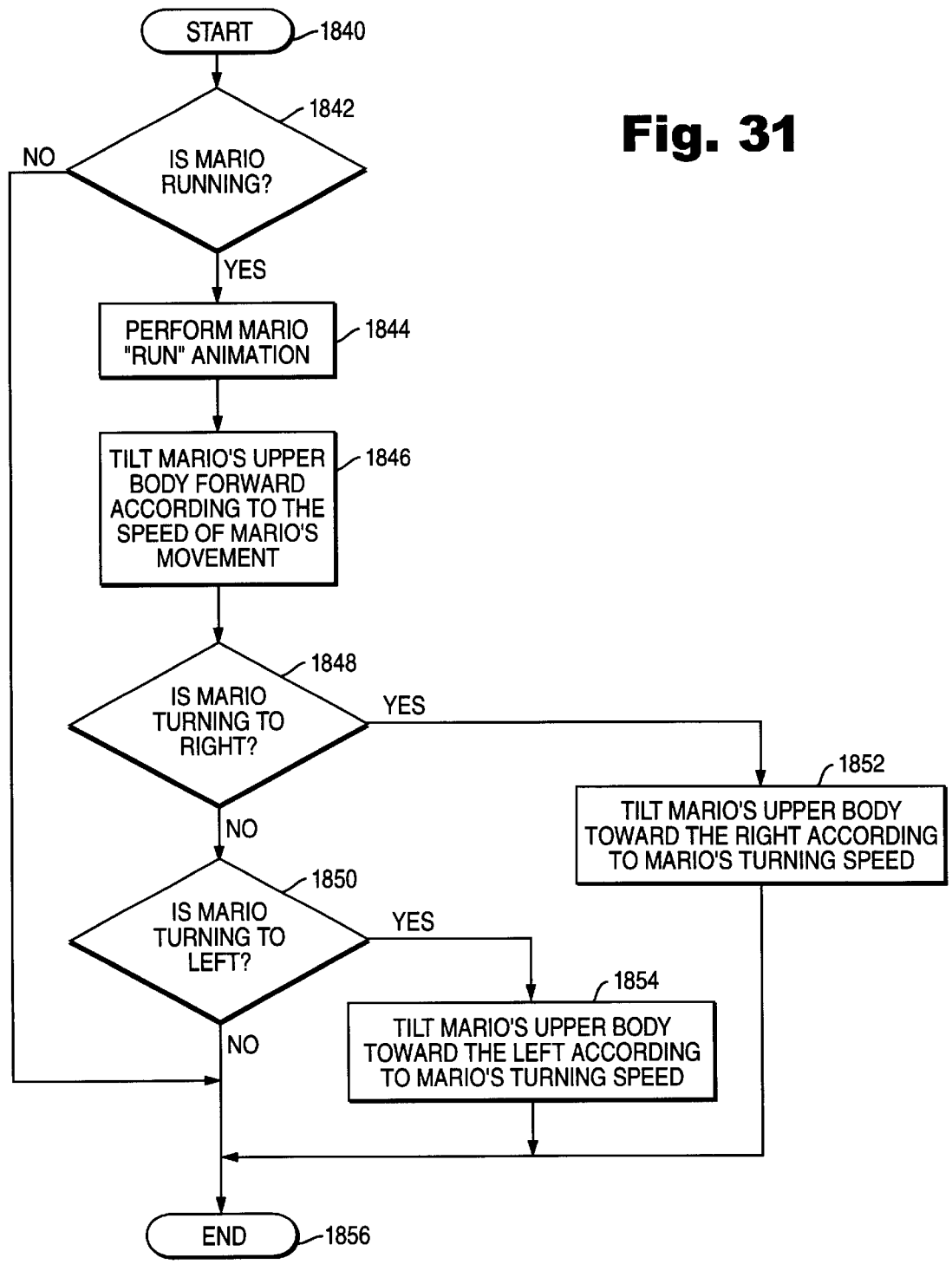
FIG. 31 is a flowchart indicating how a character's body orientation is controlled during running or angular motion.

FIG. 31 is a flowchart indicating how Mario's body orientation is controlled during running or angular motion. During body orientation processing, a check is first made to determine whether Mario is running (1840, 1842). If Mario is not running, then there is no upper body motion simulated. Mario's "upper" body is defined as that portion of the body above the waist joint. If Mario is detected as running, then Mario is animated so as to simulate running (1844). During running processing, Mario's upper body is tilted forward according to the speed of Mario's movement (1846). The faster Mario is detected as running, the more Mario's upper body tilts forward. Thereafter, a check is made to determine if Mario is turning to the right (1848). If Mario is detected as turning to the right, then Mario is displayed with his upper body tilted to the right, the degree of tilt being based upon Mario's rotational speed (1852) and the routine branches back to the main routine (1856). In animating Mario running in the fashion described above, degree of tilt calculations are performed using a waist matrix a joint matrix and an upper body matrix to simulate a realistic tilting motion, which is a function of Mario's turning speed. If Mario is not turning right, based on the check at 1848, a check is made to determine if Mario is tuning left (1850). If Mario is turning left, then Mario's upper body is displayed tilting toward to the left in accordance with Mario's rotating speed (1854) and the routine branches back to the main routine (1856).

Figure 32:
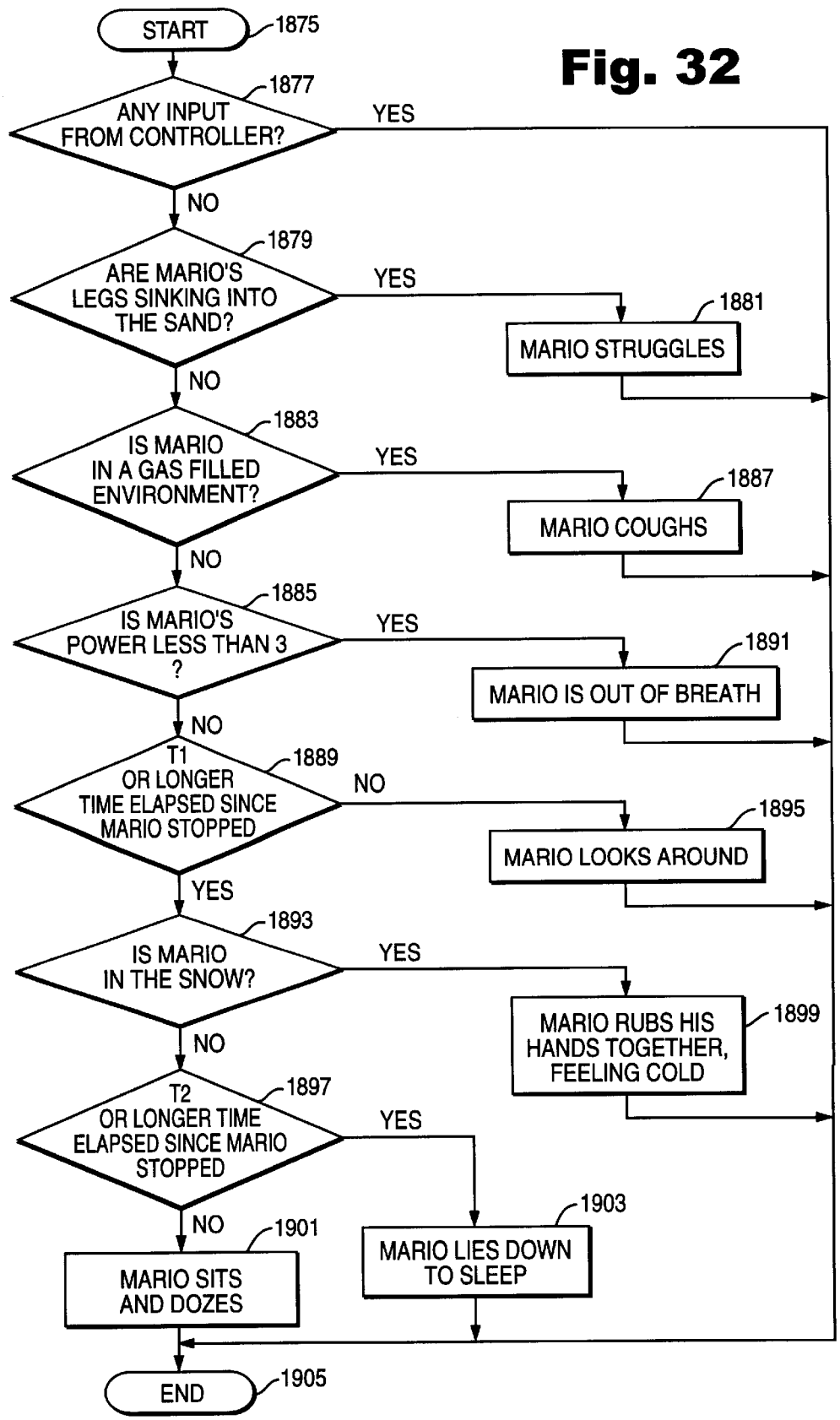
FIG. 32 is a flowchart indicating the impact of the environment or time on Mario.

FIG. 32 is a flowchart indicating the impact of the environment or time on Mario. When the environmental processing begins, a check is made to determine whether there's any player input to the controller (1875, 1877). In this manner, it is ensured that Mario is in a static position, and not moving. If Mario is being controlled in any manner by the player controller, such that there is motion, then the routine branches to block 1905, and the routine branches back to the main routine.

If there is no input to the controller, then a check is made to determine whether Mario's legs are sinking into a sand terrain (1879). If the check at block 1879 indicates that Mario is sinking into the sand, then Mario is displayed in a struggling animation sequence (1881) and the routine branches back to the main routine. If Mario's legs are not sinking into the sand, then a check is made at 1883 to determine whether Mario is in a toxic gas filled environment. If so, then Mario is displayed in a coughing animation sequence, where audio coughing sounds may also be generated (1887).

If Mario is not in a gas filled environment, then a check is made at 1885 to determine whether a power factor associated with Mario is less than 3, to thereby indicate a relatively low energy level of Mario. If so, then Mario is displayed in an animation sequence indicating that he is out of breath and breathing deeply. If Mario's power is not less than 3, then a check is made at 1889 to determine whether a time $T_1$ or longer has elapsed since Mario has been in a static position. If no, then Mario is displayed looking around (1895). If so, a check is made to determine whether Mario is in snow (1893). If Mario is in snow, then Mario is displayed in an animated sequence where he is rubbing his hands together looking cold (1899). If Mario is not in snow, then a check is made to determine whether a time $T_2$ or longer period of time has elapsed since Mario has stopped (1897), where $T_2$ is set to be a longer period of time than $T_1$. If the time is less than $T_2$, than Mario is displayed as sitting and dozing (1901). If the time is $T_2$ or longer, than Mario is displayed in a sleeping animation sequence (1903). After the processing at 1901, 1903, 1899, 1895, 1891, 1887, or 1881, the environmental/time impact processing ends and the routine branches back to the main routine.

In accordance with further embodiments of the present invention, the use of the controller 56 (and the system described herein) permits additional unique screen effects to be generated. The drawing in FIG. 33A represents the amount of physical tilt of the operation member in a coordinate system. The circle drawn in the center represents the position of the operation member 45 in the condition in which the operator is not manipulating it (the FIG. 8 operation member 451 is in a state standing perpendicular to the housing). If the operation member 451 is tilted upward, as seen by the operator, the circle moves in the + direction along the Y axis while, if the operation 451 is tilted to downward, the circle moves in the – direction along the Y axis. Likewise, if the operation member 451 is tilted to the right, as seen by the operator, the circle moves in the + direction along the X axis while, if the operation member 451 is tiled to the left, the circle moves in the – direction along the Y axis.

The drawing of FIG. 33B shows an exemplary video game display screen in which a sight is moved up, down, left and right by tilting the operation member to the front, rear, left and right thereby aligning the sight with the enemy 34. The cloud 31, mountains 32 and building 33 are changing background images, and the enemy 34 is an object which moves around freely on the screen. For example, if the enemy 34 appears in the upper-right of the screen as illustrated, the operator would tilt the operation member 451 to the right and to the front. When this is done, controller 56, X counter 444X (see FIG. 9) and its count values increases. The count value data are sent to the video processing device 52. The video processing device 52 uses such additional count value data to, for example, in this further illustrative embodiment, change the display in position of the sight 35. As a result, the sight 35 and the enemy 34 become overlaid. If a button such as button 404A, etc., is pressed when they are thus overlaid, such switch data also, like the aforementioned additional amount value data, are sent to the video processing device 52. As a result, the video processing device 52 generates the video signal to display a missile (not shown), etc. on the screen and to display the enemy 34 being hit.

Next, an example in which the operation member 451 is moved (tilted) off-center and reset is explained in conjunction with FIGS. 34A and 34B. When the X counter 444X and Y counter 444Y have been reset at the coordinate position shown by the solid circle in the drawing on the left in FIG. 34, if the operator removes a hand from the operation member 451, the operation member will return to the coordinate center position (the position shown by the dotted circle). The changes in the video display under such circumstances are explained using the drawing FIG. 34B. First, when X counter 444X and Y counter 444Y have been reset, the sight 35 is displayed in the position of the solid circle just as in the FIG. 33B drawing. This is because the count values of the X counter 444X and Y counter 444Y are 0 which is the same count value as the initial values. Next, when the operator's hand is removed from the operation member 451 and the operation member 451 returns to the center position of the coordinates, the X counter 444X adds and its count value increases and the Y counter 444Y subtracts and its count value decreases. These count value data are sent to the video processing device 52. The video processing device uses such additional count value data to change the display position of the sight 35 (changing it to the position of the dotted sight 35).

This kind of resetting would be performed, for example, when an operator predicts that the position at which the enemy 34 will appear is the position of the dotted sight 35 in the drawing on the right in FIG. 34. In this case, an operator would like to align the sight 35 with the position of the dotted sight the instant the enemy 34 appears. However, continuously holding the sight 35 at the position of the dotted sight 35 is a hindrance to game play and there is the possibility that the operator will be unable to respond if the enemy 34 appears from an unexpected place. Therefore, the reset function described above is used to enable the operator to align the sight 35 to other locations. More specifically, first, using the solid sight 35 as a reference, the operator tilts the operation member 451 so that the sight 35 is displayed in the intended position which is the position at which the enemy 34 is predicted to appear (the position of the dotted sight 35). At this time, the physical coordinates of the operation member 451 are at the position of the solid circle in the FIG. 34A drawing. At this time, the operator simultaneously presses the three buttons 406L, 406R and 405. When this is done, the X counter 444x and the Y counter 444Y are reset and the sight 35 is displayed in the position of the solid sight 35. Then, the operator freely moves the sight 35 and waits for the enemy 34 to appear. If the enemy 34 appears at the position of the dotted sight 35, the operator releases their hand from the operation member 451. When this happens, the operation member 451 returns to the physical coordinate position of the dotted circle in the FIG. 34B drawing. When the operator accurately aligns the sight 35 with the enemy 34 and presses a switch, such as button 404A, etc., a missile (not shown), etc., is displayed on the screen and hits the enemy 34.

In addition, if reset is performed as described above, the operation member 451 can be significantly moved to the lower right. For example, this is effective when the operator wants to move the operation member 451 a long way towards the lower right.

It should be recognized, that, in accordance with the present invention joystick 45 may be employed in a multitude of different ways either in conjunction with directional switch 403 or as the fundamental object motion controlling mechanism utilizable by the player. Thus, not only may joystick 45 be advantageously utilized to move an object such as sight 35 in the above example, but at the same time directional switch 403 may also be utilized for controlling moving object motion.

Only some of the specific moving object control possibilities and the resulting screen effects contemplated by the present invention through the use of controller 56 have been detailed above. By way of example only, directional switch 403 also may be employed by a player to control an object's movement like conventional video game controllers while, at the same time, joystick mechanism 45 may be used by the player to manipulate a target flying around the screen. The target may, for example, be controlled to fly anywhere on the screen, at any angle, at widely varying velocities. In the context of a driving game, the joystick mechanism may be utilized as a combination accelerator, brake and steering mechanism. In such a game, the video processing device 52 detects how far forward or backward the joystick mechanism is manipulated, to determine how fast a displayed vehicle accelerates or brakes. The amount the joystick 45 is displaced to the left or right can be used, for example, to determine how sharply the vehicle will turn.

The above described origin resetting feature of the present invention, when applied to three-dimensional type displays generated utilizing the system described in the above incorporated application Ser. No. 08/562,288, may be advantageously utilized in games to change the "camera angle" to thereby modify the point of view at which a scene is viewed. For example, if an enemy were to fly off the screen heading towards the side of a building, joystick mechanism 45 may be utilized to change the perspective view so that the player, in effect determines the scene viewing angle. Thus, for example, if an enemy is hiding behind a building and can not be seen from the current point of view, joystick mechanism 45 may be utilized to change the point of origin to move the "camera angle" so that the building is viewed from the side even though the character is not moved. Thus, even though an enemy does not have a direct view of a player's character and, vice versa, due to blockage by a building, the camera angle may be changed so that the player can see both the enemy and the controlled character.

By virtue of having both a directional switch 403 and a joystick mechanism 45, a player has the unique ability to both move an object and manipulate a target simultaneously using the left and right hands. Thus, switch 403 may be used to move a character while joystick mechanism 45 is used to align a firing mechanism in a particular direction to permit proper alignment for shooting a target.

The illustrative embodiment is only one exemplary implementation. For example, it is possible to apply the invention in this application to any type of video processing as long as it involves video processing in which the operator changes the video image by manipulating an operation member.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. For use with a video game system console having a game program executing processing system to execute a video game program and at least one player controller operable by a player to generate video game control signals; a portable storage device for controlling the operation of said video game system console comprising:

a memory medium for storing video game instructions and graphics data;

accessing circuitry for coupling said video game instructions and said graphics data from said memory medium to said video game system console;

said video game instructions including instructions for causing said video game processing system to generate digital signals representative of a first three dimensional world within which a player controlled character may enter and of a second three-dimensional world having at least first and second predetermined states, said video game instructions further causing said video game system to generate digital signals of a bounded area within which a player controlled character must enter to enter said second three-dimensional world, wherein a zone of said bounded area within which a player controlled character enters controls whether said second three-dimensional world will be in said first predetermined state or another state.

2. A portable storage device in accordance with claim 1, wherein said first three-dimensional world is a castle and said bounded area is a picture disposed on a castle wall.

3. For use with a video game system console having a game program executing processing system to execute a video game program and at least one player controller operable by a player to generate video game control signals; a portable storage device for controlling the operation of said video game system console comprising:

a memory medium for storing video game instructions and graphics data;

accessing circuitry for coupling said video game instructions and said graphics data from said memory medium to said video game system console;

said video game instructions including instructions for causing said video game processing system to generate digital signals representative of a first three dimensional world within which a player controlled character may enter and of a second three-dimensional world having a plurality of different states, said video game instructions further causing said video game system to define an area within which a player controlled character can enter to enter said second three-dimensional world, wherein said area includes a plurality of different zones, and further wherein a particular zone of said plurality of different zones within which a player controlled character enters determines a current state from the plurality of different states for the three-dimensional world.

4. A portable storage device in accordance with claim 3, wherein said first three-dimensional world is a castle and said area is a picture disposed on a castle wall.

* * * * *